United States Patent [19]
Maeda et al.

[11] Patent Number: 5,808,988
[45] Date of Patent: Sep. 15, 1998

[54] REPRODUCTION OF OPTICAL INFORMATION BY ONE-BEAM OPTICS WITH REDUCED CROSSTALK AS RECORDED IN MULTI-PHASES AND MULTI-LEVELS AT STAGGERED LATTICE POINTS, AND APPARATUS AND RECORDING MEDIUM THEREFOR

[75] Inventors: Takeshi Maeda; Kouichirou Wakabayashi, both of Kokubunji; Hisataka Sugiyama, Kodaira, all of Japan

[73] Assignees: Hitachi, Ltd., Tokyo; Hitachi Maxell, Ltd., Oosaka, both of Japan

[21] Appl. No.: 602,569

[22] Filed: Feb. 14, 1996

[30] Foreign Application Priority Data

Feb. 15, 1995 [JP] Japan .................................. 7-026678
Feb. 15, 1995 [JP] Japan .................................. 7-026679

[51] Int. Cl.$^6$ ........................................................ G11B 7/00
[52] U.S. Cl. ................................ 369/48; 369/54; 369/59; 369/94; 369/95; 369/275.3; 369/275.4
[58] Field of Search ............................. 369/47–50, 54, 369/58, 59, 94–95, 111, 124, 275.1–275.5

[56] References Cited

U.S. PATENT DOCUMENTS

| | | | |
|---|---|---|---|
| 5,337,301 | 8/1994 | Sugiura et al. | 369/110 |
| 5,493,552 | 2/1996 | Kobori | 369/109 |
| 5,559,786 | 9/1996 | Horimai et al. | 369/275.1 |
| 5,615,193 | 3/1997 | Kobayashi et al. | 369/59 |

FOREIGN PATENT DOCUMENTS

| | | |
|---|---|---|
| 64-1167 | 1/1989 | Japan . |
| 1-32442 | 2/1989 | Japan . |
| 1-155535 | 6/1989 | Japan . |
| 2-257474 | 10/1990 | Japan . |
| 3-5932 | 1/1991 | Japan . |
| 5-205280 | 8/1993 | Japan . |
| 6-76303 | 3/1994 | Japan . |
| 6-96690 | 4/1994 | Japan . |
| 6-143634 | 5/1994 | Japan . |
| 7-110958 | 4/1995 | Japan . |
| 8-129784 | 5/1996 | Japan . |

OTHER PUBLICATIONS

"High Density Format for Optical Drives", Sperry Optical Storage Products, Sep. 9, 1986, Aug. 1986 SPIE Conference, 86–119, pps.

"Diffraction Theory of Laser Read–Out Systems for Optical Video Discs", H. Hopkins, Department of Physics, University of Reading, Reading, England, Revised Aug. 1978, J. Opt. Soc. Am., vol. 69, No. 1, Jan. 1979, pp. 4–24.

ANSI Document No. X3B11/90–003–R1, pp. 50–60.

Primary Examiner—W. R. Young
Attorney, Agent, or Firm—Antonelli, Terry, Stout & Kraus, LLP

[57] ABSTRACT

Learning marks are recorded in a learning region preceding a data recording region of the track. The positions of information recording lattice points are staggered by one lattice point between two contiguous tracks. At reading of recorded information, a two-dimensional information leakage amount is detected by the reproduced signals from a learning mark preceding a target information recording lattice point on a track, and from the information recording lattice points immediately before and after the learning mark in question. The equalization coefficients are calculated from leakage amount thus obtained. The crosstalk present in a reproduced signal for the target lattice point is removed by using this equalization coefficients and a pair of reproduced signals from intermediate lattice points which are located immediately before and after the current lattice point and which are not used to record information marks. Inter-symbol interference left in the crosstalk-removed reproduced signal is further removed by use of the reproduced signals from a plurality of information recording lattice points which are located immediately before and after the target lattice point.

36 Claims, 27 Drawing Sheets

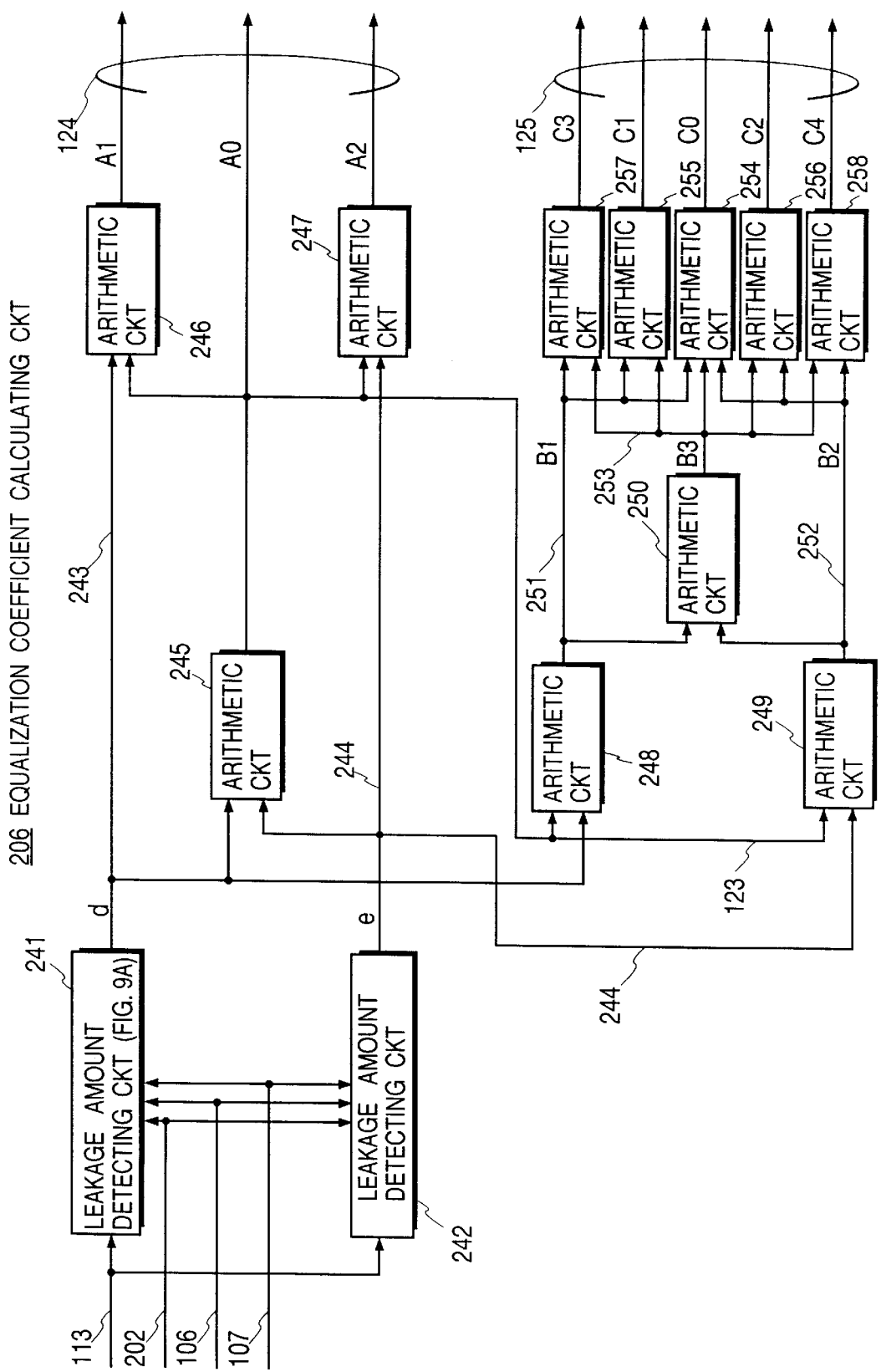

241 LEAKAGE DETECTING CKT

WAVELENGTH λ =685nm
LENS NUMERICAL
APERTURE NA=0.55
PIT DEPTH= λ /5

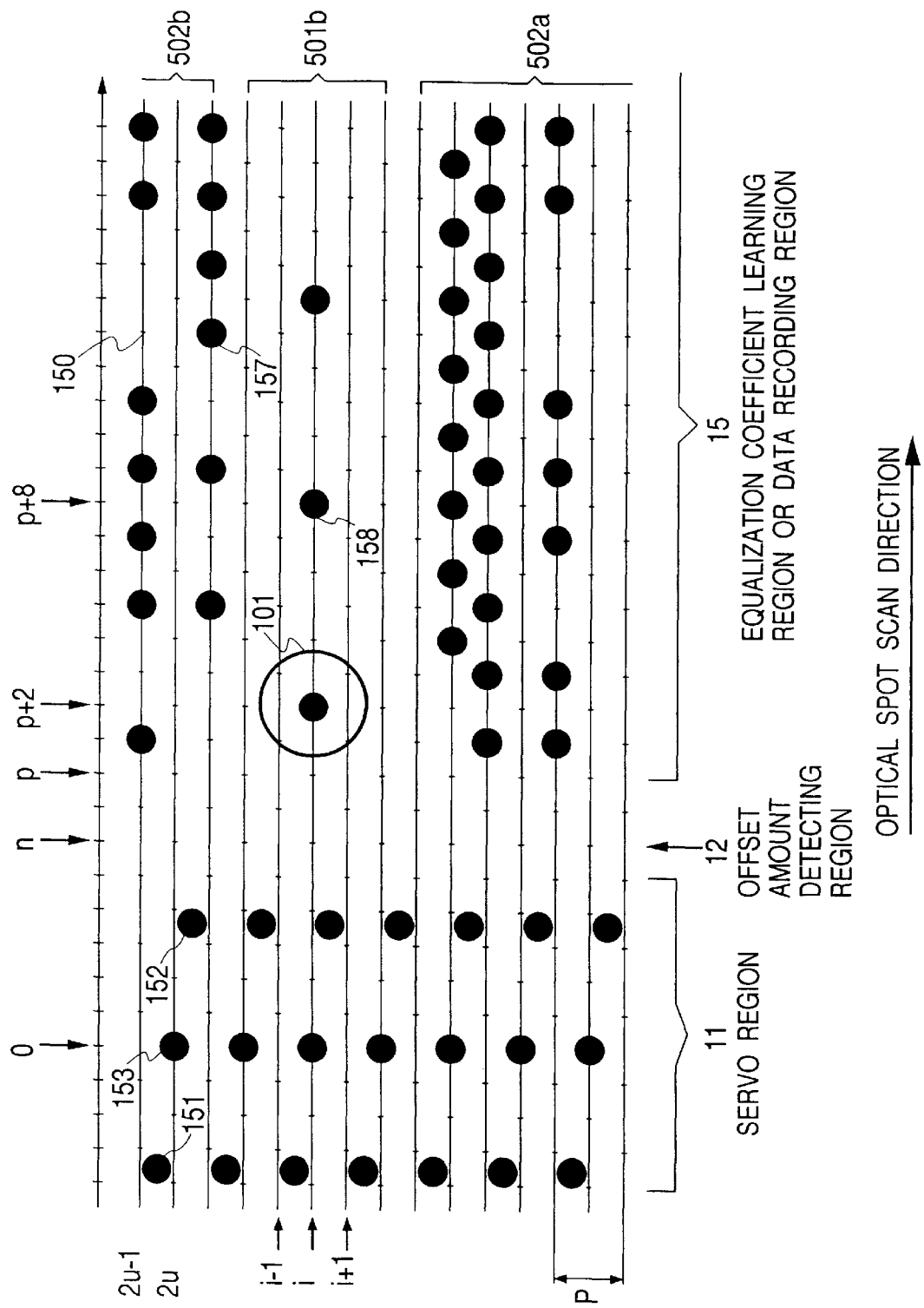

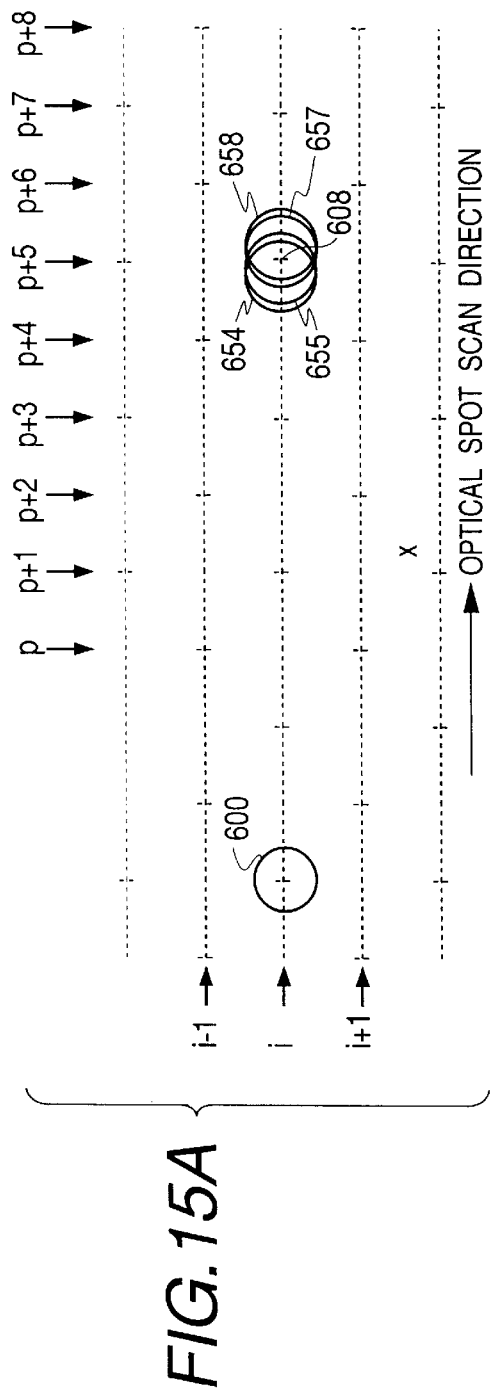
FIG.15A
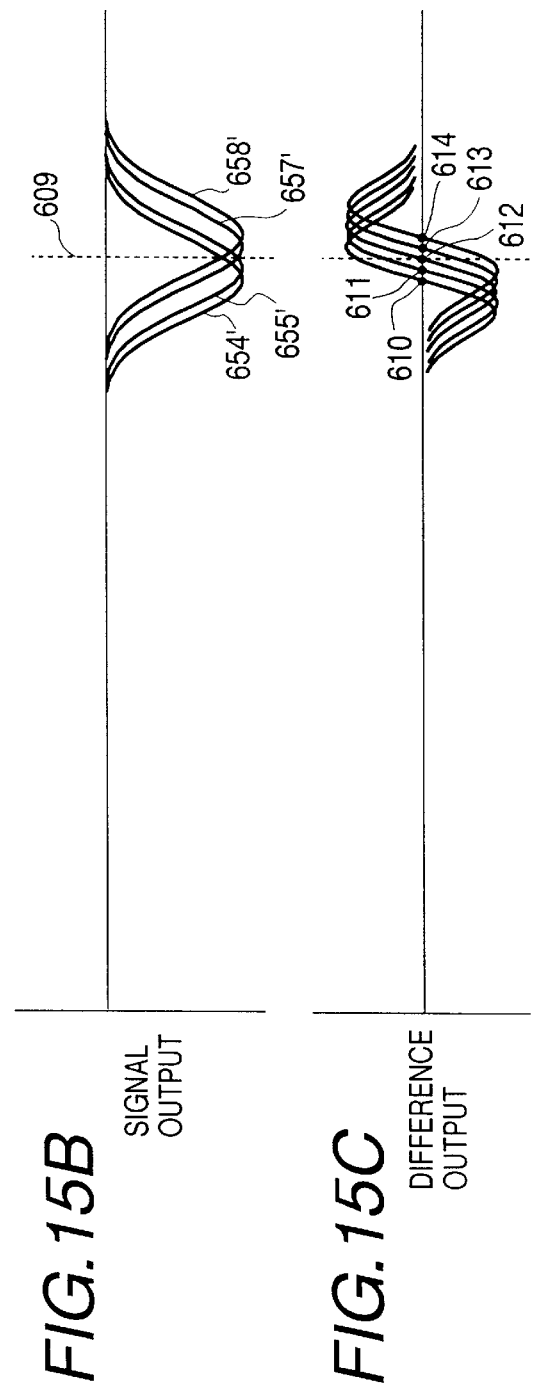
FIG.15B
FIG.15C

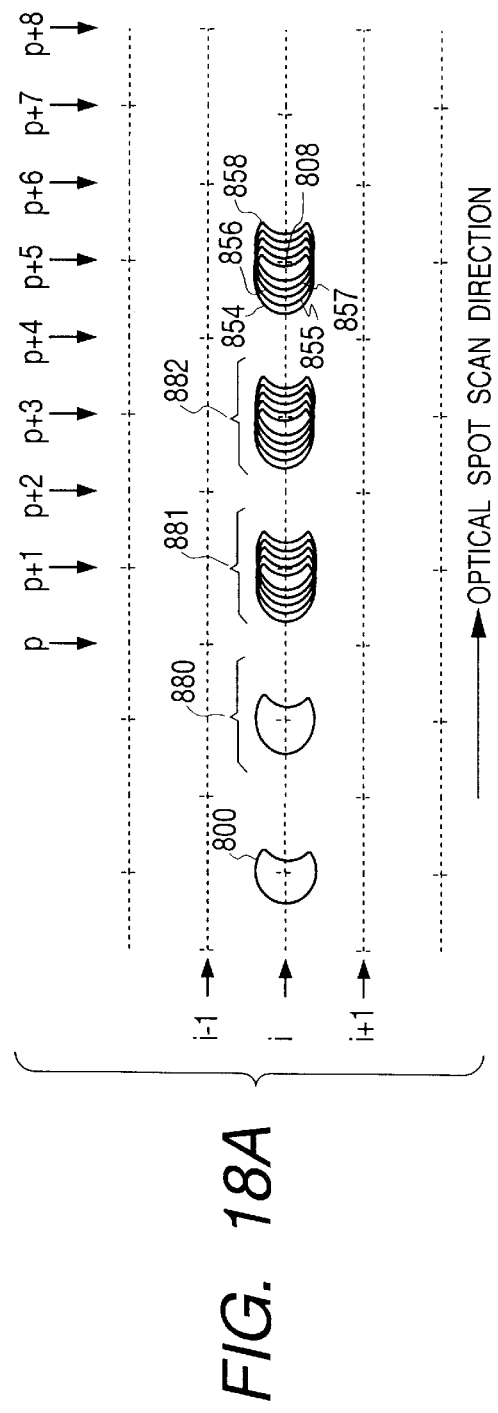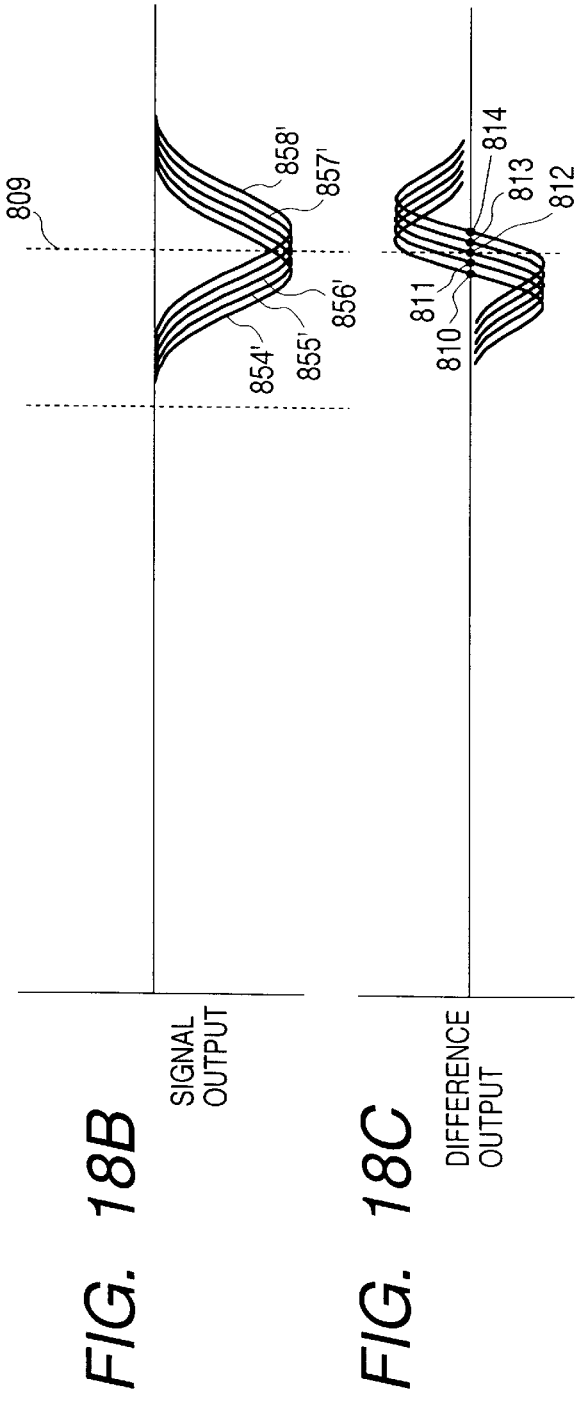
FIG. 18A
FIG. 18B
FIG. 18C

FIG. 19

| RECORDED INFORMATION PRECEDING TWO BITS | SUCCEEDING TWO BITS | 0 0 | 0 1 | 1 0 | 1 1 |
|---|---|---|---|---|---|
| 0 0 | POSITIONAL DEVIATION AMOUNT | -2Δ | -Δ | +Δ | +2Δ |
| | MULTILEVEL | "1" | "1" | "1" | "1" |
| 0 1 | POSITIONAL DEVIATION AMOUNT | 0 | 0 | 0 | 0 |
| | MULTILEVEL | "1" | "0" | "3" | "2" |
| 1 0 | POSITIONAL DEVIATION AMOUNT | -2Δ | -Δ | +Δ | +2Δ |
| | MULTILEVEL | "3" | "3" | "3" | "3" |
| 1 1 | POSITIONAL DEVIATION AMOUNT | -2Δ | -Δ | +Δ | +2Δ |
| | MULTILEVEL | "2" | "2" | "2" | "2" |

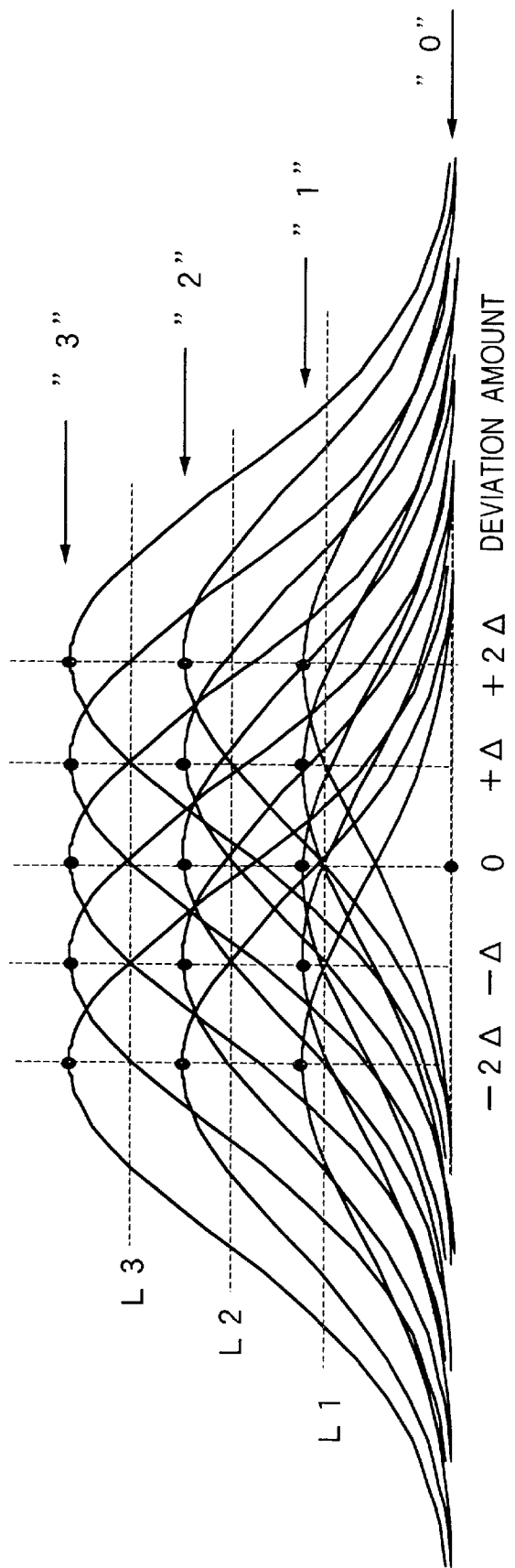

WHITE ARROW: MAGNETIC MOMENT OF RARE EARTH METAL
BLACK ARROW: MAGNETIC MOMENT OF TRANSITION METAL

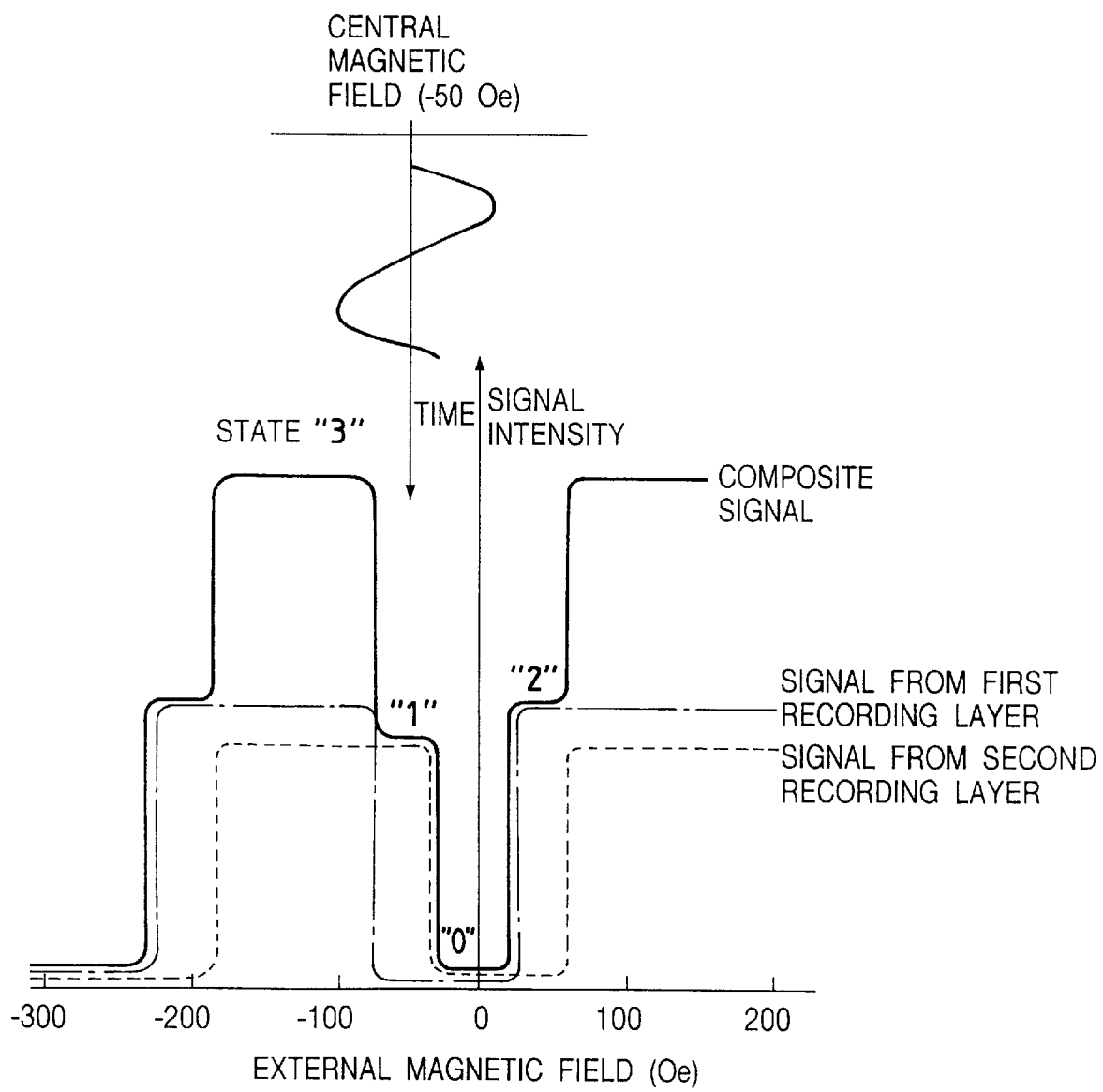

REPRODUCTION OF OPTICAL INFORMATION BY ONE-BEAM OPTICS WITH REDUCED CROSSTALK AS RECORDED IN MULTI-PHASES AND MULTI-LEVELS AT STAGGERED LATTICE POINTS, AND APPARATUS AND RECORDING MEDIUM THEREFOR

BACKGROUND OF THE INVENTION

The present invention relates to an optical information reproduction method for recording and reproducing information to and from optical recording media using a laser beam emission arrangement, as well as to an apparatus for implementing the method and media for use with the apparatus.

In general, to improve the recording density of the optical information recording medium carrying in its information tracks information marks (recorded thereto by a laser beam and reproduced therefrom by detecting optical changes reflecting the presence or absence of each of such information marks) requires achieving two things: narrowing the spacing of information tracks (i.e., track pitch), and narrowing the spacing of information marks (i.e., mark pitch) in the optical spot scan direction. However, reducing the track pitch and mark pitch has traditionally entailed a problem. That is, the optical spot directed at one information mark tends to illuminate not only the target mark but also part of other information marks nearby. The result is that signals of the nearby information marks leak two-dimensionally into the signal of the target information mark to be reproduced. The leakage interferes as a noise component and lowers the fidelity of reproduction. It follows that the usable track pitch and mark pitch are restricted by the diameter of the optical spot being used.

Japanese Patent Laid-Open No. Hei 2-257474 discloses a technique to make the track pitch and mark pitch smaller. The disclosed technique involves the use of two-dimensional equalization to cancel the leakage component caused by two-dimensional information leakage. More specifically, the technique presupposes that information is recorded at predetermined lattice points on a recording medium. The method for tracking optical spots adopts the so-called discrete block servo format (abbreviated to the DBF hereunder). Traditionally, the DBF is characterized by the ease of detecting tracking signals and the stability in detecting clock signals while data is being recorded or reproduced to or from the medium. All timings are detected using clock pits written on the disk. This makes it possible to record information marks accurately at two-dimensional lattice points. Upon reproduction of information, reproduced signals from lattice points of three contiguous tracks i−1, i and i+1 are used as the basis for signal processing. The scheme is designed to reduce both information leakage from the adjacent tracks into the reproduced signal from the target track i (crosstalk) and the leakage from the target track i itself (inter-symbol interference).

In the signal processing by the above conventional technique, one optical beam is used first to reproduce signals from the tracks i−1 and i consecutively. The reproduced signals are stored in three memories. Then while the signal of the track i+1 is being reproduced by the optical beam, three transversal filters corresponding to the tracks i−1, i and i+1 reduce the inter-symbol interference therebetween. After this, the reproduced signals from the three tracks i−1, i and i+1 are added up by adders so as to lower the two-dimensional leakage of the reproduced signal from the track i.

Japanese Patent Laid-Open No. Hei 5-205280 discloses another technique for crosstalk reduction. The disclosed technique involves providing a plurality of crosstalk detection regions on the recording medium. Tracks in the crosstalk detection regions each accommodate crosstalk detection pits in such a way that the pits will not interfere with one another. Prior to information reproduction, three optical spots are used simultaneously to reproduce signals from the crosstalk detection pits on the target track from which to reproduce information, and signals from the crosstalk detection pits on the tracks adjacent to the target track. The reproduced signals thus acquired are used as the basis for learning the amount of crosstalk from the adjacent tracks. When information marks to be reproduced are being read, the target track and a pair of tracks adjacent thereto are illuminated by the three optical spots. The crosstalk leaking into the reproduced signal of the target track from the two tracks adjacent thereto is removed by use of the reproduced signals from the two adjacent tracks as well as the crosstalk amount learned in the manner described.

Another technology was proposed in an ANSI document in order to attain high recording density, where information mark recording positions are changed every track, so that information recording positions on tracks of even track numbers along a track extending direction are located at midway of information recording positions on tracks of odd track numbers along a track extending direction.

Meanwhile, methods have been proposed to change minutely the information marks recorded by multi-valued dependency in order to enhance the recording density of optical disks. One such method is disclosed in Japanese Patent Laid-Open No. Hei 6-76303 whereby the front and rear edges of each long mark are changed independently in accordance with the multi-level information to be recorded. The disclosed method is applied to read-only optical disks carrying relief patterns of bumps and depressions representing information marks. The track pitch on the disk is of a size comparable to that of the optical spot for conventional optical disks. The track pitch arrangement is designed to reduce crosstalk from tracks adjacent to the target track. Multi-level recording media are disclosed illustratively in Japanese Patent Laid-Open No. Sho 64-32442 as well as in Japanese Patent Laid-Open No. Hei 3-5932. This kind of media is composed of multiple magneto-optical recording films stacked in layers, each layer being magnetically independent of one another. The multiple levels are the sum of signal levels determined by the multiple layers. Illustratively, four values are represented by four layers of recording films.

SUMMARY OF THE INVENTION

One problem with the conventional techniques for adapting signal processing to reduce crosstalk from adjacent tracks is that the apparatus for implementing such techniques tends to be structurally complicated. For example, although the above technique disclosed in Japanese Patent Laid-Open No. Hei 2-257474 uses the simply-structured one-beam optics, it requires the memories and three transversal filters in order to maintain the intensity of reproduced signals from three tracks. Such a constitution increases hardware costs. The technique disclosed in Japanese Patent Laid-Open No. Hei 5-205280 requires using the very complicated optics with as many as three optical spots in order to reduce crosstalk from adjacent tracks. In addition, the absence of clock signals in synchronism with the crosstalk detection pits makes it impossible to find reproduced signal detection points before or after the crosstalk detection pits.

This means an inability to detect the amount of inter-symbol interference from the target track.

The conventional technique for enhancing the recording density of the medium by recording thereto information marks representing multi-level information requires recording those information marks which are changed minutely in accordance with the target multi-level information. With this technique, it is difficult accurately to record or reproduce those minutely varied information marks. Overall, the conventional techniques involve the use of optical disks bearing marks whose shapes and positions represent information. If each mark on the disk is elliptical, the parameters determining the shape of the mark comprise the curvature and width of its front edge, the curvature and width of its rear edge, the positions of the front and rear edges, and the distance between the front and the rear edge. The more parameters used to determine the shape of each mark, the more information represented by that mark. It also becomes increasingly difficult to control the growing number of shape-determining parameters. In particular, relief patterns of bumps and depressions when manufactured pass through a plurality of processes including the cutting of a master, stamping and injection. The multiple manufacturing processes slightly alter the above-mentioned parameters and make it difficult precisely to control the shape and position of each mark. An optical spot with two-dimensional light distribution is used to scan the marks having the shape-related parameters for conversion into one-dimensional electrical signals. The waveforms of these signals are suitably processed to detect the minute changes in the edge positions of the marks. With this arrangement, the change of any parameter other than that of the edge position change is also regarded erroneously as representing a positional change. This makes it difficult stably to detect information by use of the conventional technique for minutely relocating the edges of the long marks. Furthermore, the optical disk drive apparatus for recording and reproducing information generates apparatus-specific fluctuations (power level fluctuation, focusing error, tracking error, recording sensitivity irregularities of the medium, etc.) during the recording process. With the recording conditions thus varied, the shapes of recording marks are further affected and changed. In this respect, it is not feasible to apply the conventional technique of minutely relocating the edges of long marks to the optical disk drive apparatus for recording and reproducing information.

As mentioned, the multi-level recording medium proposed for conventional optical disks is composed of multiple recording layers corresponding to the multiple levels involved, each layer being magnetically independent of one another. The recording status of each of the layers is suitably controlled to acquire multiple levels. This scheme, however, requires stacking as many as four layers if four-level information recording is desired. As such, the scheme is difficult to implement. See, for example, Japanese Patents Laid-Open Nos. Sho 64-32442 and Hei 3-5932.

It is therefore an object of the present invention to provide an optical information reproduction method and an apparatus for use therewith, wherein a one-beam optics is used to scan tracks for signal reproduction therefrom in a simply-structured setup in such a manner that the crosstalk from tracks adjacent to the target track is reduced.

It is another object of the present invention to provide an optical information reproduction method and an apparatus for use therewith, whereby inter-symbol interference is further removed from the crosstalk-reduced reproduced signal.

It is a further object of the present invention to provide an optical information reproduction method for accurately reproducing information marks representing multi-level information that was recorded with precision.

It is an even further object of the present invention to provide an optical information recording and reproducing method for recording and reproducing multi-level information onto a recording medium having a small number of recording layers.

In achieving one of the foregoing objects of the present invention to use the simply-structured circuitry for signal reproduction so as to reduce crosstalk from adjacent tracks, an optical information recording medium used in the present invention has plural tracks on which information recording lattice points are positioned so that the positions in the track extending direction of information recording lattice points on tracks of odd track numbers are located at midway of the positions in the track extending direction of information recording lattice points on tracks with even track numbers. A selected information recording lattice points from among the information recording lattice points of the multiple tracks accommodate information marks.

In reading information, one optical spot is used to scan one of the tracks. A reproduced signal is generated from one of the information recording lattice points having been scanned on the target track. From this reproduced signal, a crosstalk component leaking from a pair of tracks adjacent to the target track into the signal from the track in question is removed therefrom by use of a pair of signals generated from a pair of intermediate points immediately before and after that information recording lattice point in question on the target track. After removal of the crosstalk component from the reproduced signal, the circuitry detects information which is recorded at each information recording lattice point in question.

Preferably, the inter-symbol interference left behind in the reproduced signal after removal of the crosstalk component therefrom is eliminated using reproduced signals from nearby information recording lattice points on the target track before and after each information recording lattice point in question.

In achieving another of the foregoing objects of the present invention accurately to reproduce information marks representing multi-level information that was recorded with precision, there is provided an optical information reproduction method utilizing an optical disk carrying marks of only a circular shape representing a minimum of shape-related parameters. The center position of each of the marks is changed minutely so that the amounts of that change will represent information. Because the marks are circular, relief patterns of bumps and depressions develop symmetrical changes in the mark shape during the shaping process (e.g., when contracted or enlarged through injection). The circular shapes remain intact and their center positions are not likely to change appreciably. In the read-write optical disk drive apparatus, the shape of each circular mark remains intact and its center position varies very little even if the level of recording power and the sensitivity of recording films fluctuates; only the diameter of each mark varies. Where such fluctuations of characteristics do occur, each piece of information is represented by the position of each of the singly shaped round marks and any discrepancies between such marks are uniform. The discrepancies are thus easy to correct by use of reference marks.

According to the invention, it is possible to employ a medium such that not only the mark displacements but also optical characteristics of the marks represent multiple reproduced signal levels. This provides further improvements in the density of recorded information.

Furthermore, the invention envisages the use of gaps between a plurality of magnetically connected recording films constituting a recording medium having a minimum of recording layers in which to record multi-level information. Given the multi-level information to be recorded, an externally applied magnetic field, the power of emitted light and timings of emitting the light are varied so as to implement the magnetical connection relation and a recording position corresponding to the target multi-level information to be recorded.

BRIEF DESCRIPTION OF THE DRAWINGS

FIG. 8 is a block diagram of an equalization coefficient calculating circuit (206) used in the equalization coefficient learning circuit of FIG. 7;

FIG. 11B is a view depicting typical information recorded on the optical information recording medium of FIG. 11A;

FIG. 15A is a view showing in an overlapping manner a plurality of information marks that may be recorded to various information recording lattice points;

FIG. 15B is a view of waveforms of reproduced signals from a plurality of information marks that may be recorded to one of the information recording lattice points shown in FIG. 15A;

FIG. 15C is a view of signals obtained by differentiating the multiple reproduced signals shown in FIG. 15B;

FIG. 18A is a view depicting a plurality of information marks recorded by another optical information recording and reproduction method practiced as another embodiment of the invention;

FIG. 18B is a view of waveforms of reproduced signals from a plurality of information marks that may be recorded to one of the information recording lattice points shown in FIG. 18A;

FIG. 18C is a view of signals obtained by differentiating the multiple reproduced signals shown in FIG. 18B;

FIG. 19 is a view showing typical relationships among information to be recorded, the multiple levels of the signals to be recorded to the information marks of FIG. 18, and the positions of these recorded information marks;

FIG. 20 is an eye pattern view of the information marks recorded within the framework of the relationships shown in FIG. 19;

FIG. 29 is a view depicting typical relationships between external magnetic fields and the levels of reproduced signals, the external magnetic fields with a DC bias being applied to the multi-level recording medium of FIG. 21A, the signal levels being derived from the signals reproduced from the first and the second recording layer inside the recording medium upon application of the magnetic field thereto.

DESCRIPTION OF THE PREFERRED EMBODIMENTS

Figure 1:
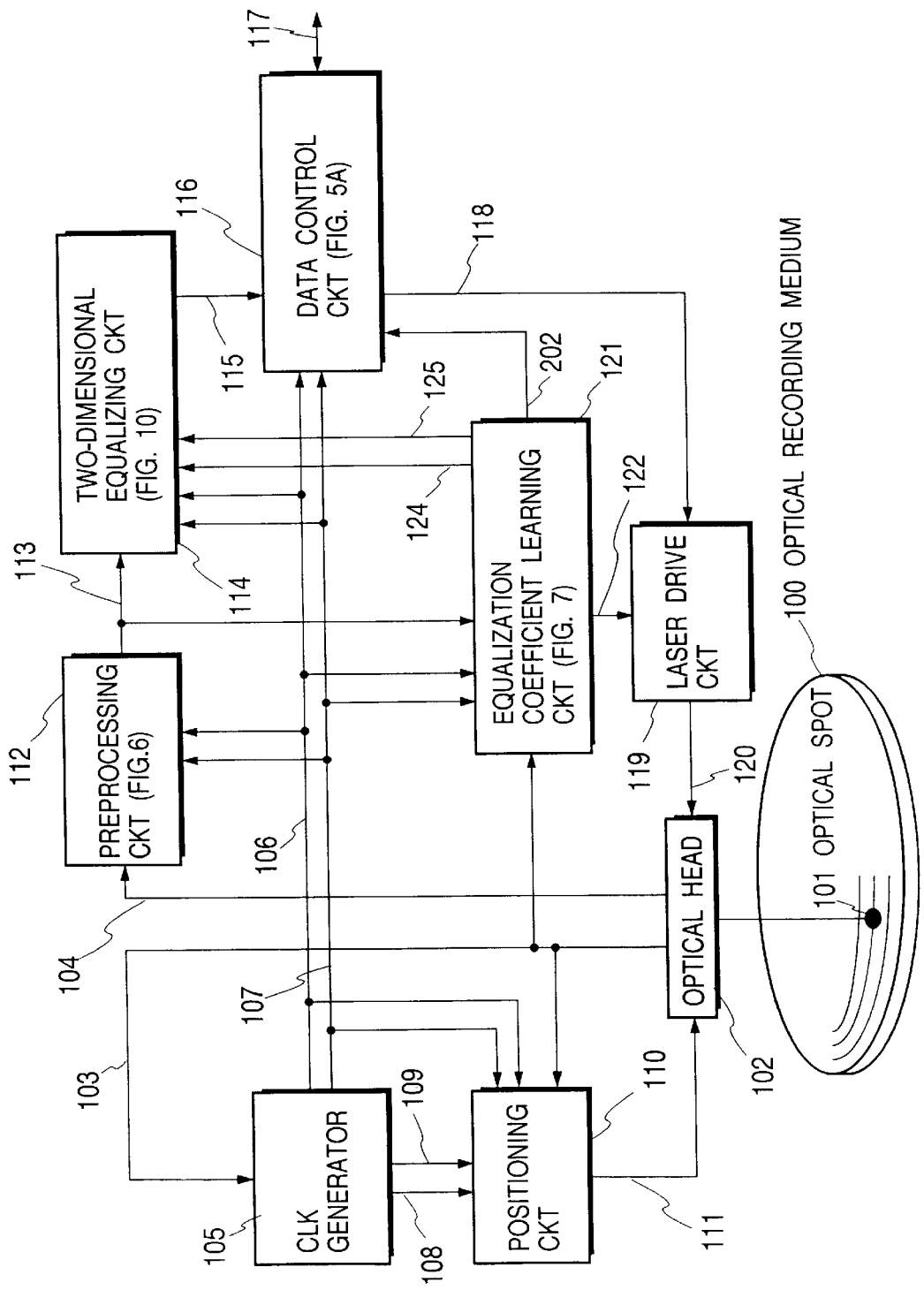
FIG. 1 is a block diagram of an optical information recording and reproducing apparatus practiced as an embodiment of the invention.

The inventive optical information recording and reproduction method as well as the apparatus and optical information recording medium for use therewith will now be described in detail in the form of preferred embodiments with reference to the accompanying drawings. In the description that follows, like reference numerals represent like or corresponding parts. The second and subsequent embodiments will be described with emphasis on their differences from the first embodiment.

First Embodiment
(1) Outline of the apparatus

FIG. 1 is a block diagram of an optical information recording and reproducing apparatus (hereinafter referred to as the optical disk apparatus) practiced as the first embodiment of the invention.

The optical disk apparatus comprises an optical information recording medium (hereinafter called the optical recording medium) 100 mounted on a disk drive, not shown. An optical head 102 that emits an optical spot 101 onto the optical recording medium 100 when recording information or reproducing what is recorded. A clock generator 105 that generates signals in synchronism with the revolutions of the optical recording medium 100; a positioning circuit 110 that tracks the optical spot 101 in accordance with a synchronizing signal from the clock generator 105. A data control circuit 116 which modulates user data to be recorded at recording time and which outputs recorded data at reproduction time by putting a reproduced signal 104 into binary format and demodulating it. A laser drive circuit 119 that modulates the intensity of the optical spot based on the modulation signal from the data control circuit 116 so as to record the modulated data to the optical recording medium 100. A preprocessing circuit 112 that subjects to analog-digital conversion (called A/D conversion hereunder) a reproduced signal acquired when the optical spot 101 scans a track, thereby reducing an offset component contained in the reproduced signal. A two-dimensional equalizing circuit 114 that lowers two-dimensional leakage on the basis of an output signal from the preprocessing circuit 112, and an equalization coefficient learning circuit 121 that acquires optimum equalization coefficients for use by the two-dimensional equalizing circuit 114 with the optical recording medium mounted on the optical disk apparatus.

The two-dimensional equalizing circuit 114 is characterized by its ability to remove crosstalk from adjacent tracks in the following manner: while information is being reproduced from one track of the optical recording medium 100, the reproduced light from the target position of the track (wherein exists each recorded information mark) under the optical spot 101 contains crosstalk from tracks adjacent to the target track. That crosstalk is removed by use of the reproduced light from positions near the reproduction position under the optical spot where information marks are absent. The two-dimensional equalizing circuit 114 further removes inter-symbol interference left in the crosstalk-removed signal, the interference stemming from different information marks within the target track.

Figure 2:
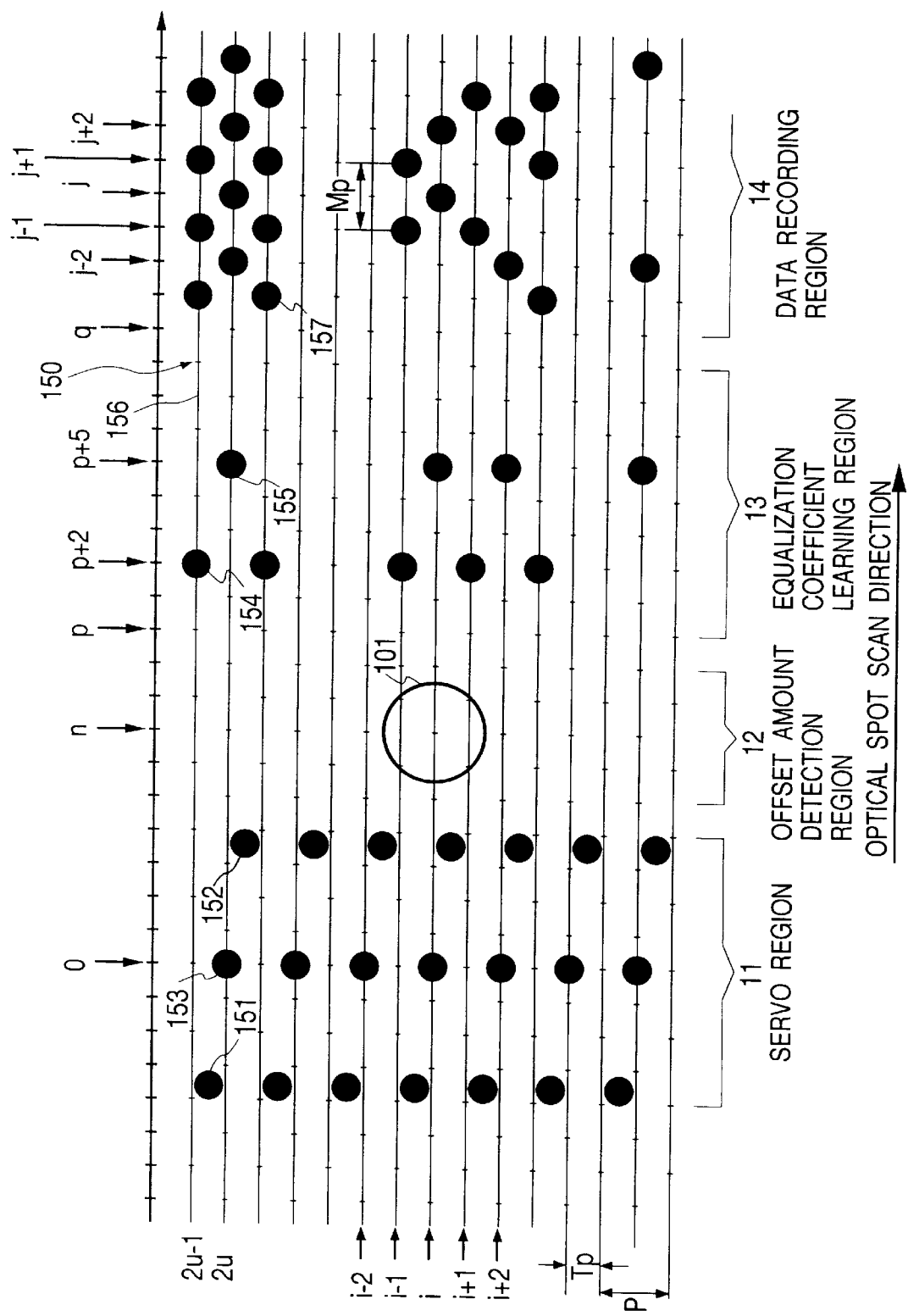
FIG. 2 is a view showing typical information recorded on an optical information recording medium for use with the embodiment of FIG. 1.

These features are implemented partly by use of the optical recording medium 100 having information marks recorded thereon as shown in FIG. 2. FIG. 2 illustrates various regions included in a plurality of sectors on the optical recording medium 100. An information mark 157 is recorded to a data recording region 14 when a piece of user data is 1. The information mark 157 may be recorded to one of lattice points scanned at equal time intervals while the optical recording medium 100 is rotating. With the first embodiment, an information mark 157 may be recorded to every other lattice point (which is called in the present embodiment a lattice point of the first kind or information recording lattice point) on the same track. Information marks 157 are not recorded to the other lattice points (which are called in the present embodiment lattice points of the second kind or intermediate points) on the track. In addition, the lattice points of the first kind are established in such a way that the track direction positions of the first-kind lattice points on each even-numbered track where information marks may be recorded are staggered by one lattice point from the track direction positions of the first-kind lattice points on each odd-numbered track capable of accommodating information marks. In FIG. 2, short vertical lines attached on the top track indicate both information recording lattice points and intermediate points, while the short vertical lines such as 150 shown on the tracks except the top track indicate only information recording lattice points. An intermediate point such as shown by 156 does not have any short vertical line attached.

Arrangement itself of the staggered information recording lattice points as shown in FIG. 2 is known for high recording density, but the present embodiment uses this arrangement to effectively remove crosswalks from a signal reproduced by one beam optics.

An equalization coefficient learning region 13 has learning marks 154 and 155 recorded therein. The learning marks 154 and 155 are used by the two-dimensional equalizing circuit 114 to calculate equalization coefficients employed for equalization. The learning marks 154 and 155 are recorded on an even-numbered and an odd-numbered track, respectively, and are separated so as not to develop interference therebetween. A servo region 11 is used for execution of high-precision tracking under the optical spot 101, and has a clock mark 153 and wobble marks 151 and 152 recorded therein. An offset amount detection region 12 is used to prevent tracking error from adversely affecting the calculation of equalization coefficients.

(2) Principles of equalization by the first embodiment

Prior to a detailed description of the first embodiment, the principles of equalization performed thereby will now be described. Suppose that in FIG. 3, a lattice point j on a track i is represented by coordinates (i, j). In that case, the lattice point (i, j) is surrounded by eight adjacent lattice points (i−1, j−1), (i−1, j), (i−1, j+1), (i, j−1), (i, j+1), (i+1, j−1), (i+1, j) and (i+1, j+1). When the optical spot 101 illuminates the lattice point (i, j), information marks that may exist at some of these adjacent lattice points are also illuminated partially. This results in crosstalk, i.e., a leakage of information from the laterally illuminated lattice points on the adjacent tracks.

Figure 3:
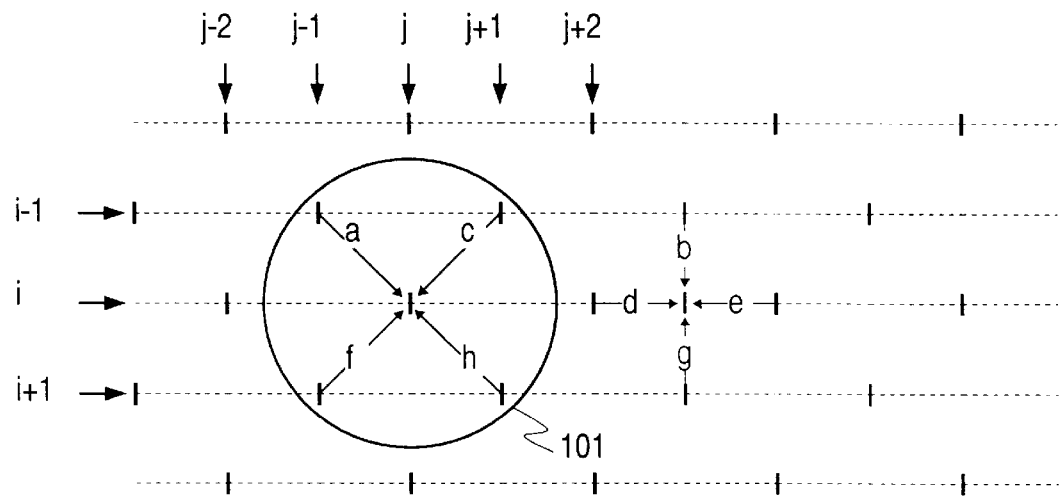
FIG. 3 is a view for explaining amounts of information leakage occurring in the embodiment of FIG. 1.

For example, if the lattice point (i, j) has an isolated mark, a signal S(i, j) is generated therefrom. On the other hand, if the lattice point (i−1, j−1) has an isolated mark, a signal a·S(i−1, j−1) leaks from this mark into the lattice point (i, j). Likewise, if the lattice point (i−1, j) has an isolated mark, a signal b·S(i−1, j) leaks from this mark into the lattice point (i, j). If the lattice point (i−1, j+1) has an isolated mark, a signal c·S(i−1, j) leaks from this mark into the lattice point (i, j). If the lattice point (i, j−1) has an isolated mark, a signal d·S(i, j−1) leaks from this mark into the lattice point (i, j). If the lattice point (i, j+1) has an isolated mark, a signal e·S(i, j+1) leaks from this mark into the lattice point (i, j). If the lattice point (i+1, j−1) has an isolated mark, a signal f·S(i+1, j−1) leaks from this mark into the lattice point (i, j). If the lattice point (i+1, j) has an isolated mark, a signal g·S(i+1, j) leaks from this mark into the lattice point (i, j). If the lattice point (i+1, j+1) has an isolated mark, a signal h·S(i+1, j+1) leaks from this mark into the lattice point (i, j). As shown in FIG. 3, reference characters a through h each represent the amount of information leakage from an adjacent lattice point, the value of the leakage amount being smaller than 1. The arrows accompanying the reference characters a through h each denote where the leakage of information comes from and do not indicate the magnitude of such leakage. Illustratively, consider a reproduced signal S'(i, j) which is obtained from the lattice point (i, j) in FIG. 2 and which is subject to interference from adjacent information marks. In that case, the signal may be expressed by use of the amounts of information leakage indicated in FIG. 3, as follows:

$$S'(i, j) = S(i, j) + a \cdot S(i-1, j-1) + b \cdot S(i-1, j) + \quad (1)$$
$$c \cdot S(i-1, j+1) + d \cdot S(i, j-1) + e \cdot S(i, j+1) +$$
$$f \cdot S(i+1, j-1) + g \cdot S(i+1, j) + h \cdot S(i+1, j+1)$$

where, S(i, j) is the level of the reproduced signal in effect when a single information mark exists at the lattice point (i, j) with no information marks located adjacent thereto (this level is called the isolated signal hereunder). For purpose of simplification and illustration, it is assumed that the level S(i, j) is 1 when an information mark exists at the lattice point (i, j) and that S(i, j) is 0 when no information mark exists at (i, j). In the expression (1) above, the crosstalk from the adjacent lattice points is represented by the terms a·S(i−1, j−1)+b·S(i−1, j)+c·S(i−1, j+1)+f·S(i+1, j−1)+g·S(i+1, j)+h·S(i+1, j+1).

Meanwhile, consider a reproduced signal S'(i, j−1) which is obtained from the lattice point (i, j−1) and which is subject to interference from adjacent information marks, as well as a reproduced signal S'(i, j+1) which is acquired from the lattice point (i, j+1) and which is also subject to interference from adjacent information marks. In this case, the two signals may be expressed as follows:

$$S'(1, j-1) = S(i, j-1) + a \cdot S(i-1, j-2) + b \cdot S(i-1, j-1) + \quad (2)$$
$$c \cdot S(i-1, j) + d \cdot S(i, j-2) + e \cdot S(i, j) + f \cdot S(i+1, j-2) +$$
$$g \cdot S(i+1, j-1) + h \cdot S(i+1, j)$$

$$S'(i, j+1) = S(i, j+1) + a \cdot S(i-1, j) + b \cdot S(i-1, j+1) + \quad (3)$$
$$c \cdot S(i-1, j+2) + d \cdot S(i, j) + e \cdot S(i, j+2) + f \cdot S(i+1, j) +$$
$$g \cdot S(i+1, j+1) + h \cdot S(i+1, j+2)$$

If the condition S(i−1, j−2)=S(i−1, j)=S(i−1, j+2)=S(i, j−1)=S(i, j+1)=S(i+1, j−2)=S(i+1, j)=S(i+1, j+2)=0 always holds, then the crosstalk from the adjacent tracks included in the expression (1) above can be removed by use of the expressions (2) and (3). That is, the condition above is met if the lattice points that may accommodate information marks are arranged in a face-centered rectangular lattice pattern as shown in FIG. 2. This allows the crosstalk from the adjacent tracks to be removed without utilizing reproduced signals therefrom. This process is described below in more detail.

Where the lattice points that may accommodate information marks are arranged in the face-centered rectangular lattice pattern, the expressions (1) through (3) above may be transformed into expressions (1-1) through (3-1) as follows:

$$S'(i, j) = S(i, j) + a \cdot S(i-1, j-1) + c \cdot S(i-1, j+1) + \quad (1\text{-}1)$$
$$f \cdot S(i+1, j-1) + h \cdot S(i+1, j+1)$$

$$S'(1, j-1) = \quad (2\text{-}1)$$
$$b \cdot S(i-1, j-1) + d \cdot S(i, j-2) + e \cdot S(i, j) + g \cdot S(i+1, j+1)$$

$$S'(i, j+1) = \quad (3\text{-}1)$$
$$b \cdot S(i-1, j+1) + d \cdot S(i, j) + e \cdot S(i, j+2) + g \cdot S(i+1, j+1)$$

In the expression (1-1), the terms a·S(i−1, j−1)+c·S(i−1, j+1)+f·S(i+1, j−1)+h·S(i+1, j+1) represent the crosstalk which leaks from the adjacent lattice points and which is in force when the lattice points that may accommodate information marks are arranged in the face-centered rectangular lattice pattern. Among the amounts of information leakage a through h, there hold substantially the relations a=b·d, c=b·e, f=g·d, h=g·e Thus the expressions (2-1) and (3-1) may be transformed into expressions (2-2) and (3-2) as follows:

$$S'(i, j-1) = d \cdot S(i, j-2) + \quad (2\text{-}2)$$
$$c \cdot S(i, j) + (a \cdot S(i-1, j-1) + f \cdot S(i+1, j-1))/d$$

$$S'(i, j+1) = d \cdot S(i, j) + \quad (3\text{-}2)$$
$$e \cdot S(i, j+2) + (c \cdot S(i-1, j+1) + h \cdot S(i+1, j+1))/e$$

If the expression (2-2) is multiplied by d and the expression (3-2) by e, the crosstalk components a·S(i−1, j−1), c·S(i−1, j+1), f·S(i+1, j−1) and h·S(i+1, j+1) involved in the expression (1-1) become known. Thus, the crosstalk from the adjacent tracks is removed by performing the operation of "expression (1-1)−d·expression (2-2)−e·expression (3-2)". That is, $$S''(i, j)=A0 \cdot S'(i, j)+A1 \cdot S(i, j-1)+A2 \cdot S(i, j+1) \quad (4)$$

where, A0=1/(1−2d·e)

A1=−d/(1−2d·e)

A2=−e/(1−2d·e).

Performing the expression (4) results in the following expression:

$$S''(i, j)=S(i, j)-A0 \cdot (\text{square } (d) \cdot S(i, j-2)+\text{square } (e) \cdot S(i, j+2)) \quad (5)$$

where, the notation "square (d), etc.", represents d, etc., squared.

Because the expression (5) concerns only the target track i as indicated, it can be seen that the crosstalk from the adjacent tracks i−1 and i+1 is completely removed by performing the expression (4). Even with the crosstalk removed, however, there still remains inter-symbol interference from the lattice points (i, j−2) and (i, j+2) regarding the target lattice point (i, j). For example, if the lattice spacing T and track pitch Tp are about 50% of the spot size each, then b=d=e=g=0.2 (approx.) and a=c=f=h=0.04 (approx.). In that case, the maximum inter-symbol interference is about 0.09.

The inter-symbol interference above is lowered illustratively by use of a transversal filter with five taps based on the following calculation:

$$S'''(i, j) = C0 \cdot S''(i, j) + C1 \cdot S''(i, j-2) + \quad (6)$$
$$C2 \cdot S''(i, j+2) + C3 \cdot S''(i, j-4) + C4 \cdot S''(i, j+4)$$

where, B=1/(1−3 square (d·e/(1−2d·e)))
C0=B·(1−square (d·e/(1−2d·c)))
C1=−B·Square (d)/(1−2d·e)
C2=−B·Square (e)/(1−2d·e)
C3=B·Square (square (d)/(1−2d·e))
C4=B·Square (square (e)/(1−2d·e))

The calculation above results in the expression:

$$S'''(i, j) = S(i, j) + D1 \cdot S(i, j-6) + D2 \cdot S(i, j+6) \quad (7)$$

where, D1=B·cube (C1) and D2=B·cube (C2). The notation "cube (C1), etc.", represents C1, etc., cubed. For example, if the lattice spacing T and track pitch Tp are about 50% of the spot size each, then b=d=e=g=0.2 (approx.) and a=c=f=h=0.04 (approx.). In that case, the maximum inter-symbol interference is about 0.0002.

If a transversal filter with a different number of taps is used, similar calculations may be performed in accordance with the tap count. Illustratively, the expression (6) is transformed into the following expression (6a) if a transversal filter with three taps is used, or into the following expression (6b) if a seven-tap transversal filter is employed:

$$S'''(i, j) = S''(i, j) + G1 \cdot S''(i, j-2) + G2 \cdot S''(i, j+2) \quad (6a)$$

where, F=1/(1−2 square (d·e/(1−2d·e)))
G1=−F·(square (d)/(1−2d·e))
G2=−F·(square (e)/(1−2d·c))

$$S'''(i, j) = Z0 \cdot S''(i, j) + \quad (6b)$$
$$Z1 \cdot S''(i, j-2) + Z2 \cdot S''(i, j+2) + Z3 \cdot S''(i, j-4) +$$
$$Z4 \cdot S''(i, j+4) + Z5 \cdot S''(i, j-6) + Z6 \cdot S''(i, j+6)$$

where, Y=1/(1−4C1·C2+2 square (C1)·square (C2))
Z0=Y·(1−2C1·C2)
Z1=−Y·(C1·(1−C1.C2))
Z2=−Y·(C2·(1−C1.C2))
Z3=Y·square (C1)
Z4=Y·square (C2)
Z5=−Y·cube (C1)
Z6=−Y·cube (C2)

The amounts of leakage a through h shown in FIG. 3 vary at recording time depending on those changes in the shapes and positions of recorded marks which are caused by variations in the optical spot shape as well as by fluctuations in recording power level, recording clock timing, focusing and tracking. The leakage amounts also vary at reproduction time depending on the changes in the optical spot shape as well as on the fluctuations in tracking, focusing and sampling clock timing. Thus in the case of the first embodiment, amounts of leakage information are measured with an optical information medium mounted on the actual optical disk apparatus. Where the changes are sufficiently small or negligible, it is possible to use equalization coefficients measured beforehand on an experimental basis upon shipment of the optical disk apparatus.

Before amounts of information leakage are measured with an optical information recording medium mounted on the actual optical disk apparatus, a predetermined group of marks (mark column pattern) should be recorded beforehand in predetermined positions on the medium. Prior to information reproduction, the mark column pattern is reproduced by use of the optical spot. The signal reproduced from the mark column pattern is used as the basis for learning amounts of leakage. Because the relations a=b·d, c=b·e, f=g·d and h=g·e approximately hold as described above, two-dimensional leakage is reduced by performing the calculations of the expressions (4) and (6). At this point, as evident from the expressions (4) and (6), the equalization coefficients for multiplying each reproduced signal are a function of d and c only. Therefore the amounts d and e need only be learnt as the amounts of leakage, the learnt values being used as the basis for calculating the equalization coefficients. The same holds for the expressions (6a) and (6b) in which the equalization coefficients are a function of leakage amounts d and e.

Below is a description of how the amounts of leakage d and e are to be learnt. First, how to record learning marks will be described using the typical equalization coefficient learning region shown in FIG. 2. The learning marks for learning equalization coefficients are arranged in the direction of optical spot scan, distanced from on e another sufficiently to prevent interference therebetween. Suppose that the track i is an even-numbered track. In that case, as shown in FIG. 2, a learning mark 155 is recorded to a lattice point (i, p+5) on the even-numbered track i; a learning mark 154 is recorded to each of lattice points (i−1, p+2) and (i+1, p+2) on the odd-numbered tracks i−1 and i+1. Reference character p is a value indicating t he starting position of the learning region.

How to learn leakage amounts d and e will now be described with reference to FIG. 2. On the even-numbered track i, the learning mark 155 is recorded at the lattice point (i, p+5). Thus the amount of leakage d is obtained as the ratio of a reproduced signal S'(i, p+6) from the lattice point (i, p+6), to a reproduced signal S'(i, p+5) from the lattice point (i, p+5), i.e., as S' (i, p+6)/S'(i, p+5). On the odd-numbered track i−1, the equalization coefficient learning mark 154 is recorded at the lattice point (i−1, p+2). Thus the amount of leakage d is obtained as the ratio of a reproduced signal S'(i−1, p+3) from the lattice point (i−1, p+3), to a reproduced signal S'(i−1, p+2) from the lattice point (i−1, p+2), i.e., as S'(i−1, p+3)/S'(i−1, p+2).

On the even-numbered track i, the equalization coefficient learning mark 155 is recorded at the lattice point (i, p+5). Thus the amount of leakage e is obtained as the ratio of a reproduced signal S'(i, p+4) from the lattice point (i, p+4) to a reproduced signal S'(i, p+5) from the lattice point (i, p+5), i.e., as S'(i, p+4)/S'(i, p+5). On the odd-numbered track i−1, the equalization coefficient learning mark 154 is recorded at the lattice point (i−1, p+2). Thus the amount of leakage e is obtained as the ratio of a reproduced signal S'(i−1, p+1) from the lattice point (i−1, p+1), to the reproduced signal S'(i−1, p+2) from the lattice point (i−1, p+2), i.e., as S'(i−1, p+1)/S'(i−1, p+2). The equalization coefficients are acquired from the leakage amounts d and e that are obtained as a result of the above learning.

The equalization coefficients thus obtained are used in subjecting the reproduced signals to two-dimensional equalization. This signal processing cancels signal leakage from adjacent marks and allows information to be detected in accordance with the presence and absence of marks. By the optical information recording and reproducing method according to the invention, the positions of the lattice points at which to record information marks on each track are staggered by a half period between contiguous tracks. This lowers the amount of crosstalk at reproduction time between contiguous tracks, and eliminates the crosstalk leaking into the target track from its adjacent tracks through two-dimensional equalization of reproduced signals while minimizing the inter-symbol interference involved.

(3) Recording and reproduction of information to and from the optical recording medium For the first embodiment, the optical recording medium 100 is composed of a magneto-optical disk 100. Upon recording of information, the laser drive circuit 119 modulates the intensity of a laser beam to represent each value of the target information being 1 or 0. The magneto-optical medium 100 is driven by a spindle motor, not shown. The optical head 102 focuses the modulated laser beam onto the magneto-optical medium 100. When the optical spot 101 is emitted to the magneto-optical disk 100, the illuminated part of the disk 100 develops changes in the direction of magnetization reflecting the varying intensity of the optical spot 101. At information reproduction, the laser drive circuit 119 and optical head 102 emit an optical spot 101 at a constant intensity level to the optical recording medium 100. The optical spot 101 illuminating the optical recording medium 100 produces reflected light whose angle of polarization varies with the recorded changes in the direction of magnetization in the medium. The optical head 102 has two detectors, not shown. One detector checks to see if the reflected light is polarized in a specific direction and, whenever detecting such polarization, generates a reproduced signal (also called a magneto-optical signal) 104 whose intensity varies accordingly. The other detector of the optical head 102 detects not the polarized reflected light but the total amount of reflected light, and generates a total light amount signal 103 accordingly.

(4) Track pitch Tp, spot size Ws and mark pitch Mp

When the first embodiment reproduces information from the track i shown in FIG. 2, it can remove crosstalk coming from the tracks i−1 and i+1 adjacent to the target track using a method to be described later in detail. For this method to be effective requires that practically no crosstalk should come from any tracks farther than these adjacent tracks. Thus the track pitch Tp for the first embodiment is such that the optical spot 101 will not reproduce information recorded on the tracks i−2 and i+2.

Under constraints of the wavelength λ and numerical aperture NA of the focusing lens, the spot size Ws is about λ/NA or greater. The information mark size Wm must be large enough to ensure reproduction of signals with a sufficient S/N ratio.

When the optical spot 101 reproduces information from the track i, the minimum track pitch Tp that will not cause information to be reproduced from the adjacent tracks i−2 and i+2 is equal to the track-to-track gap in effect when the optical spot comes in tangential contact with the information marks on the tracks i−2 and i+2 (the gap: (Ws+Wm)/4). For example, suppose that the light source wavelength λ is 780 nm, the numerical aperture NA of the focusing lens is 0.55, the spot size is 1.42 $\mu$m, and the information mark size Wm is 0.5 $\mu$m. In that case, the minimum track pitch is 0.48 $\mu$m. In practice, the minimum track pitch needs to be somewhat larger than this in view of the positional deviation that occurs during tracking. With the first embodiment, the track pitch is thus set for 0.5 $\mu$m.

The mark pitch will now be described. The mark pitch is the spacing between lattice points at which contiguous information marks may be recorded on the same track. In order to remove crosstalk from adjacent tracks, the first embodiment adopts the scheme explained in connection with the principles of equalization. That is, as shown in FIG. 2, information marks are recorded at every other one of lattice points on the same track. Between even- and odd-numbered tracks, the information mark-recordable lattice points are staggered by one lattice point distance in the track direction. Thus, the mark pitch Mp is twice the distance between two lattice points.

In the example above, the track pitch Tp is (Ws+Wm)/4 or greater, and the two-dimensional equalizing circuit 114 utilizes a five-tap transversal filter (to be described later). In that case, with the calculations of the expressions (4) and (6) performed, the maximum amount of leakage in the reproduced signal is represented by the following expression (8) based on the expression (7):

$$E = B \cdot \text{cube}\ (C1) + B \cdot \text{cube}\ (C2) \tag{8}$$

Figure 4:
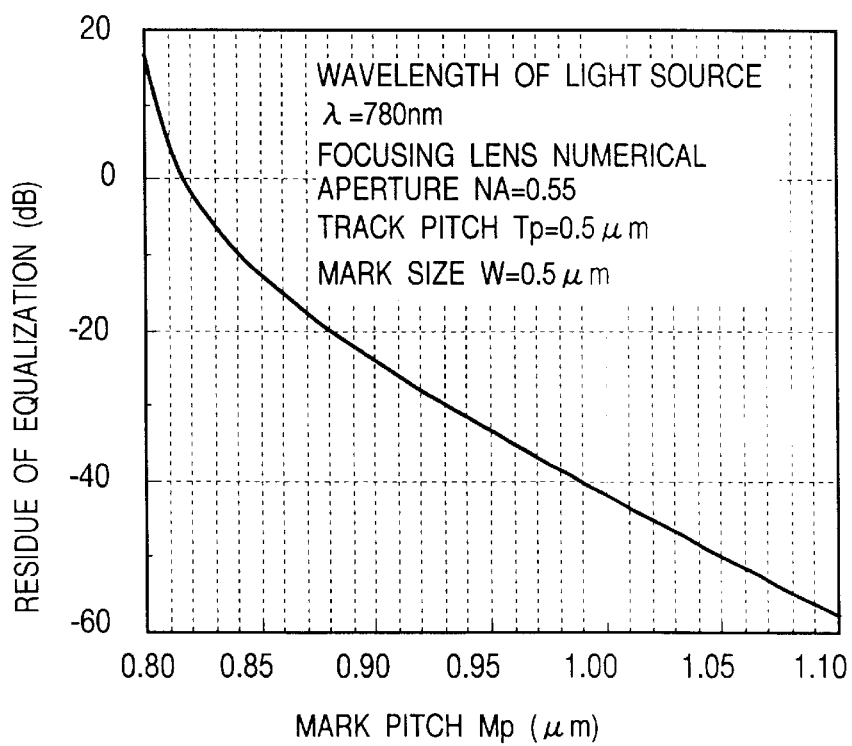
FIG. 4 is a graphic representation showing simulated relationships between the mark pitch and the residue of equalization in the embodiment of FIG. 1.

FIG. 4 is a graphic representation showing simulated values of the expression (8) given when the mark pitch Mp is varied where the light source wavelength λ is 780 nm, the numerical aperture NA of the focusing lens is 0.55, the mark size Wm is 0.5 $\mu$m, and the track pitch Tp is 0.5 $\mu$m. The simulation is based on Hopkins' diffraction calculations disclosed in the Journal of Optical Society of America, Vol. 69, No. 1, pp. 4–24 (January 1979), the calculations simulating the process of optical disk reproduction by taking into account optical diffraction and the numerical aperture of the focusing lens being used. From the graph of FIG. 4, it is understood that the residue of equalization is about −20 dB regarding the signal component when the mark pitch Mp is 0.88 $\mu$m. That is, the first embodiment requires that the mark pitch Mp is to be at least about 60% of the spot size Ws.

(5) Tracking

When information is reproduced from the track i by the first embodiment, the removal of crosstalk from the adjacent tracks i−1 and i+1 need not rely on a laser beam other than the one for reproducing information from the target track. This makes the optical head 102 simpler in structure. In order to make the most of this advantage, it is preferable not to use any other laser beam for tracking as well. For that purpose, the first embodiment adopts the technique disclosed in Japanese Patent Application No. Hei 5-255354 (later disclosed as Japanese Patent Laid-Open No. Hei 7-110958) and in U.S. patent application Ser. No. 08/321619 corresponding to the Japanese application, the technique being incorporated herein by reference. The relevant technique is described very briefly below.

As depicted in FIG. 2, the servo region 11 in each sector has clock marks 153 recorded beforehand to the position 0 of each of the tracks, the marks being arranged linearly in the radial direction according to the DBF method described in "Proposed American National Standard For Digital Information Interchange," ANSI Doc. No. X3B11/90-003-R1 (Jan. 3, 1990). For the first embodiment of this invention, wobble marks 151 and 152 are further provided in radially staggered relation to the clock marks 153 by a ±P/4 phase in accordance with the technique disclosed in the above-cited patent applications. With the first embodiment, the value P is equal to twice the track pitch Tp. Alternatively, the wobble marks may be replaced by previously formed pits on the optical recording medium.

When the optical spot 101 transits the clock mark 153 of a certain sector for recording or reproduction of information, the total light amount signal 103 changes. A PLL (phase locked loop) circuit, not shown, in the clock generator 105 responds to the signal change and generates a clock signal 106 and a sample hold signal 107 for detecting a servo signal at the time that the optical spot transmits the clock mark 153. The period of the clock signal 106 is equal to the time required for the optical spot to move in the track direction between two lattice points on the optical recording medium 100.

The sample hold signal 107 remains High from the time the optical spot transits the clock mark 153 until the optical spot transits the termination of the current sector to which the clock mark belongs; the sample hold signal 107 stays Low otherwise. Similarly, sample hold signals 108 and 109 are generated in synchronism with the times that the optical spot 101 transits the wobble marks 151 and 152. Given the clock signal 106 and sample hold signals 107 through 109 for servo signal detection, an optical spot positioning circuit 110 generates from the total light amount signal 103, a plurality of tracking error signals and a position signal representing the position of the optical spot. From these signals, the optical spot positioning circuit 110 generates an actuator control signal 111 whereby the tracking operation of an actuator, not shown, of the optical head 102 is carried out. The technique above permits reproduction or recording of information even where information tracks are radially arranged at intervals of a value smaller than the gap P (e.g., P/8). With the first embodiment, the period P of clock marks 153 in the radial direction is 1.0 $\mu$m and the track pitch Tp is P/2. The optical spot is positioned within the range of the track pitch Tp.

(6) Recording of learning marks

Figure 7:
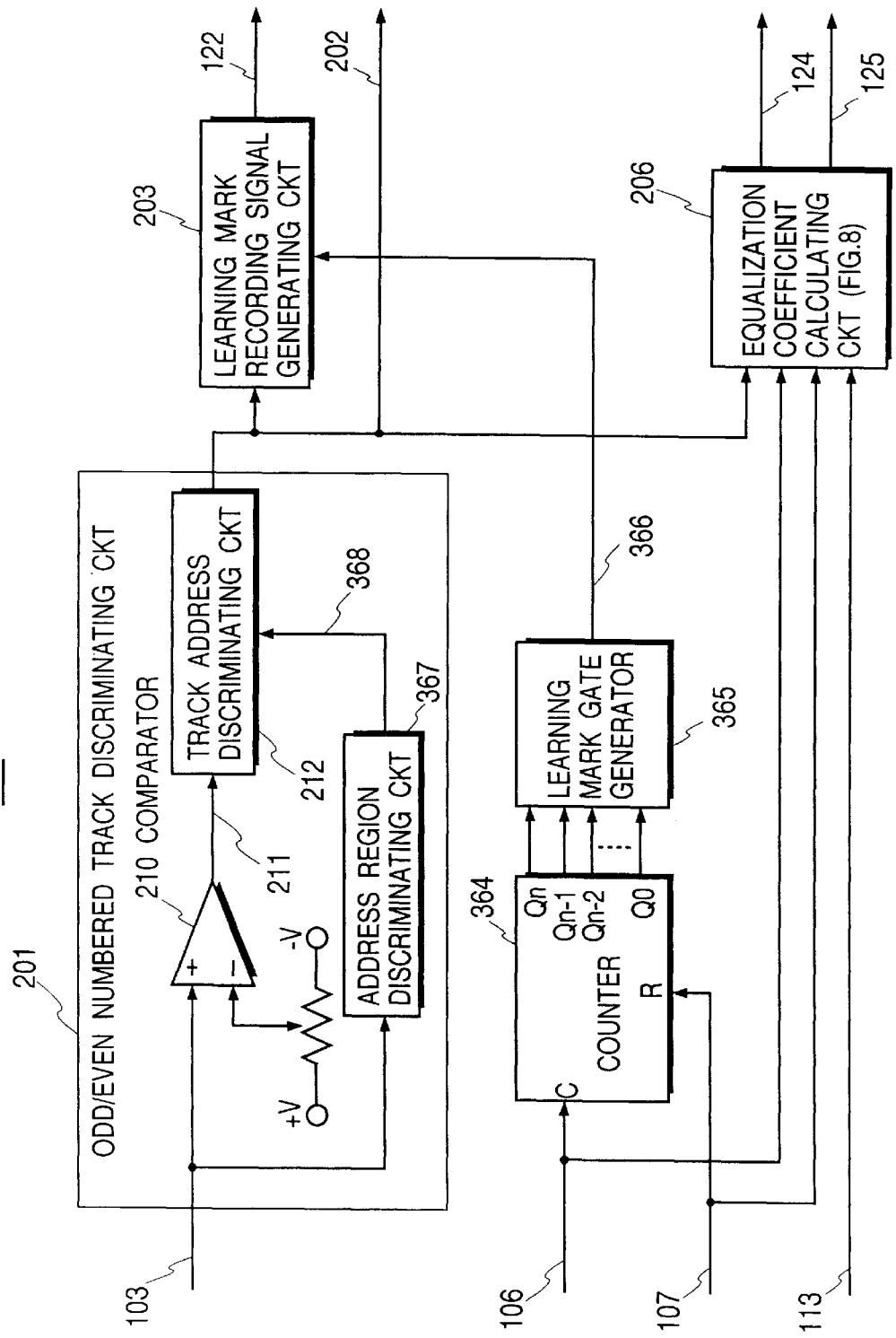
FIG. 7 is a block diagram of an equalization coefficient learning circuit (121) used in the embodiment of FIG. 1.

As shown in FIG. 7, the equalization coefficient learning circuit 121 comprises an odd/even-numbered track discriminating circuit 201, a learning mark recording signal generating circuit 203, a counter 364, a learning mark gate generator 365 and an equalization coefficient calculating circuit 206. The odd/even-numbered track discriminating circuit 201 includes a comparator 210, an address region discriminating circuit 367 and a track address discriminating circuit 212.

Upon recording of information, the optical head 102 first detects an address pit, not shown, inside the address region at the beginning of each sector. The address region discriminating circuit 367 checks to see if the optical spot is within the address region on the basis of the total light amount signal 103 containing an address pit detection signal. If the optical spot is within the address region, the address region discriminating circuit 367 outputs an address gate signal 368 at the high level; if the optical spot is located elsewhere, the circuit 367 outputs the address gate signal 368 at the low level. When the address gate signal 368 is High, the track address discriminating circuit 212 discriminates the track address based on the total light amount signal 211 put into binary format by the comparator 210. That is, the track address discriminating circuit 212 checks to see if the optical spot 101 is scanning an even- or odd-numbered track and outputs a track discrimination result signal 202 accordingly. More specifically, a check is made to see if the least significant bit of the track address is 0 or 1, and the least significant bit 0 or 1 thus detected is output. The track address discriminating circuit 212 retains the track discrimination result signal 202 until the next track is discriminated. In the description that follows, it is assumed that an even-numbered track is in effect when the least significant bit is 0 and that an odd-numbered track is in force when the least significant bit is 1.

When the sample hold signal 107 is brought Low, the counter 364 is reset to 0. The moment the sample hold signal 107 is driven High, the counter 364 starts counting the clock signal 106. Given output signals Q0 through Qn from the counter 364, the learning mark gate generator 365 generates a learning mark recording trigger pulse 366. The trigger pulse 366 is generated so as to indicate that the count of the counter 364 is p representing a lattice point of the first kind at the beginning of an equalization coefficient learning region 13. The learning mark recording signal generating circuit 203 receives the track discrimination result signal 202 and learning mark recording trigger pulse 366, and outputs accordingly a learning mark recording signal 122 whereby the learning marks 154 and 155 are recorded.

Specifically, for an odd-numbered track, the learning mark gate generator 365 generates a trigger pulse when the counter 364 points to p+2, i.e., the number of the first-kind lattice point next to the first-kind lattice point p at the beginning of the equalization coefficient learning region 13; for an even-numbered track, the learning mark gate generator 365 generates a trigger pulse when the counter 364 points to p+5, i.e., the number of the first-kind lattice point next but one to the first-kind lattice point p+1 at the beginning of the equalization coefficient learning region 13. As a result, the learning mark recording signal 122 becomes a pulse signal that is output at different timings depending on whether the track being scanned is an even- or odd-numbered track.

The laser drive circuit 119 outputs a recording pulse 120 to the optical head 102 in synchronism with the learning mark recording signal 122. Given the recording pulse 120, the optical head 101 accordingly modulates the optical spot 101 in intensity. Consequently, as shown in FIG. 2, the equalization coefficient learning region 13 of the optical recording medium 100 has the learning mark 154 or 155 recorded to the first-kind lattice point p+2 or p+5 therein depending on whether the track number is an even or an odd number.

The learning marks 154 and 155 are distanced from one another in the optical spot scan direction so as not to develop interference therebetween. That is, the learning marks 154 and 155 on each track are spaced so that the reproduced signal from each of the learning marks will not be subject to crosstalk from the learning marks on tracks adjacent to the target track to which the learning mark in question belongs. With the first embodiment, the distance between the learning marks 154 and 155 is equal to the distance spanning three lattice points. For example, suppose that the spot size Ws is 1.42 $\mu$m, the track pitch Tp is 0.5 $\mu$m, the mark pitch Mp is 0.88 $\mu$m and the mark size W is 0.5 $\mu$m. In that case, with the lattice spacing T being Mp/2 as shown in FIG. 2, a mark identical in shape to the information recording mark 157 is recorded as an equalization coefficient learning mark 155 to, say, a first-kind lattice point (2u, p+5) of an even-numbered track 2u; likewise, another mark identical in shape to the information recording mark 157 is recorded as an equalization coefficient learning mark 154 illustratively to a first-kind lattice point (2u−1, p+2) of an odd-numbered track 2u−1. This eliminates interference between the learning marks 154 and 155.

(7) Recording of user data

Figure 5A:
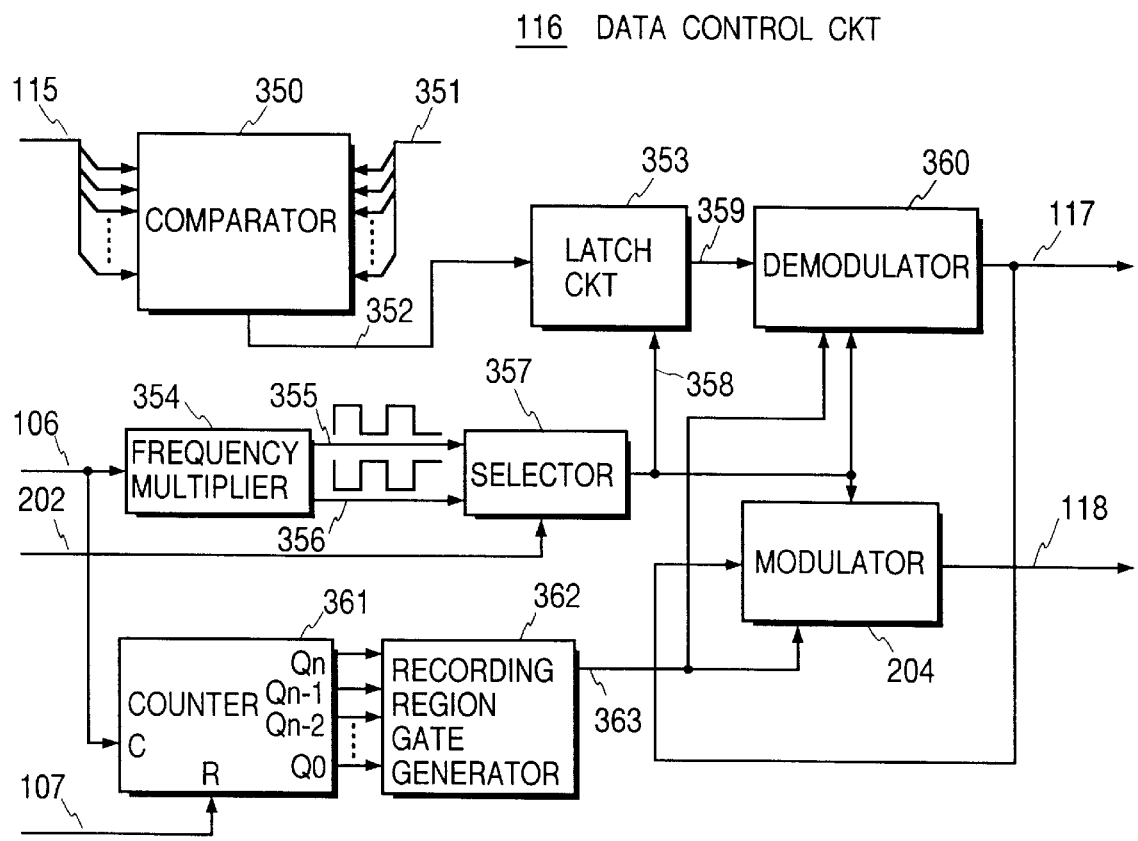
FIG. 5A is a block diagram of a data control circuit (116) used in the embodiment of FIG. 1.

User data is recorded upon completion of the recording of learning marks described above. In FIG. 5A, a counter 361 is reset to 0 when the sample hold signal 107 is brought Low. The moment the sample hold signal 107 is driven High, the counter 361 starts counting the clock signal 106. Given output signals Q0 through Qn from the counter 361, the recording region gate generator 362 generates a recording region gate signal 363. The signal 363 is driven High when the count of the counter 364 is q and is brought Low upon termination of the data recording region.

Figure 5B:
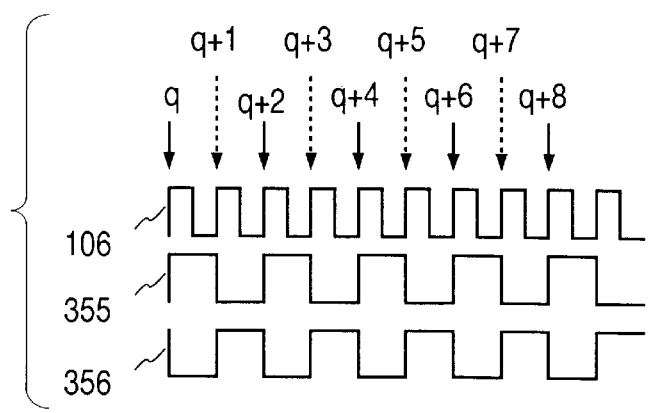
FIG. 5B is a timing chart depicting waveforms of a plurality of clock signals used by the data control circuit of FIG. 5A.

A frequency multiplier 354 generates an even-numbered clock signal 355 and an odd-numbered clock signal 356 of which the period is twice that of the clock signal 106. As shown in FIG. 5B, the leading edges of the even-numbered clock signal 355 are synchronized with the times corresponding to the positions of the first-kind lattice points q+2, q+4, etc., within the data recording region 14; the leading edges of the odd-numbered clock signal 356 are synchronized with the times corresponding to the positions of the first-kind lattice points q+1, q+3, q+5, etc. A selector 357 outputs the even-numbered track signal 355 as a recording and reproduction clock signal 358 if the track discrimination result signal 202 from the odd/even-numbered track discriminating circuit 201 is "0"; the selector 357 outputs an odd-numbered track signal 356 as the recording and reproduction clock signal 358 if the track discrimination result signal 202 is "1". A modulator 204 acts when the recording region gate signal is High, modulating the user data 117 to be recorded in accordance with appropriate coding rules. The modulator 204 then outputs modulated data 118 at different timings depending on the recording and reproduction clock signal 358 from the selector 357. Illustratively, on an even-numbered track 2u shown in FIG. 2, the modulated data 118 becomes significant at the times corresponding to the positions of the first-kind lattice points q+2, q+4, etc., inside the data recording region 14; on an odd-numbered track 2u−1, the modulated data 118 becomes significant at the times corresponding to the positions of the first-kind lattice points q+1, q+3, q+5, etc.

Given the modulated data 118, the laser drive circuit 119 modulates the laser beam in intensity, and causes the optical head 102 to record or not to record information recording marks 157 to every other one of the lattice points to which information may be written within the data recording region 14 of the optical recording medium. On even-numbered tracks, the information recording marks 157 are recorded to any or all of the first-kind lattice points q, q+2, q+4, etc., within the data recording region; on odd-numbered tracks, the information recording marks 157 are recorded to any or all of the first-kind lattice points q+1, q+3, q+5, etc., inside the data recording region.

(8) Preprocessing for reproduction of information

Figure 6:
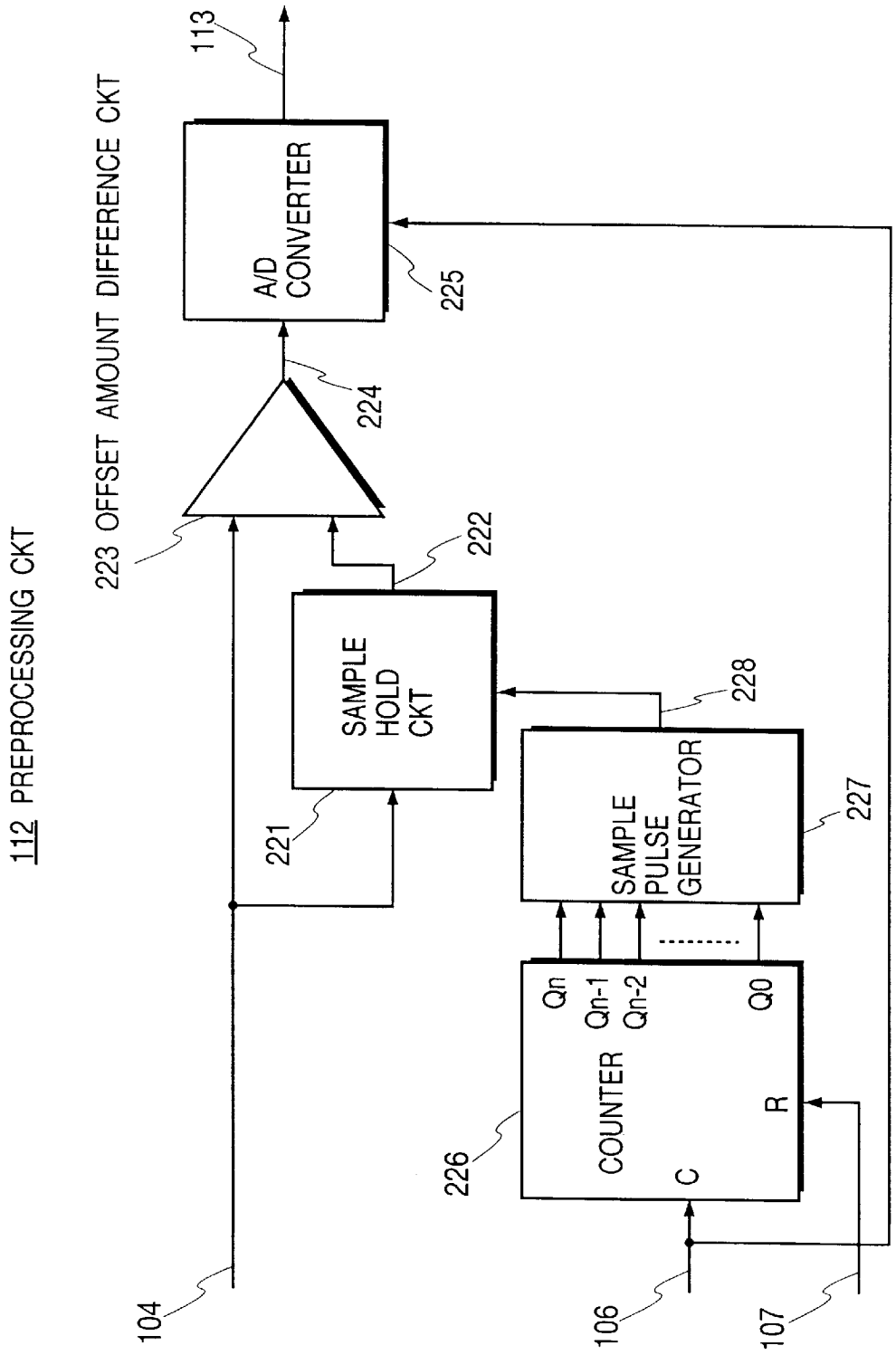
FIG. 6 is a block diagram of a preprocessing circuit (112) used in the embodiment of FIG. 1.

The preprocessing circuit 112 lowers an excess offset component which is included in the magneto-optical signal 104 from the optical head 102 and which has nothing to do with the presence or absence of information marks. Specifically, the preprocessing circuit 112 detects the level of reflected light from the offset detection region 12 where no information mark is recorded on the optical recording medium 100. The preprocessing circuit 112 then subtracts the reflected light level from the magneto-optical signal 104 later detected. Referring to FIG. 6, the preprocessing circuit 112 comprises a sample hold (S/H) circuit 221, an offset amount difference circuit 223, an analog-digital (A/D) converter 225, a counter 226 and a sample pulse generator 227. The counter 226 is reset to 0 when the sample hold signal 107 is brought Low. The moment the sample hold signal 107 is driven High, the counter 226 starts counting the clock signal 106. Given output signals Q0 through Qn from the counter 226, the sample pulse generator 227 generates a sample pulse 228 when the count of the counter 226 reaches n. The moment the sample pulse 228 is input, the S/H circuit 221 samples the level of the magneto-optical signal 104 and holds the sampled level 222 until the next sample pulse 228 is input. The sampled level is the level of reflected light from the offset detection region 12 where no information mark is recorded. The offset amount difference circuit 223 outputs an offset difference signal 224 representing the difference between the magneto-optical signal 104 and the sampled level 222. The A/D converter 225 converts the offset difference signal 224 into a digital signal based on the clock signal 106, and outputs the digital signal as a digital difference signal 113.

(9) Measurement of equalization coefficients

The equalization coefficient calculating circuit 206 in the equalization coefficient learning circuit 121 is used to obtain optimum equalization coefficients for reducing two-dimensional leakage. Referring to FIG. 8, the equalization coefficient calculating circuit 206 comprises a leakage amount detecting circuit 241 that detects the amount of leakage d, a leakage amount detecting circuit 242 that detects the amount of leakage e, and arithmetic circuits 245 through 250 and 254 through 258 for calculating equalization coefficients.

Figure 9A:
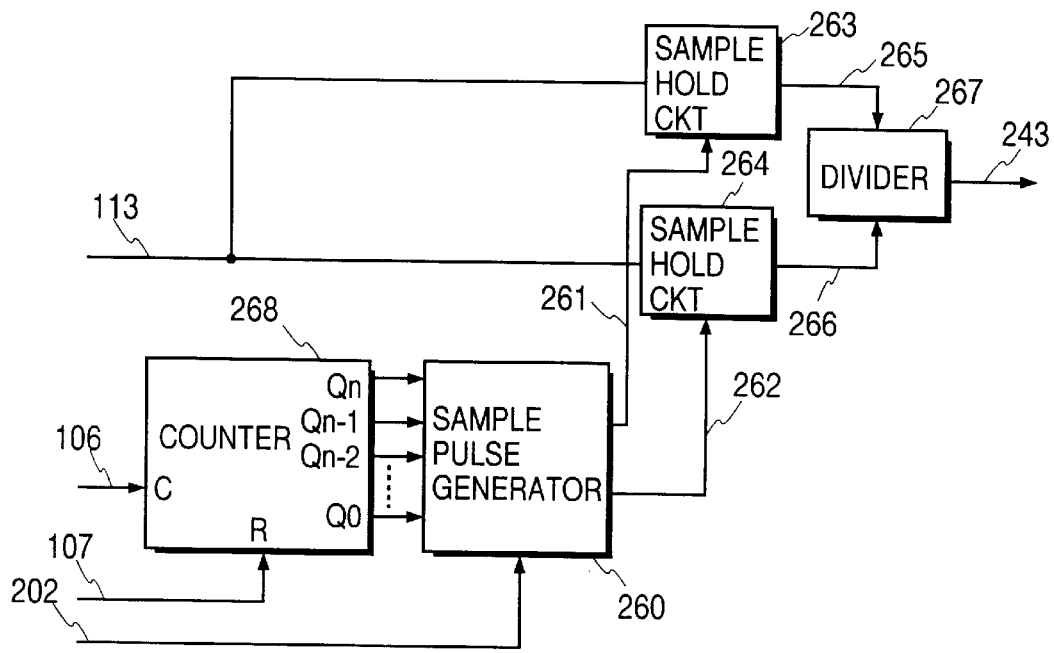
FIG. 9A is a block diagram of a leakage detecting circuit (241) used in the equalization coefficient calculating circuit of FIG. 8.
Figure 9B:
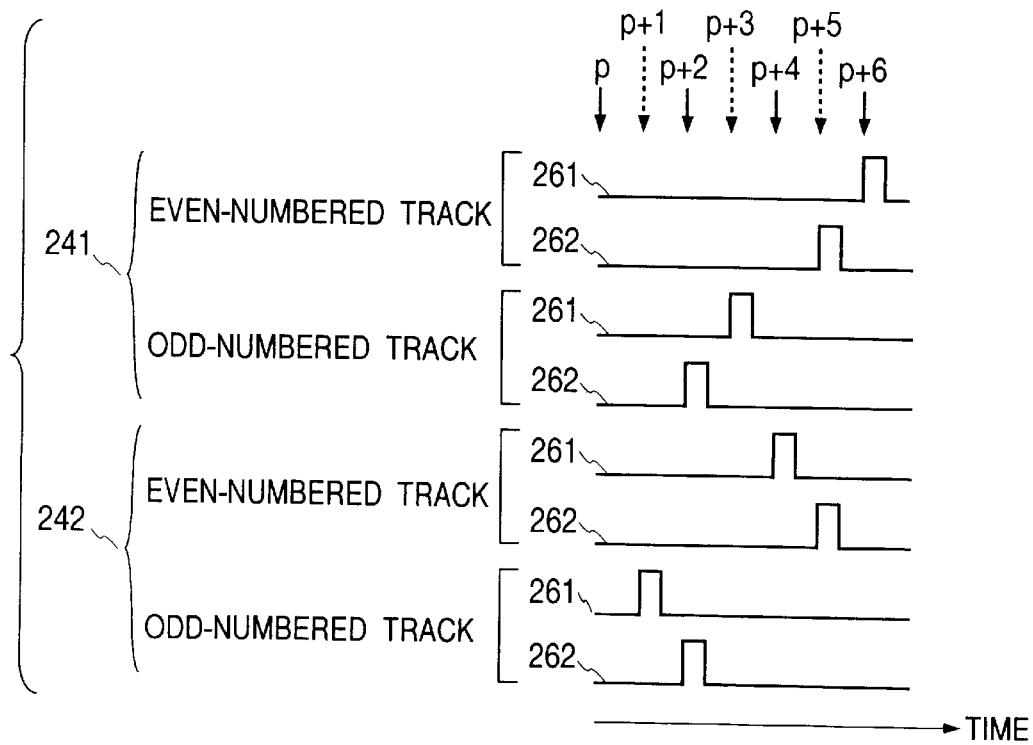
FIG. 9B is a timing chart of a plurality of signals used by the equalization coefficient calculating circuit of FIG. 8 as well as by the leakage detecting circuit (242) included in the circuit of FIG. 7.

FIG. 9A outlines the structure of the leakage amount detecting circuit 241. In FIG. 9A, a counter 268 is reset to 0 when the sample hold signal 107 is brought Low. The moment the sample hold signal 107 is driven High, the counter 268 starts counting the clock signal 106. A sample pulse generator 260 generates sample pulses 261 and 262 on the basis of output signals Q0 through Qn from the counter 268. When the optical spot 101 scans, say, an even-numbered track 2u, the odd/even-numbered track discriminating circuit 201 generates a track discrimination result signal 202 that is "0". In this case, as shown in FIG. 2, the learning mark 155 is recorded in the position of the first-kind lattice point (2u, p+5). The sample pulse generator 260 generates the sample pulse 261 at the first-kind lattice point (2u, p+6) and the sample pulse 262 at the first-kind lattice point (2u, p+5) (see FIG. 9B). Sample hold circuits 263 and 264 sample the digital difference signal 113 in the pulse positions of the sample pulses 261 and 262, respectively, to acquire lattice point signals S'(2u, p+6) and S'(2u, p+5). Given the signals S'(2u, p+6) and S'(2u, p+5), a divider 267 outputs the ratio S'(2u, p+6)/S'(2u, p+5) as the leakage amount d. On the other hand, when the optical spot 101 scans, say, an odd-numbered track 2u−1, the odd/even-numbered track discriminating circuit 201 generates a track discrimination result signal 202 that is "1". In this case, as shown in FIG. 2, the learning mark 155 is recorded in the position of the first-kind lattice point (2u−1, p+2). The sample pulse generator 260 generates the sample pulse 261 at the first-kind lattice point (2u−1, p+3) and the sample pulse 262 at the first-kind lattice point (2u−1, p+2) (see FIG. 9B). The sample hold circuits 263 and 264 sample the digital difference signal 113 in the pulse positions of the sample pulses 261 and 262, respectively, to acquire lattice point signals S'(2u−1, p+3) and S'(2u−1, p+2). Given the signals S'(2u−1, p+3) and S'(2u−1, p+2), the divider 267 outputs the ratio S'(2u−1, p+3)/S'(2u−1, p+2) as the leakage amount d.

The leakage amount detecting circuit 242 is substantially similar in structure to the leakage amount detecting circuit 241 as outlined in FIG. 9A. How the leakage amount detecting circuit 242 is structured and how it works will now be described with reference to FIG. 9A. The difference between the circuits 242 and 241 is that the timings of the sample pulses 261 and 262 generated by the sample pulse generator 260 are different. When the optical spot scans, say, an even-numbered track 2u, the track discrimination result signal 202 is "0". In this case, as depicted in FIG. 2, the learning mark 155 is recorded in the position of the first-kind lattice point (2u, p+5). The sample pulse generator 260 generates the sample pulse 261 at the first-kind lattice point (2u, p+4) and the sample pulse 262 at the first-kind lattice point (2u, p+5) (see FIG. 9B). The sample hold circuits 263 and 264 sample the digital difference signal 113 in the pulse positions of the sample pulses 261 and 262, respectively, to acquire lattice point signals S'(2u, p+4) and S'(2u, p+5). Given the signals S'(2u, p+4) and S'(2u, p+5), the divider 267 outputs the ratio S'(2u, p+4)/S'(2u, p+5) as the leakage amount e. On the other hand, when the optical spot 101 scans, say, an odd-numbered track 2u−1, the track identification result signal 202 is "1". In this case, as shown in FIG. 2, the learning mark 155 is recorded in the position of the first-kind lattice point (2u−1, p+2). The sample pulse generator 260 generates the sample pulse 261 at the first-kind lattice point (2u−1, p+1) and the sample pulse 262 at the first-kind lattice point (2u−1, p+2) (see FIG. 9B). The sample hold circuits 263 and 264 sample the digital difference signal 113 in the pulse positions of the sample pulses 261 and 262, respectively, to acquire lattice point signals S'(2u−1, p+1) and S'(2u−1, p+2). Given the signals S'(2u−1, p+1) and S'(2u−1, p+2), the divider 267 outputs the ratio S'(2u−1, p+1)/S'(2u−1, p+2) as the leakage amount e.

The arithmetic circuits 245 through 250 and 254 through 258 in FIG. 8 calculate equalization coefficients for use at equalization on the basis of the leakage amounts d and e acquired by the leakage amount detecting circuits 241 and 242. Of these arithmetic circuits, the circuits 245, 246 and 247 calculate equalization coefficients A0, A1 and A2 respectively as per the expression (4). The equalization coefficients A0, A1 and A2 thus calculated are used to remove from the reproduced signal the crosstalk coming from the tracks adjacent to the target track being scanned by the optical spot 101. The arithmetic circuits 248 through 250 and 254 through 258 calculate equalization coefficients C0 through C4 according to the expression (6). The equalization coefficients C0 through C4 thus calculated are used to remove the component of inter-symbol interference along the target track from the reproduced signal from which the crosstalk has been removed using the above equalization coefficients A0, A1 and A2.

More specifically, the arithmetic circuit 245 calculates the equalization coefficient A0 given in the expression (4) on the basis of the leakage amounts d and e; the arithmetic circuit 246 calculates the equalization coefficient A1 given in the expression (4) on the basis of the leakage amounts d and e; the arithmetic circuit 247 calculates the equalization coefficient A2 given in the expression (4) on the basis of the leakage amounts d and e; the arithmetic circuit 248 calculates the equalization coefficient C0 given in the expression (6) on the basis of the leakage amounts d and e; the arithmetic circuit 249 calculates the equalization coefficient C1 given in the expression (6) on the basis of the leakage amounts d and e; the arithmetic circuit 250 calculates the equalization coefficient C2 given in the expression (6) on the basis of the leakage amounts d and e; the arithmetic circuit 251 calculates the equalization coefficient C3 given in the expression (6) on the basis of the leakage amounts d and e; and the arithmetic circuit 252 calculates the equalization coefficient C4 given in the expression (6) on the basis of the leakage amounts d and e.

(10) Reproduction of information

Figure 10:
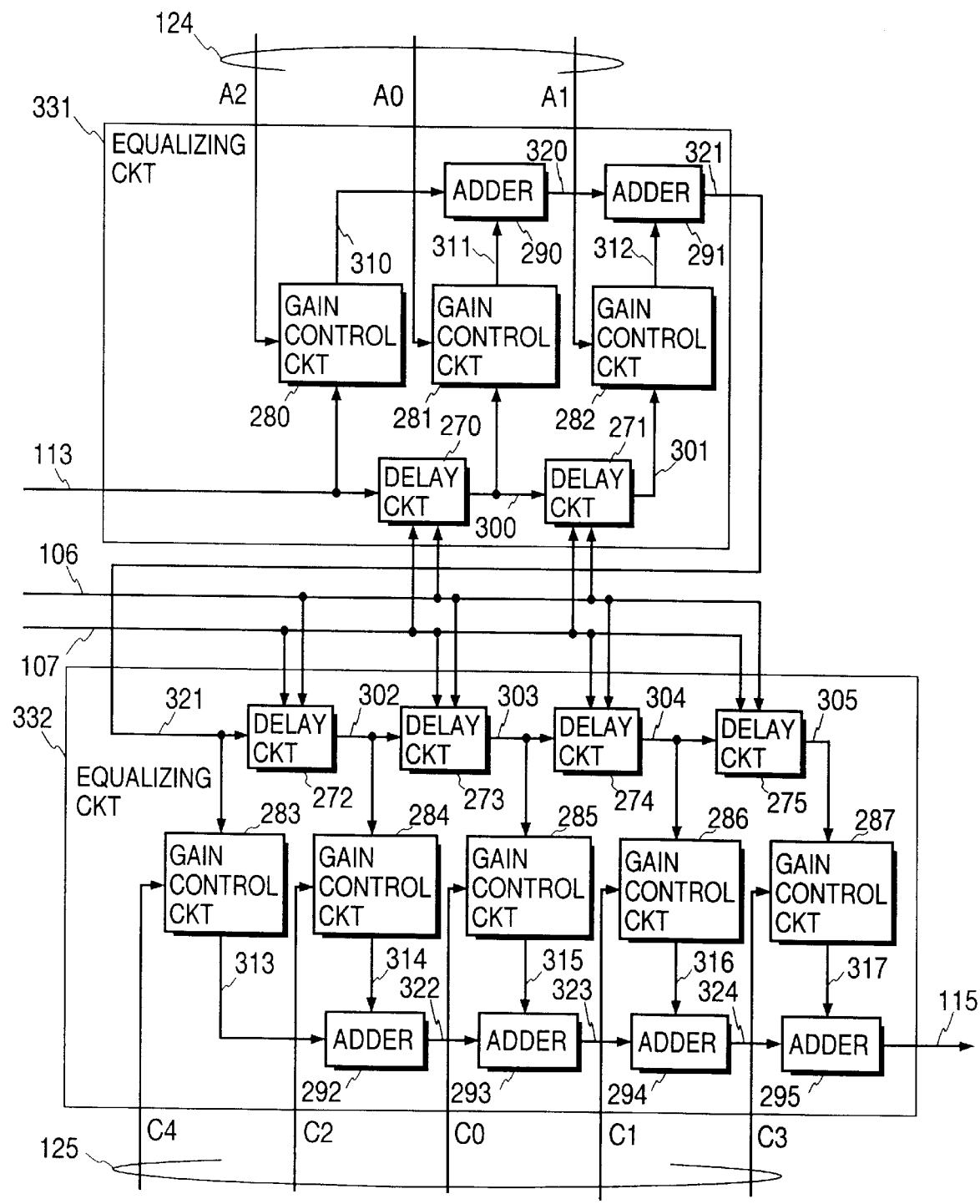
FIG. 10 is a block diagram of a two-dimensional equalizing circuit (114) used in the embodiment of FIG. 1.

Upon reproduction of information, the two-dimensional equalizing circuit 114 performs two-dimensional equalization on the digital difference signal 113 from the preprocessing circuit 112 in order to minimize two-dimensional leakage. The first embodiment reduces two-dimensional leakage by performing the above-described calculations of the expressions (4) and (6). Referring to FIG. 10, the two-dimensional equalizing circuit 114 comprises equalizing circuits 331 and 332. Given the equalization coefficients A0 through A2 from the equalization coefficient learning circuit 121, the equalizing circuit 331 reduces crosstalk from the digital difference signal supplied by the preprocessing circuit 112 according to the expression (4), and outputs a crosstalk-reduced signal 321. The equalization circuit 332, upon receipt of the equalization coefficients C0 through C4 from the equalization coefficient learning circuit 121, reduces the component of inter-symbol interference from the crosstalk-removed signal 321 according to the expression (6), and outputs an equalized signal 115.

The equalizing circuit 331 is in fact a three-tap transversal filter comprising delay circuits 270 and 271, gain control circuits 280 through 282, and adders 290 and 291.

The delay circuits 270 and 271 under control of the clock signal 106 delay the digital difference signal 113 by a time period of D required for the optical spot to scan the lattice gap T, thereby generating delayed signals 300 and 301. The gain control circuit 280 outputs a gain control signal 310 multiplying the digital difference signal 113 by the equalization coefficient A2; the gain control circuit 281 outputs a gain control signal 311 multiplying the delayed signal 300 by the equalization coefficient A0; and the gain control circuit 282 outputs a gain control circuit 312 multiplying the delayed signal 301 by the equalization coefficient A1. The gain control signals 310 through 312 are added up by the adders 290 and 291 before being output as the crosstalk-reduced signal 321. As described, the crosstalk-reduced signal 321 constitutes the signal S"(i, j) given in the expression (4), rid of the crosstalk from the adjacent tracks.

However, the signal 321 in its present state still includes components of inter-symbol interference from the lattice points (i, j−2) and (i, j+2) with respect to the target lattice point (i, j). To reduce the inter-symbol interference, the equalizing circuit 332 performs the calculation of the expression (6). Specifically, four delay circuits 272 through 275 in the equalizing circuit 332 delay the crosstalk-reduced signal by a time period of 2D under control of the clock signal 106 so as to generate delayed signals 302 through 305. A gain control circuit 283 in the equalizing circuit 332 outputs a gain control signal 313 multiplying the crosstalk-reduced signal 321 by the equalization coefficient C4. Likewise, gain control circuits 284 through 287 output gain control signals 314 through 317 respectively multiplying the delayed signals 302 through 305 by the equalization coefficients C2, C0, C1 and C3. The gain control signals 313 through 317 are added up by adders 292 through 295 before being output as the equalized signal 115. The equalized signal 115 constitutes the signal S'"(i, j) given in the expression (6), rid of the crosstalk from the adjacent tracks as well as of the inter-symbol interference from the track being scanned.

The data control circuit 116 demodulates the equalized signal 115 to reproduce recorded data. Referring to FIG. 5A, the data control circuit 116 receives the equalized signal 115 from the two-dimensional equalizing circuit 114 and has a comparator 350 put the signal into binary format based on a threshold signal 351.

The frequency multiplier 354 multiplies the clock signal 106 in frequency, generating the even-numbered track signal 355 whose leading edges are synchronized with the lattice points q+2, q+4, etc., (see FIG. 5B) and the odd-numbered clock signal 356 whose leading edges are synchronized with the lattice points q+1, q+3, etc. When the optical spot 101 scans an even-numbered track, information is found in the positions of the lattice points q+2, q+4, etc., inside the data recording region 14. In this case, the track discrimination result signal 202 is "0", which causes the selector 357 to select the even-numbered track signal 355 and to output it as the recording and reproduction clock signal 358. A latch circuit 353 latches its input 352 the moment the recording and reproduction clock signal 358 rises. This allows the latch circuit 353 to collect positional data on the lattice points q+2, q+4, etc., from the result of comparison 352 and to output what is collected as the latched result 359.

When the optical spot 101 scans an odd-numbered track, information is found in the positions of the lattice points q+1, q+3, etc., inside the data recording region 14. In this case, the track discrimination result signal 202 is "1", which causes the selector 357 to select the odd-numbered track signal 356 and to output it as the recording and reproduction clock signal 358. The latch circuit 353 latches its input 352, at the moment the recording and reproduction clock signal 358 rises. This allows the latch circuit 353 to collect positional data on the lattice points q+1, q+3, etc., from within the result of comparison 352, and to output what is collected as the latched result 359. The latched result 359 thus obtained is demodulated by a demodulator 360 demodulating data according to the coding rules in effect at recording time. Acting in this manner, the demodulator 360 outputs data 117. The demodulator 360 is activated when the recording region gate signal 363 is driven High.

As described, the first embodiment removes both crosstalk and inter-symbol interference using only one laser beam. The two-dimensional equalizing circuit 114 is a simply structured equalizing circuit comprising two transversal filters connected in series. As discussed in connection with the equalization coefficient calculating circuit 206 in FIG. 8, equalization coefficients are calculated by use of simple arithmetic circuits. This means that compared with the conventional mean square equalization method for acquiring equalization coefficients, the first embodiment permits calculation of equalization coefficients in a time period short enough to deal adequately with random access applications requiring high-speed performance.

The conventional technique disclosed in Japanese Patent Laid-Open No. Hei 2-257474 cited earlier additionally entails the following disadvantages:

(1) Al though the disclosed technique uses a single optical spot, reproduced signals are obtained thereby only after the disk has completed at least two revolutions. This is because information read from at least two tracks needs to be placed temporarily in memory for reducing crosstalk from adjacent tracks as well as inter-symbol interference.

(2) The conventional technique adopts the commonly-used mean square equalization as the algorithm for adaptively obtaining equalization coefficients in the face of variable factors. It takes hundreds of milliseconds to find optimum equalization coefficients, which makes it impossible to cope with high-speed random access operations. Furthermore, if the optics has asymmetrical aberration (comatic aberration) or is used in combination with a warped disk, the adverse effects involved cannot be eliminated.

The conventional technique disclosed in Japanese Patent Laid-Open No. Hei 5-205280 cited earlier further involves the following deficiency:

(3) The technique is capable of detecting the amount of crosstalk from adjacent tracks by use of learning marks. However, it cannot detect inter-symbol interference from the target track itself.

By contrast, the first embodiment of the present invention is free of the above deficiencies and disadvantages.

Second Embodiment

Unlike the first embodiment which detects equalization coefficients using the equalization coefficient learning region from each sector of each track, the second embodiment of the invention detects equalization coefficients through the use of a plurality of equalization coefficient learning tracks common to a plurality of tracks.

Figure 11A:
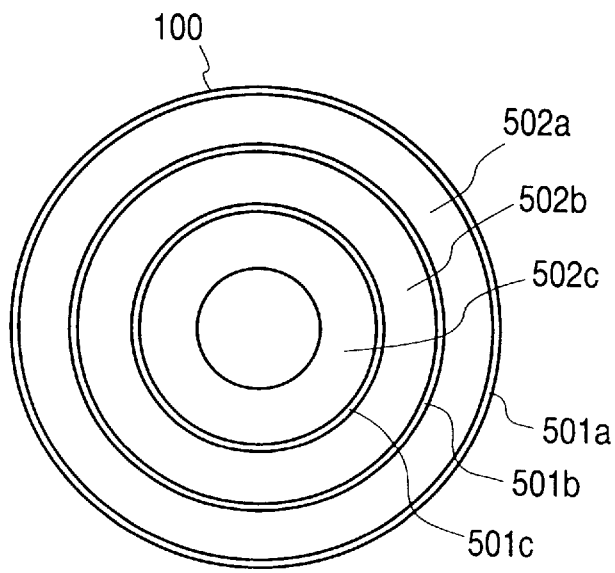
FIG. 11A is a view showing different kinds of tracks recorded on an optical information recording medium for use with another optical information recording and reproducing apparatus practiced as another embodiment of the invention.

As shown in FIG. 11A, the optical recording medium 100 is provided with data recording track regions 502a, 502b and 502c, and equalization coefficient learning track regions 501a, 501b and 501c by which to learn equalization coefficients. The equalization coefficient learning tracks 501a, 501b and 501c correspond respectively to the data recording track regions 502a, 502b and 502c and are located outside the corresponding track regions. These learning tracks are used when data is recorded and reproduced to and from the data recording track regions 502a, 502b and 502c. Thus each sector of the recording medium 100 includes, as shown in FIG. 11B, a region 15 used as an equalization coefficient learning region or a data recording region. The equalization coefficient learning region 15 shown in FIG. 2 does not exist.

Each equalization coefficient learning track region (e.g., 501b) comprises a predetermined number of tracks. On the centrally-located one of these tracks in each sector, learning marks 158 are recorded at regular intervals between two positions: from the lattice point of the first kind p+2 next to the first-kind lattice point p at the beginning of the equalization coefficient learning region or data recording region 15, to the termination of the sector in question. The gap between any two contiguous learning marks 158 is determined so that any interference therebetween is negligible. With the second embodiment, the mark-to-mark gap is the distance spanning six lattice points. These learning marks are not recorded on the other tracks within the equalization coefficient learning track region. These other tracks are dummy tracks that ensure the absence of crosstalk leaking from the nearby data recording tracks into the centrally-located track. With the second embodiment, four dummy tracks are provided in each equalization coefficient learning track region.

The learning marks are recorded to all equalization coefficient learning track regions before information marks are recorded. For this purpose, the optical spot positioning circuit 110 in FIG. 1 responds to a learning execution signal 550 from a host control circuit, not shown, to position the optical spot 101 to the central track in each of the equalization coefficient learning track regions 501a, 501b and 501c. The learning mark recording signal generating circuit 203 inside the equalization coefficient learning circuit 121 in FIG. 7 records a series of learning marks 158 to the central track as shown in FIG. 11B. For the second embodiment, the lattice points at which to record the learning marks are the same in all equalization coefficient learning track regions. It follows that the learning mark recording signal generating circuit 203 does not respond to the result of discrimination by the odd/even-numbered track discriminating circuit 201 in FIG. 7. Such recording of learning marks is repeated to all other equalization coefficient learning track regions.

When the recording of the equalization coefficient learning marks 158 has ended, these marks 158 are reproduced by the optical spot 101 to learn equalization coefficients.

The writing of equalization coefficient learning marks 158 to each data track region is carried out concurrently with the initialization of an unrecorded disk that is loaded. The learning of equalization coefficients is carried out with the disk loaded before the reading of data therefrom.

Unlike the first embodiment, the second embodiment has a plurality of learning marks recorded in each sector of the central track of any given equalization coefficient learning track region. Given this recording arrangement, the leakage amount detecting circuits 241 and 242 in FIG. 8 are designed so that the second embodiment detects the leakage amounts d and e as follows: the digital difference signals 113 derived from the first-kind lattice points (i, p+2), (i, p+8), (i,p+14), etc., where the learning mark 158 is recorded each in any of the sectors on the same track are averaged first, whereby a mean lattice point signal M'(i, p+2) is calculated. Then the digital difference signals 113 derived from the second-kind lattice points (i, p+3), (i, p+9), (i, p+15), etc., coming immediately after the respective first-kind lattice points are averaged, whereby a mean lattice point signal M'(i, p+3) is calculated. Given the signals M'(i, p+2) and M'(i, p+3), the leakage amount detecting circuit 241 calculates the ratio M'(i, p+3)/M'(i, p+2) to acquire the amount of leakage into the current sector. The calculation is performed on all sectors. The amounts of leakage into each sector are averaged. The result is the leakage amount d for the equalization coefficient learning track region in question.

In like manner, the digital difference signals 113 derived from the second-kind lattice points (i, p+1), (i, p+7), (i, p+13), . . . coming immediately before the respective first-kind lattice points are averaged, whereby a mean lattice point signal M'(i, p+1) is calculated. Given the signals M'(i, p+1) and M'(i, p+2), the leakage amount detecting circuit 242 calculates the ratio M'(i, p+1)/M'(i, p+2) to acquire the amount of leakage into the current sector. The calculation is then carried out on all sectors, and the amounts of leakage into each sector are averaged. The result is the leakage amount e for the equalization coefficient learning track region in question.

From the leakage amounts d and e thus obtained, the second embodiment may calculate equalization coefficients in the same manner as the first embodiment. The learning of equalization coefficients is performed on each of the equalization coefficient learning tracks 501a through 501c. The equalization coefficients thus acquired are stored for each equalization coefficient learning track region. Recording or reproduction of information is started upon completion of the above-described learning of equalization coefficients. When accessing tracks within any data track region for data reproduction, the second embodiment utilizes the equalization coefficients calculated for the equalization coefficient learning track region corresponding to the data track region in question. The method of the second embodiment has no need to record learning marks to each track. This makes it possible to make the equalization coefficient learning area smaller, enhancing the density of data recording correspondingly.

<Variations of the First and the Second Embodiment>

(1) The expression (6) used by the first embodiment may be replaced by the expression (6a) or (6b) when the arithmetic circuits 248 through 250 and 254 through 258 in FIG. 8 are arranged to obtain the equalization coefficients G1, G2, Y, and Z0 through Z6 (shown in the expressions (6a) and (6b)) based on the output signals from the leakage amount detecting circuits 241 and 242. In that case, the equalizing circuit 332 in FIG. 10 needs to be a three-tap or seven-tap transversal filter. This technique may be applied to the second embodiment as well.

(2) With the first and the second embodiment, the optical spot 101 detects the intensity of reflected from one of the lattice points inside the offset amount detection region 12 for use as the offset amount. Alternatively, the intensities of reflected light from a plurality of lattice points inside the offset amount detection region 12 may be detected and averaged for use as the mean offset amount. This method enhances the precision of offset amount detection.

Figure 12:
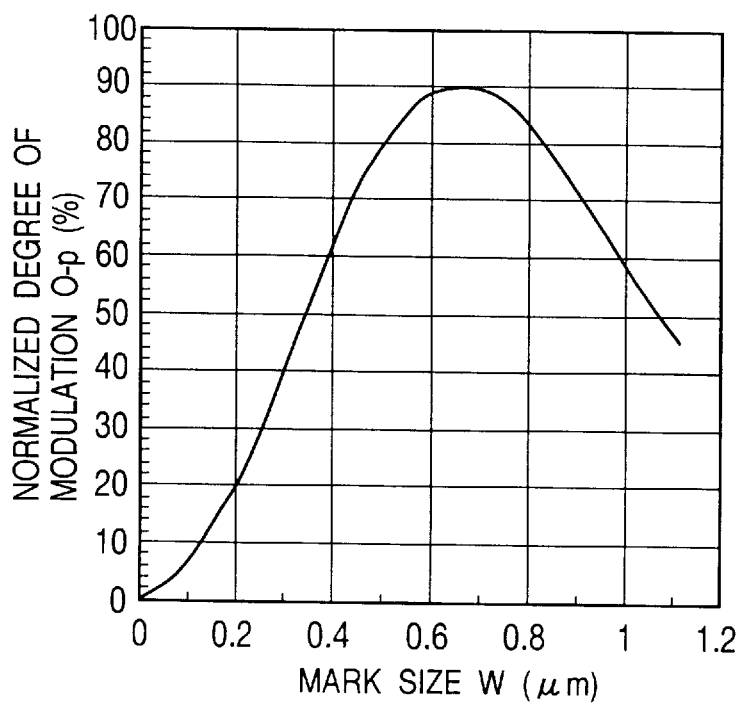
FIG. 12 is a graphic representation showing simulated relationships between the mark size and the normalized degree of modulation on a read-only medium used as an optical information recording medium by the embodiment of FIG. 1.

(3) Although the first and the second embodiment use the magneto-optical disk as the optical recording medium, any other suitable recording media may be employed by the optical information reproduction method of the invention. Such media include write once media, phase change media and read only media. These media provide reproduced signals of information marks in the form of total light amount signals. Thus the optical information recording and reproducing apparatus practiced as the first or the second embodiment above has only to replace its magneto-optical signals with total light amount signals where the alternative media are used. In such cases, however, the mark size of the read only media differs from that for the first and the second embodiment and is determined as follows: FIG. 12 graphically shows simulated relationships between the mark size W and the normalized degree of modulation O-p of a read-only medium. The graph indicates that the maximum degree of modulation is available when the mark size W is 55% of the optical spot size Ws ($-\lambda/NA$). However, when the inventive optical information recording and reproduction method is used to reproduce information from the read-only medium, about 40% of the degree of modulation (0–100%) is taken up by the crosstalk from adjacent tracks. This means that the degree of modulation for isolated signals must be about 60%. For this reason, the degree of modulation for isolated signals needs to be 40% to 60%, whereas the mark size W is 25% to 40% of the optical spot size Ws.

(4) In the first and second embodiments, intermediate points used in detecting information leakage amounts and in removing a crosstalk rom a signal reproduced for an information recording point are exactly at the center of two adjacent information recording lattice points on the same track. This is desirable from a view point of effective removal of the crosstalk. However, other intermediate points located a little away from a center of two adjacent information recording lattice points on the same track can still be used, if required. This is true with the other embodiments which will be explained below.

Third Embodiment

As described, the first and the second embodiment employ the light intensity modulation method by which the intensity of a laser beam is modified in recording information to the optical recording medium. By contrast, the third embodiment of the invention utilizes magnetic field modulation for information recording.

The magnetic field modulation method involves modulating not the intensity of the optical beam but a magnetic field in recording information marks to the optical recording medium. In adopting this method, the third embodiment, a variation of the first embodiment, additionally furnishes a magnetic field drive circuit and a magnetic field generating coil to the optical disk apparatus used by the first embodiment. FIG. 18 illustrates information recorded to the optical recording medium by the first embodiment operating on the magnetic field modulation method. While each of the information marks recorded by the light intensity modulation method appears substantially round as shown in FIG. 2, the information marks recorded by the magnetic field modulation method take on an arrow feather shape each.

The third embodiment may also be applied to the case where, as discussed in connection with the second embodiment, equalization coefficient learning tracks are provided on the recording medium and equalization coefficients are obtained therefrom prior to recording or reproduction of information to or from the medium.

The magnetic field modulation method of the third embodiment may be replaced with a magnet o-optical modulation method for recording information. The magneto-optical modulation method involves modulating both the intensity of an optical beam and a magnetic field in synchronism for recording information marks to an optical recording medium.

Fourth Embodiment

The embodiments described so far have represented information by whether or not an information mark is recorded at a given information recording lattice point. By contrast, the fourth embodiment of the invention, in an attempt to boost information recording density, records information marks of a fixed shape to information recording lattice points, with the information marks deviated positionally from their corresponding information recording lattice points depending on the information to be recorded. That is, the recording phase of each information mark is varied at multiple levels in keeping with the target information to be recorded to that mark. In other words, the fourth embodiment achieves multi-phase recording as a variation of multi-level recording.

(1) Recording of information marks

Figures 13, 14:
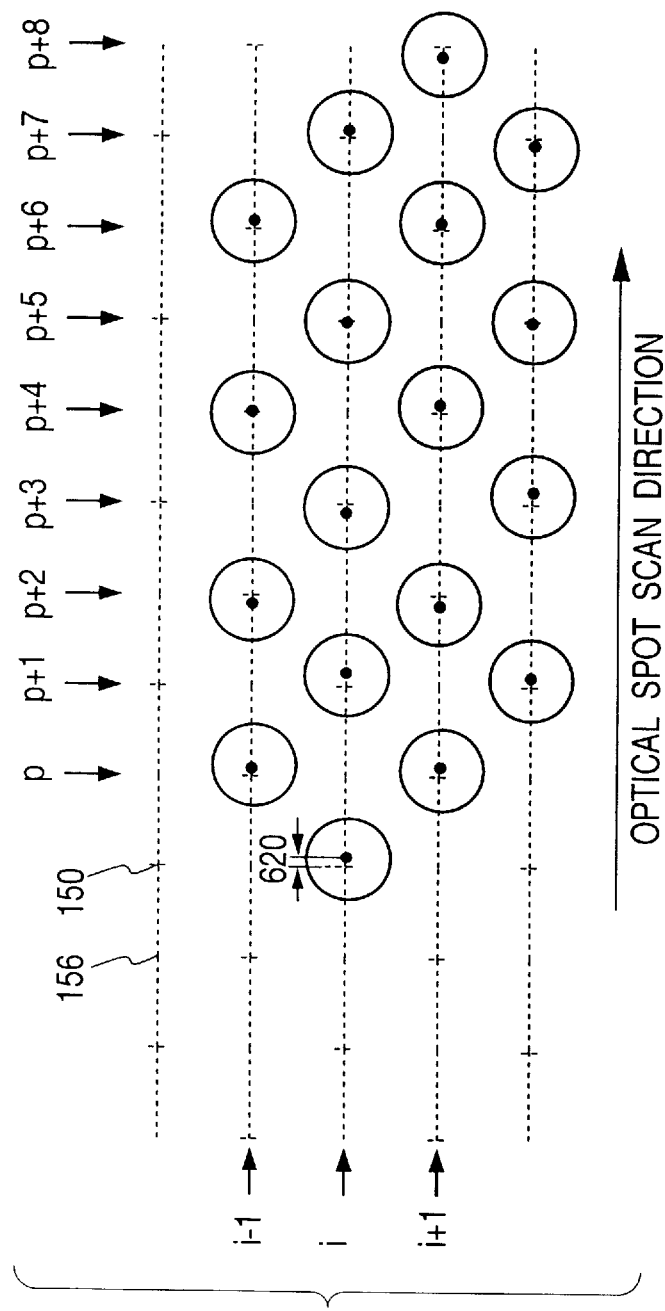
FIG. 13 is a view depicting the positions of a plurality of information marks recorded in a data recording region used by an optical information recording and reproduction method practiced as another embodiment of the invention.
FIG. 14 is a view showing typical relationships between information to be recorded and the positions of the information marks of FIG. 13 representing that information.

FIG. 13 illustrates typical arrays of information marks. As with the first embodiment, the fourth embodiment has its information recording lattice points arranged in the face-centered rectangular lattice pattern. The relationships between the values of information to be recorded and the information marks corresponding thereto are defined as shown in FIG. 14, with the spot scan direction taken as positive. FIG. 15A shows a plurality of information marks recorded in one sector of the track i. Although FIG. 15A depicts for purpose of illustration a plurality of information marks in an overlapping manner with respect to the same lattice point, only one information mark is actually recorded to one lattice point. For purpose of simplification, FIG. 15A does not include wobble marks which are actually located at the beginning of each sector and which are shown in FIG. 2. The learning marks indicated in FIG. 2 are not used by the fourth embodiment. As with the first embodiment, the fourth embodiment utilizes a magneto-optical medium as its optical recording medium. On recording information marks to the medium, the fourth embodiment emits a laser beam of a constant intensity level onto the medium surface. Thus, the shape of each recorded information mark is circular. Because the parameter that determines the shape of the circle is only the radius, it is easy both to form circles of a constant shape and to control their center positions. Reference numerals 654, 655, 657 and 658 in FIG. 15A represent recorded information marks deviated positionally by $-2\Delta$, $-\Delta$, $+\Delta$ and $+2\Delta$, respectively, relative to a lattice point p+5 (assumed to be an information recording lattice point) on the track i. Reference numeral 600 indicates a known reference recording mark with which to determine the timing for reading recorded information marks.

Figure 16:
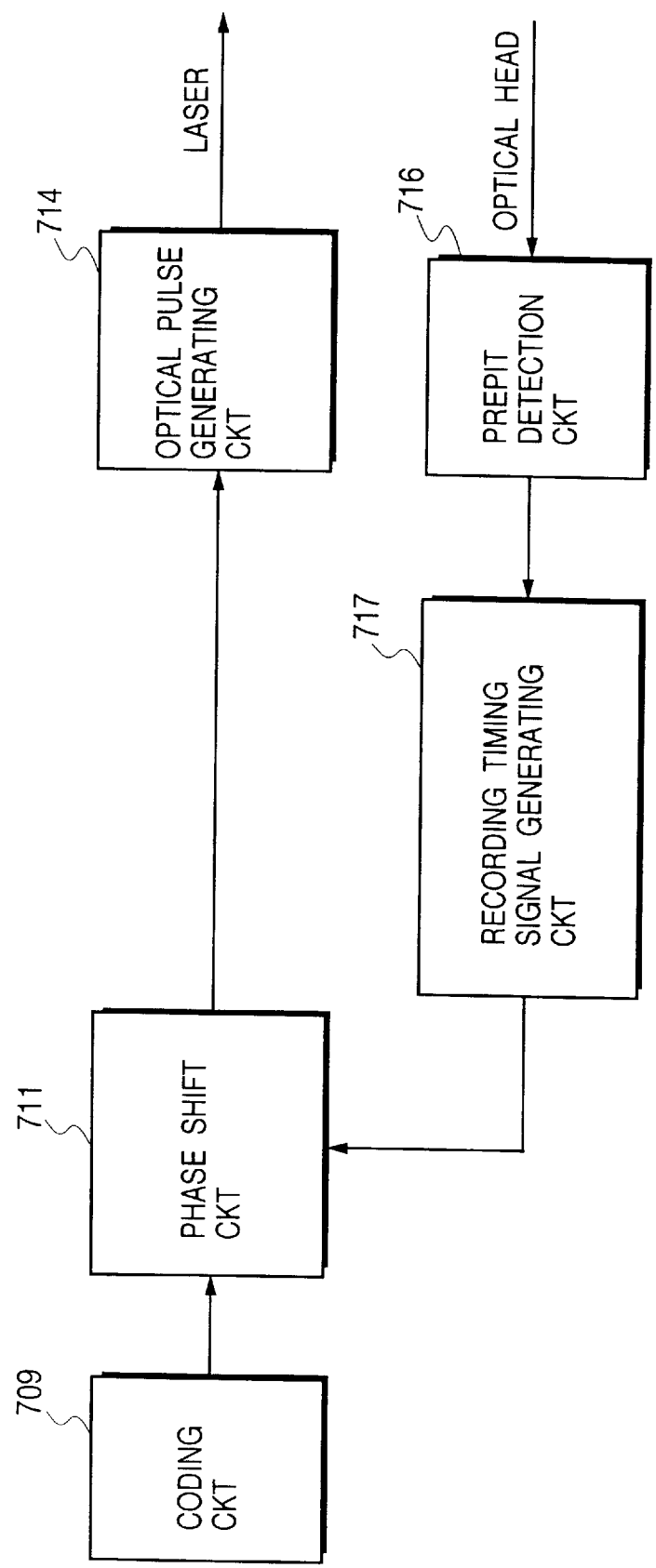
FIG. 16 is a schematic block diagram of a circuit arrangement for recording the multiple information marks shown in FIG. 13.

More specifically, the fourth embodiment utilizes the recording circuit arrangement shown in FIG. 16. A pre-pit detection circuit 716 in the circuit arrangement of FIG. 16 works as follows: a plurality of known pre-pits (not shown) are provided in advance at predetermined intervals at the beginning of each track on the disk surface. When the optical head (not shown) scans the pre-pits, a total light amount detector (not shown) in the optical head detects the total light amount which is represented by a total light amount signal. Using the total light amount signal thus acquired, the recording circuit arrangement generates a reference clock signal with its period and phase determined by these pre-pits. The reference clock signal is a clock signal synchronized with the timing for scanning each lattice point (i.e., each of the lattice points for recording information and of those for not recording it). Based on the reference clock signal, a recording timing signal generating circuit 717 generates a recording timing clock signal in keeping with the scan timing for information recording lattice points. As with the first embodiment, this recording timing clock signal varies in phase depending on whether the track being scanned is an even- or odd-numbered track. A coding circuit 709 divides user data into units of two bits, converts each two-bit unit to positional deviation information as per the relationships of FIG. 14, and supplies a phase shift circuit 711 with that information. Given the recording timing clock signal from the recording timing signal generating circuit 717, the phase shift circuit 711 modulates the phase of the received clock signal in accordance with the positional deviation information. An optical pulse generating circuit 714 modulates the laser beam in intensity in synchronism with the phasemodulated clock signal. For purpose of simplification, the circuit arrangement of FIG. 16 does not include a circuit for writing the reference recording mark 600 shown in FIG. 15.

(2) Reproduction of information marks

FIG. 15B shows in an overlapping manner waveforms of signal outputs given when information marks 654, 655, 657 and 658 are reproduced. The reproduced waveforms corresponding to these information marks are single-peaked waveforms 654', 655', 657' and 658' deviated by $\Delta$ or $2\Delta$ in peak position relative to a time 609 at which the spot center transits a lattice point 608. There exist a number of methods for detecting the amount of deviation based on the waveforms. In view of the fact that the peak position of each single-peaked reproduced waveform matches the center position of the corresponding information mark, the easiest way is to utilize differential signals derived from the reproduced waveforms 654', 655', 657' and 658'. The differential outputs of these reproduced signals take on the waveforms shown in FIG. 15C. What is indicated are the points in time at which there are detected the center positions of the information marks to which zero cross points 610 through 614 of the waveforms in question correspond. Thus when the time difference is measured between each of the zero cross points and the lattice point transmitting time 609, it is possible to obtain the amount of positional deviation of each information mark relative to the corresponding information recording lattice point.

Figure 17:
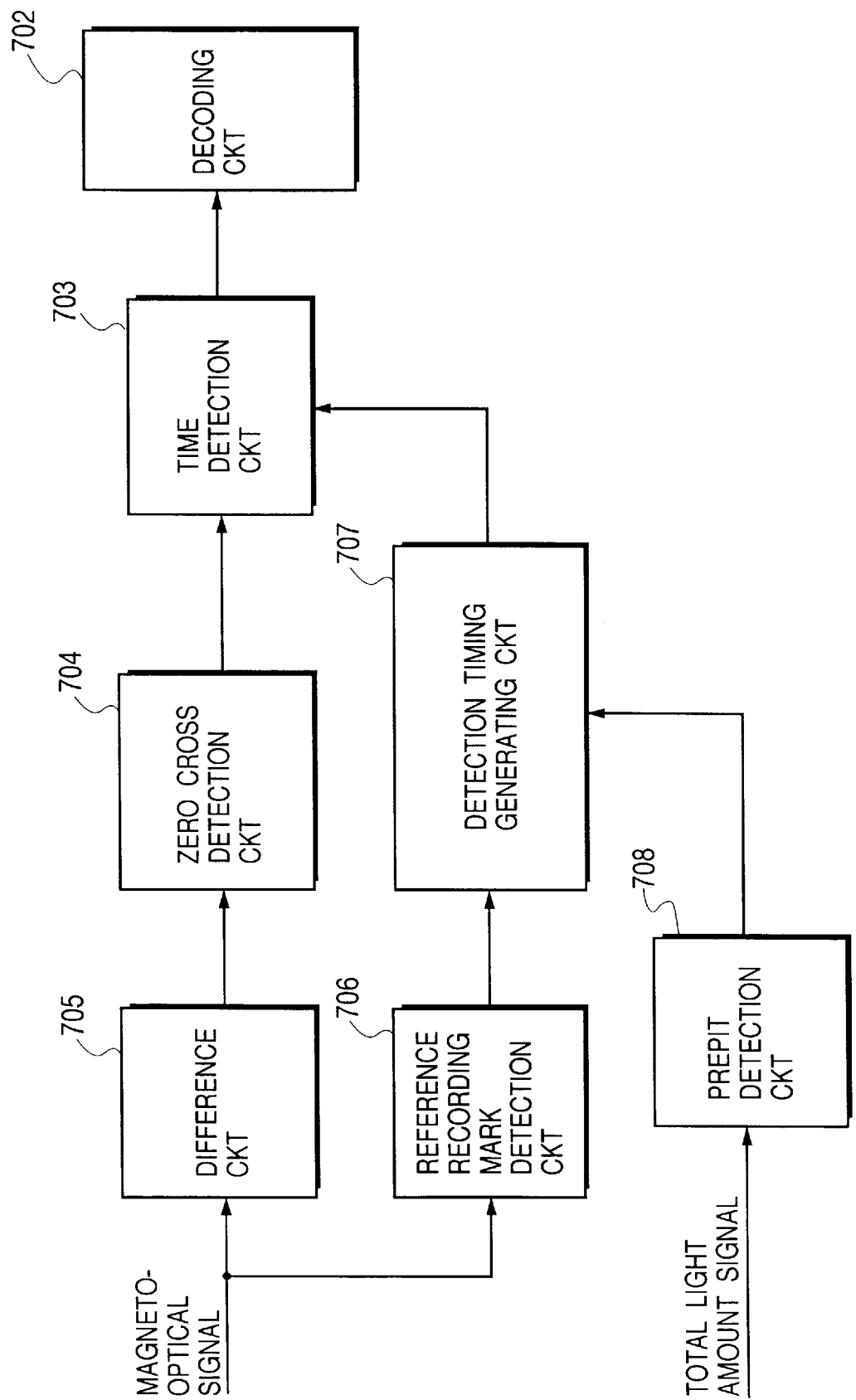
FIG. 17 is a schematic block diagram of a circuit arrangement for reproducing the multiple information marks shown in FIG. 13.

More specifically, the information reproducing circuit arrangement shown in FIG. 17 is used to reproduce information marks. As with the pre-pit detection circuit 716 in FIG. 16, a pre-pit detection circuit 708 in the circuit arrangement of FIG. 17 works as follows: plural pre-pits (not shown) are provided on the disk surface in the same manner as with the arrangement of FIG. 16. When the optical head (not shown) scans the pre-pits, the detection circuit 708 detects the total light amount which is represented by a total light amount signal. Using the total light amount signal thus acquired, the pre-pit detection circuit 708 generates a reference clock signal indicating the timing for scanning each lattice point (i.e., each of the lattice points for recording information and of those for not recording it) in synchronism with these pre-pits. Reference numeral 600 in FIG. 15 is a known reference recording mark with which to determine the timing for reading recorded information marks. A reference recording mark detection circuit 706 in FIG. 17 is a circuit that detects the marks 600 in each sector. Given the reference clock signal from the pre-pit detection circuit 708, the recording timing signal generating circuit 717 generates a detection timing clock signal indicating the timing for scanning information recording lattice points. In this case, the phase of the detection timing clock signal is made to coincide with the timing in which the reference recording mark detection circuit 607 detects the reference recording mark. That is, a discrepancy is detected between the reference clock signal which is generated by the pre-pit detection circuit 708 and which corresponds to each lattice point on the one hand, and the timing for detecting the center of the reference recording mark 600 on the other. The detection timing clock signal is shifted in phase by that discrepancy detected.

With the fourth embodiment in which the recording positions of information marks represent information, the reproduced output also varies depending on a number of factors. Whereas the above method for obtaining zero cross points requires precisely grasping the timing for the optical spot to transit information recording lattice points, that timing varies minutely depending on the spot shape variation, substrate deformation and other irregularities. In that case, the detection timing clock signal is corrected in phase as follows: reference recording marks 600 are first recorded to information recording lattice points in a data recording region. Information marks are then recorded. Upon reproduction of the recorded information marks, a discrepancy is detected between the reference clock signal derived from a plurality of pre-pits on the one hand, and the timing for detecting the reference recording marks 600 on the other. The result is a phase-corrected detection timing clock signal. This scheme generates the timing for scanning information recording lattice points based on the corrected detection timing signal even if information marks are shifted at recording time due to variations in linear velocity, recording power level, magnetic field intensity or medium sensitivity. Therefore, the center position of each information mark is accurately detected. The technique for correcting the detection timing in the above manner is disclosed in detail in Japanese Patent Laid-Open No. Sho 64-1167 and in U.S. patent application Ser. No. 07/169,597, now U.S. Pat.No. 4,949,325, corresponding thereto as well as in Japanese Patent Laid-Open No. Hei 1-155535. The disclosed technique is incorporated herein by reference.

A difference circuit 705 generates a difference signal (see FIG. 15C) of information reproduced signals (i.e., magneto-optical signals) output by a reproduction light detector (not shown) in the optical head (also not shown). The difference signal becomes zero at the center of each information mark being scanned. A zero cross detection circuit 704 detects the zero cross point of the difference signal and generates a signal indicating the timing of the detected zero cross point. A time detection circuit 703 measures the time difference between the timing signal generated by the zero cross detection circuit 704 on the one hand, and a detected timing signal generated by a detection timing signal generating circuit 707 on the other. The time difference represents a positional deviation of the recorded information mark being scanned. A decoding circuit 702 decodes the position of each scanned information mark based on the positional deviation and in accordance with the relationships defined in FIG. 14.

FIG. 14 shows how two-bit information corresponds illustratively to four positional deviation amounts. The relationships of such correspondence may be varied in a number of ways that may be studied using specific values. The relations between the mark pitch Mp and the residue of equalization have already been shown in FIG. 4. If the gap between contiguous marks is at least 60% of the spot size Ws as the two marks develop a maximum positional deviation therebetween coming closest to each other, then the effect of the crosstalk from adjacent tracks can be made small enough to be negligible for the fourth embodiment. That is, with the mark pitch Mp employed after being obtained from FIG. 4, the mark pitch Mp' for the fourth embodiment need only meet the following condition:

$$Mp' > Mp + 2n\Delta$$

For example, the wavelength of the light source and the numerical aperture of the objective lens given in FIG. 4 require the spot size to be about 1.4 $\mu$ and the mark pitch Mp to be 0.88 $\mu$m. Thus if $\Delta$ is set to 0.1 $\mu$m and Mp' to 1.08 $\mu$m or greater, the residue of equalization may be $-20$ dB or less, which permits recording and reproduction of information at high density. If n positional deviation amounts meeting the above condition are assumed to be used, log(2n) bits of information may be furnished per lattice point (the logarithm here is to the base 2). However, as seen from the circuit arrangement of FIG. 17, the fourth embodiment does not use the learning marks, equalization coefficient learning circuit and two-dimensional equalizing circuit used by the first embodiment. The track spacing and the mark pitch are enlarged so as to make it possible to ignore error in detecting the peak position of the reproduced signal from information marks, the error being caused by the crosstalk from adjacent tracks.

<Variations of the Fourth Embodiment>

(1) Another way to detect recorded positions of information marks involves first sample-holding the difference or differential value of reproduced signals at a time when a given information recording lattice point is transited by the optical spot. The absolute value and sign of the result from the above operation are used as the basis for detecting the deviation of the center position of the corresponding information mark from the information recording lattice point in question.

(2) Where the positional deviation of an information mark is detected by using the difference or differential values of reproduced signals obtained when the optical spot scans the information recording lattice point in question, the reference recording marks 600 discussed above may be utilized. That is, when information marks vary in size during recording, the absolute value of the difference or differential output of reproduced signals from the marks also varies. The absolute value is normalized first by sample-holding the difference of the reproduced signals or the positive and negative peak values of the differential output from reference recording marks 600. The reproducing circuit arrangement is controlled in gain so as to keep these values constant. This is accomplished by use of a common automatic gain control circuit. Under this alternative scheme, at a point in time at which a given information recording lattice point is transited, the difference or differential output of reproduced signals from information marks varying in size takes on a value that is dependent only on the positional deviation of information alone and free of the varying information mark sizes. Thus the positional deviation of any information mark is detected by determining the level of the information mark in question at a time when the corresponding information recording lattice point is transited by the optical spot.

Fifth Embodiment

The fifth embodiment further enhances recording density using two features: multi-phase recording used by the fourth embodiment wherein the recording position of each information mark is shifted from the corresponding information recording lattice point in accordance with the information to be recorded; and multi-level signal recording whereby the optical characteristic of information marks to be recorded is varied to reflect the target information so that reproduced signals thereof will be at multiple levels. The scheme is achieved in conjunction with an optical recording medium capable of multi-level recording. This recording method espouses magnetic field modulation recording as opposed to light intensity modulation recording adopted by the preceding embodiments.

With this recording method utilized, the recorded information marks have an arrow feather shape each, as shown in FIG. 18A. With the fifth embodiment, the number of levels at which to record information marks is as many as four. The levels are numbered "0", "1", "2" and "3" starting from the lowest reproduced signal level. The information marks 854, 855, 856, 857 and 858 have level "3" each, constituting five information marks capable of recording information by positionally deviating from the same single lattice point. An information mark group 881 comprises information marks each having level "1", indicating five information marks capable of recording information by positionally deviating from the same single lattice point. An information mark group 882 comprises information marks each having level "2", representing five information marks capable of recording information by positionally deviating from the same single lattice point. Reference numeral 880 points to four information marks which have different levels and which are capable of recording information in a position having no positional deviation relative to the same single lattice point. Although only one mark is actually recorded to one lattice point, a plurality of marks that may be recorded to the same single lattice point are shown in FIG. 18A in an overlapping manner for purpose of simplification. FIG. 19 shows typical relations of correspondence between information to be recorded and recorded information marks. Specifically, user data is divided into units of four bits. The preceding two bits and the succeeding two bits in each four-bit unit are combined to match both the positional deviation between the information mark recording position and the information recording lattice point, and the level of the signal recorded to the target information mark to be recorded. FIG. 20 shows the eye pattern depicting positional changes of reproduced signals from information marks recorded by the above recording method. In FIG. 20, 16 solid circles indicate those peak values of reproduced data which may be occupied by four-bit user data.

(1) Magneto-optical recording medium

Figure 21A:
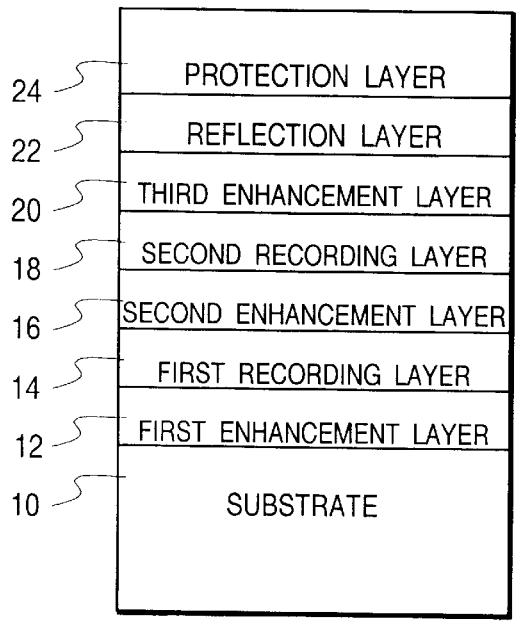
FIG. 21A is a schematic view outlining the structure of a multi-level recording medium for use in recording the information marks shown in FIG. 18.

Described below are the properties of the magneto-optical recording medium to which multi-level signals may be recorded. FIG. 21A schematically outlines the structure of such a multi-level recording medium. As illustrated, the medium comprises a transparent substrate 10 bearing at least two recording layers 14 and 18 stacked thereon. The first recording layer 14 is placed in a recorded state in at least one magnetic region of the external magnetic field being applied to the medium. The second recording layer 18 is composed of a magneto-optical recording layer that is placed in different recorded states in at least two different magnetic regions other than the magnetic region relevant to the first recording layer 14. This magneto-optical recording layer has magneto-optical characteristics different from those of the first recording layer 14. One such medium is disclosed in Japanese Patent Application No. Hei 6-96690 as well as in Japanese Patent Application No. Hei 6-143634 previously submitted by one of the assignees of the present application. Attention is also directed Japanese patent application no. 7-109679 which claimed priority from the above-two applications and further priority from Japanese patent application no. 6-207696. Finally, attention is drawn to Japanese laid-open patent application no. 8-129784.

Light enters the medium through the substrate 10, passes through a first, a second and a third enhancement layer 12, 16 and 20 as well as the recording layers 14 and 18, and is reflected by a reflection layer 22 to return to the substrate 10. During the passage above, the light undergoes magnetic changes of characteristics in the first and second recording layers 14 and 18. The first enhancement layer 12 is located between the substrate 10 and the first recording layer 14; the second enhancement layer 16, between the first and the second recording layer 14 and 18; and the third enhancement layer 20, between the second recording layer 18 and the reflection layer 22. The enhancement layers are provided to prevent chemical interference between the component layers. Typical cases of such chemical interference include the spread of chemicals from one layer to another and the entry of undesirable elements into a layer from nearby layers. These protective functions are provided by the enhancement layers being made up of chemically stable substances. In addition, the enhancement layers must be optically transparent to let both the light from the substrate 10 and the light returning from the reflection layer 22 pass therethrough. When the enhancement layers are suitably controlled in thickness, it is possible to enhance the amount of light reflected from the multi-layer structure medium. Such enhancement layers are composed illustratively of SiO2 and SiN.

The second recording layer 18 is made up of a perpendicular magnetized layer and a capping layer. The capping layer, connected magnetically to the perpendicular magnetized layer, is composed of a magnetic substance whose direction of magnetization tends to rotate toward the external magnetic field when a laser beam is emitted for recording or erasing information to or from the medium. For the fifth embodiment, the perpendicular magnetized layer is an amorphous alloy made up of rare earth and transition metals. The alloy constitutes a ferrimagnetic material in which the sub-lattice magnetic moment of rare earth metals is dominant over that of transition metals from room temperature up to Curie temperature. The capping layer is composed of a magnetic material selected from four kinds of metals: transition metals, an alloy made up of transition and noble metals, an alloy composed of transition and rare earth metals including at least either oxygen or nitrogen, and an alloy formed by transition and rare earth metals whose anisotropy energy is greater than that of the above-mentioned perpendicular magnetized layer. Such a magneto-optical recording medium when utilized is subjected to external magnetic fields of four different levels corresponding to the recorded states of the recording layers. This allows signals to be recorded at four levels.

More specifically, the substrate 10 is a transparent board made of glass or polycarbonate. The first enhancement layer 12 is constituted by a 100 nm-thick SiN layer; the first recording layer 14, by a 15 nm-thick layer of $Tb_{91}Fe_{62}Co_{10}Cr_9$; the second enhancement layer 16, by a 10 nm-thick SiN layer; the second recording layer 18, by a 20 nm-thick perpendicular magnetized layer of $Tb_{32}Fe_{56}Co_{12}$ and a 5 nm-thick capping layer of $Pt_{80}Co_{20}$ stacked thereon; the third enhancement layer 20, by a 10 nm-thick SiN layer; and the reflection layer 22, by a 70 nm-thick Al layer. A protection layer 24 is composed of UV resin.

To record multi-level information to such a magneto-optical recording medium requires driving an optical head (not shown) and a magnetic head (not shown) suitably relative to the medium. While the optical head is emitting a laser beam onto one of recording tracks on the magneto-optical recording medium, the magnetic head applies to the illuminated spot an external magnetic field whose intensity is modulated at multiple levels reflecting the information to be recorded. This records information marks of four levels or more to the first and the second recording layer 14 and 18. In such a case, the laser beam may be applied continuously at a constant intensity or may be emitted periodically or in pulse form.

In an alternative setup, the optical head and magnetic head are also driven relative to the magneto-optical recording medium. While the magnetic head is applying an external magnetic field to one of the recording tracks on the medium, the optical head emits to the target track a laser beam whose intensity is modulated at multiple levels to reflect the signals of information to be recorded. This also records information marks of four levels or more to the first and the second recording layer 14 and 18.

What follows is a detailed description of the principles of multi-level recording on the magneto-optical recording medium. In the second recording layer 18 composed of the perpendicular magnetized layer 18A and the capping layer 18B, the sub-lattice magnetic moment of transition metals in the perpendicular magnetized layer 18A is readily reversed in the direction of switched connection magnetic fields under the influence of the capping layer 18B. Thus the direction of magnetization of the entire second recording layer 18 may be turned toward the external magnetic field or opposite thereto. On the other hand, the first recording layer 14 includes no capping layer and has one recorded state in a magnetic region different from that of the second recording layer 18. At an elevated temperature, the direction of magnetization of this first recording layer 14 as a whole is readily reversed toward the external magnetic field.

Where such workings are in effect, the above medium makeup allows signals to be recorded with a downward external magnetic field regarded as the magnetic field direction of recording and with an upward external magnetic field taken as the magnetic field direction of erasure. As shown illustratively in FIG. 21A, the medium is primarily made up of the first recording layer 14 constituting a ferrimagnetic material in which the sub-lattice magnetic moment of rare earth metals is dominant over that of transition metals from room temperature up to Curie temperature, and the second recording layer 14 constituting a ferrimagnetic material wherein the sub-lattice magnetic moment of transition metals is dominant over that of rare earth metals from room temperature to Curie temperature, the two layers 14 and 18 being stacked one upon the other.

Figure 21B:
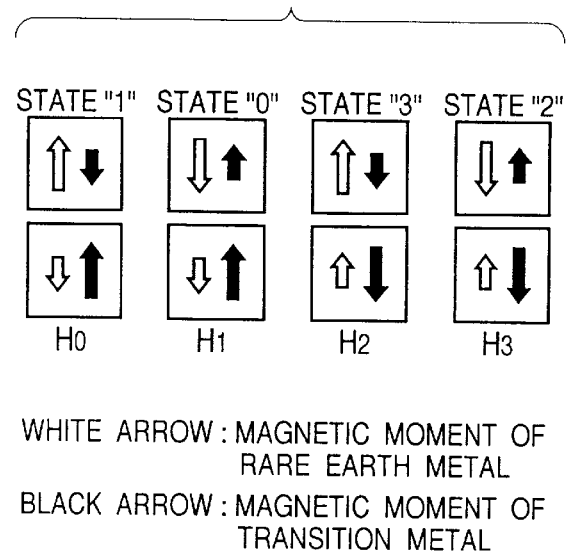
FIG. 21B is a view illustrating typical relationships between a magnetic moment and a magnetic field possessed by magnetized regions formed in two recording layers inside the multi-level recording medium of FIG. 21A.

The entire magnetic moment of each recording layer is determined as the composite of the magnetic moment of rare earth metals and that of transition metals making up the recording layer in question. In the upper portion of FIG. 21B, white and black arrows indicate the magnetic moments of metals in the second recording layer 18 with respect to the magnetic fields external to the layer; in the lower portion of FIG. 21B, similar white and black arrows point to the magnetic moments of metals in the first recording layer 14 with respect to the magnetic fields external to the layer.

Figure 22:
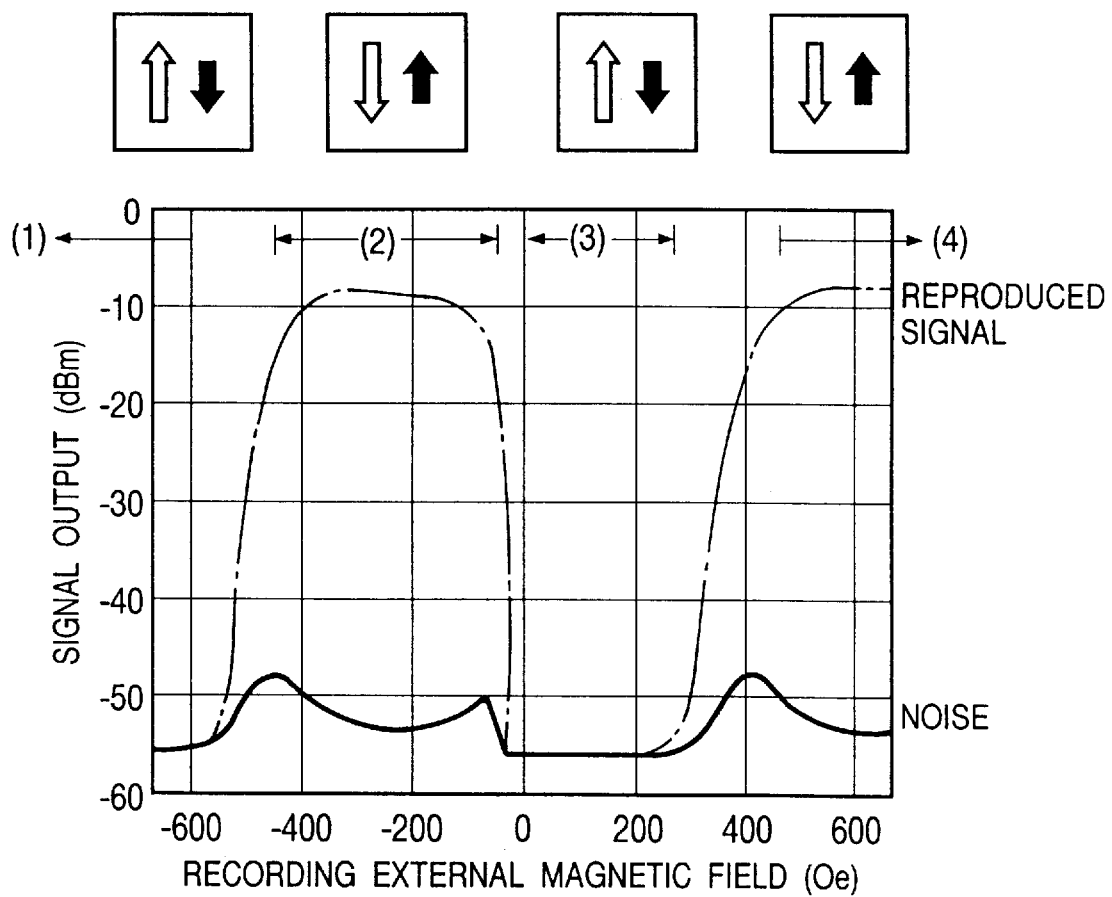
FIG. 22 is a view depicting typical relationships between external magnetic fields and the levels of reproduced signals, the external magnetic field with no DC bias being applied to the multi-level recording medium of FIG. 21A, the signal levels being derived from the signals reproduced from a first and a second recording layer inside the recording medium upon application of the magnetic field thereto.

FIG. 22 depicts a typical outcome of having recorded and reproduced information to and from the second recording layer 18. For recording, the laser beam is emitted at regular intervals according to a clock signal and the recording magnetic field is varied between 1 and 0 in synchronism with the laser emission period. For reproduction, reproduced signal components corresponding to the repetitive frequencies of the recorded magnetic fields are detected as shown in FIG. 22 together with the accompanying noise. From this, it can be seen that a single recording layer allows recorded states to be produced in two different magnetic regions of external magnetic fields through the combination of the magnetic moment of rare earth metals with that of transition metals. Where this second recording layer 18 is combined with the first recording layer 14, the workings involved are as follows:

(i) An external magnetic field H0 (in the region (1) of FIG. 22) strong enough to change the direction of magnetization of the entire first recording layer 14 for erasure thereof is applied in the magnetic field direction of erasure. This turns the sub-lattice magnetic moment of transition metals inside the first recording layer 14 in the magnetic field direction of recording, and the sub-lattice magnetic moment of transition metals inside the second recording layer 18 in the magnetic field direction of erasure.

(ii) An external magnetic field Hi (in the region (2) of FIG. 22) strong enough to change the direction of magnetization of the entire first recording layer 14 for recording thereto is applied in the magnetic field direction of erasure. This turns the sub-lattice magnetic moment of transition metals inside the first and the second recording layer 14 and 18 in the magnetic field direction of erasure.

(iii) An external magnetic field H2 (in the region (3) of FIG. 22) strong enough to change the direction of magnetization of the entire first recording layer 14 for erasure thereof is applied in the magnetic field direction of recording. This turns the sub-lattice magnetic moment of transition metals inside the first and the second recording layer 14 and 18 in the magnetic field direction of recording.

(iv) An external magnetic field H3 (in the region (4) of FIG. 22) strong enough to change the direction of magnetization of the entire first recording layer 14 for recording thereto is applied in the magnetic field direction of recording. This turns the sub-lattice magnetic moment of transition metals inside the first recording layer 14 in the magnetic field direction of erasure, and the sub-lattice magnetic moment of transition metals inside the second recording layer 18 in the magnetic field direction of recording.

Figure 21C:
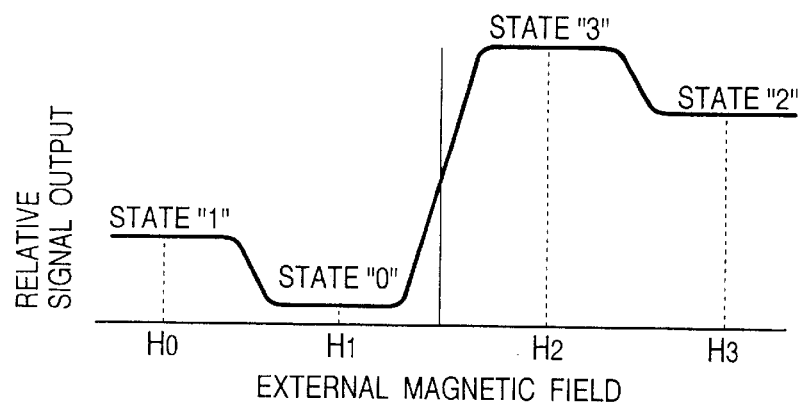
FIG. 21C is a view of levels representing external magnetic fields applied to the multi-level recording medium of FIG. 21A and the reproduced signal from the recorded information.
Figure 23:
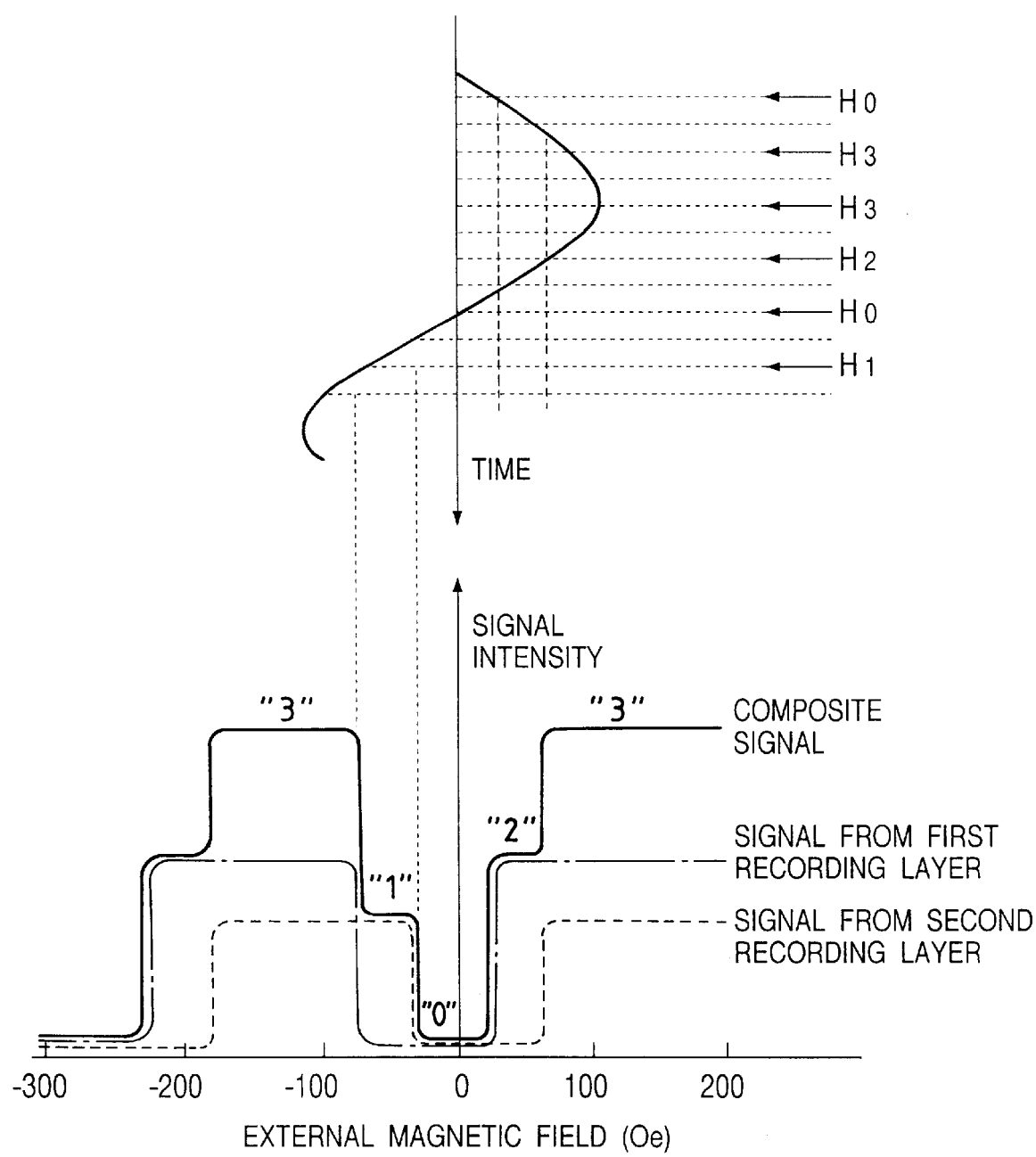
FIG. 23 is a view illustrating typical relationships between external magnetic fields and reproduced signal levels, the external magnetic fields being applied to the multi-level recording medium of FIG. 21A, the reproduced signals stemming from the first and the second recording layer of the recording medium.

The magnitude of changes in the Kerr angle detected as a signal from the magneto-optical recording medium is in proportion to the sum of the sub-lattice magnetic moments of transition metals inside the first and second recording layers 14 and 18. Thus as shown in FIG. 23, four different values reflecting different external magnetic field intensities are derived from the output from a recording track to which the external magnetic fields H0, H1, H2 and H3 were applied consecutively. FIG. 21C schematically depicts typical relations between external magnetic field intensities and relative signal outputs corresponding thereto. As shown illustratively in FIG. 21C, a four-level signal is recorded by setting the state recorded by the external magnetic field H1 to level "0", the state recorded by the external magnetic field H0 to level "1", the state recorded by the external magnetic field H3 to level "2", and the state recorded by the external magnetic field H2 to level "3".

(2) Recording of multi-level information

Described below is how the fifth embodiment carries out the multi-level recording of signals through the use of the magneto-optical recording medium. In recording multi-level signals to the medium, the fifth embodiment modulates an external magnetic field in four steps to reflect the information to be recorded. While recording multi-level signals in this manner, the fifth embodiment varies the timing of laser beam emission in keeping with the information to be recorded. This provides the same multi-phase recording as that implemented by the fourth embodiment.

For recording operation, the magneto-optical recording medium is first mounted on a medium driving part such as a turntable. The optical head is to be located on the transparent substrate side and the magnetic head on the protection layer side (neither shown). The medium driving part is then activated relatively to drive the magneto-optical recording medium with respect to the optical and magnetic heads at a constant linear velocity. During this process, the optical head and magnetic head are positioned to a given track.

With the fifth embodiment, it is assumed that reference recording marks 800 like those 600 (FIG. 15) used by the fourth embodiment are recorded in advance on the recording medium (see FIG. 18). Although not shown in FIG. 18, it is assumed that the recording medium has a plurality of pre-pits (not shown) recorded beforehand at fixed intervals at the beginning of each track as in the case of the fourth embodiment. It is also assumed that the beginning of each sector of each track has wobble marks 151 through 153 recorded thereto beforehand (as shown in FIG. 2 for use by the first embodiment). Furthermore, unlike the fourth embodiment, the fifth embodiment assumes that the learning marks 154 and 155 used by the first embodiment are recorded beforehand in the equalization coefficient learning region of each sector. As with the first and the fourth embodiment, the fifth embodiment has its information recording lattice points arranged in the face-centered rectangular lattice pattern.

Figure 26:
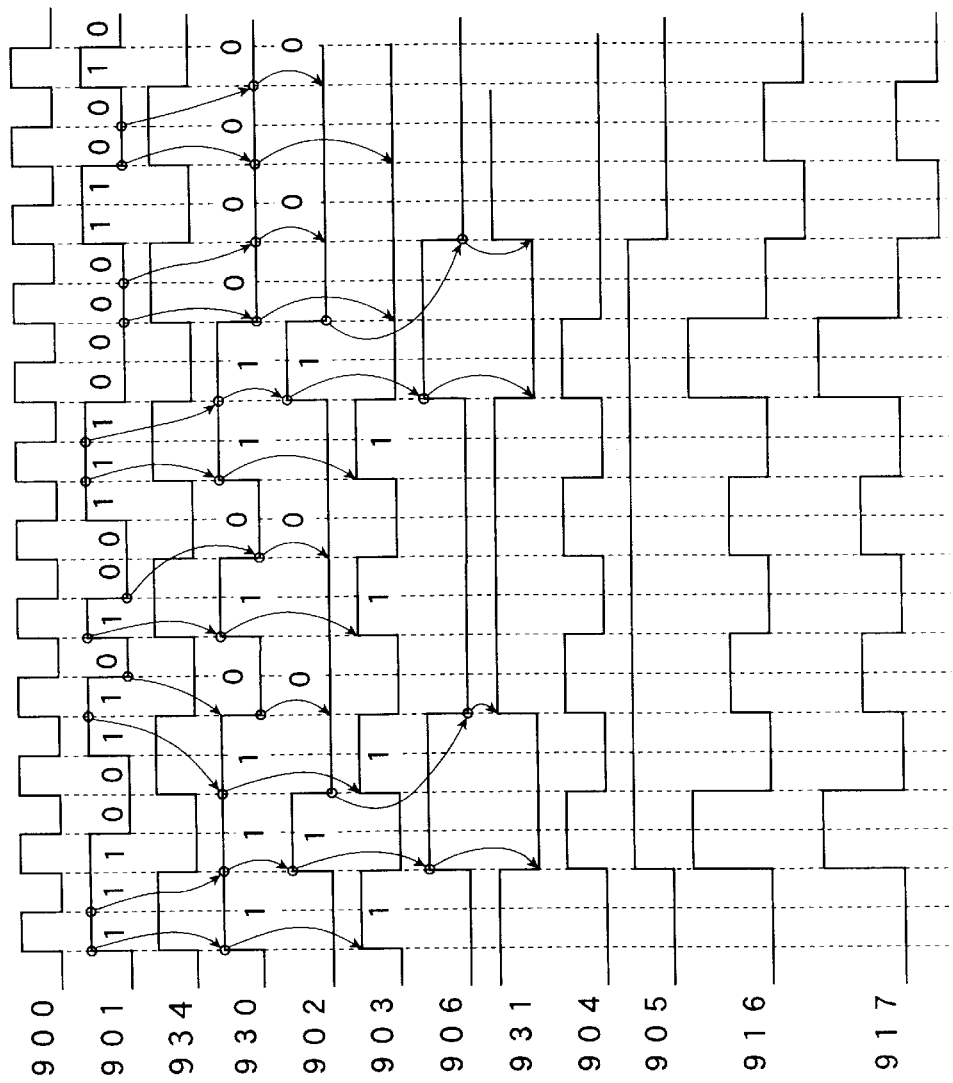
FIG. 26 is a timing chart of several signals used by the circuits in the arrangement of FIG. 24.
Figure 27:
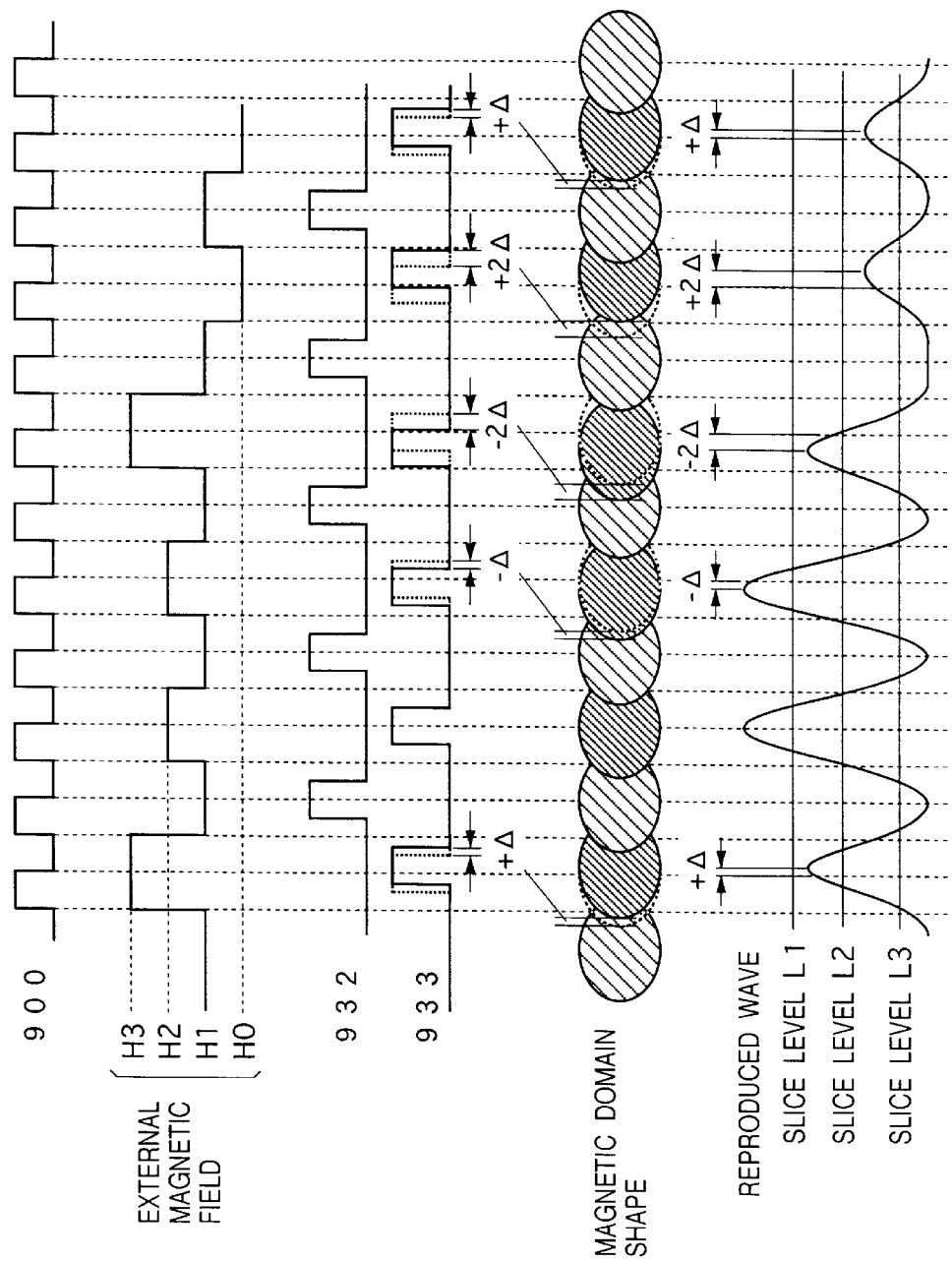
FIG. 27 is a timing chart of other signals used by the circuits in FIG. 24.

Below is a detailed description of how user data is recorded, with reference to FIGS. 24 and 25 (schematic block diagrams) and FIGS. 26 and 27 (timing charts). Given a total light amount signal from a total light amount detector (not shown) in the optical head (not shown), the pre-pit detection circuit 716 in FIG. 24 detects a plurality of pre-pits (not shown) fixed distances apart at the beginning of the target track to which to record information on the disk surface. In so doing, the pre-pit detection circuit 716 generates a reference clock signal 900 synchronized in period and phase with the detected pre-pits. The recording timing signal generating circuit 717 in FIG. 24 generates a clock signal 934 by dividing in two the received reference clock signal 900. The recording timing signal generating circuit 717 also generates a clock signal 910 indicating the timing for scanning a plurality of information recording lattice points, and a clock signal 932 indicating the timing for scanning intermediate lattice points which are each located between two contiguous information recording lattice points and to which no information is recorded.

A multi-level coding circuit 709 operates in synchronism with the reference clock signal 900. The coding circuit 709 divides user data into units of four bits, separates the preceding two bits from the succeeding two bits in each four-bit unit, and generates two-bit data for magnetic field control 930 and two-bit data for position control 920 whereby the magnetic field intensity and the positional deviation are controlled in accordance with the relationships in FIG. 19. The data 930 and 920 are fed to a multi-level generating circuit 710 and a phase shift circuit 711, respectively. With the fifth embodiment, the preceding two bits "00", "01" and "11" in four-bit units of the user data correspond to levels "1", "2" and "3", respectively. When these preceding two bits take on such values, the succeeding two bits "00", "01", "10" and "11" in the four-bit units of the user data correspond to positional deviation amounts "−2Δ", "−Δ", "+Δ38" and "+2Δ", respectively. It should be noted that the preceding two bits "01" corresponds to the positional deviation amount "0". In this case, the succeeding two bits "00", "01", "10" and ×11" in four-bit units of the user data correspond to levels "1", "0", "3" and "2", respectively. Therefore, if the preceding two bits in a given four-bit unit of the user data are other than "01", the multi-level coding circuit 709 outputs two kinds of two-bit data: two-bit data for magnetic field control 930 which is dependent on the preceding two bits of the four-bit unit in question and which represents one of the multiple levels as per the relations defined in FIG. 19, and two-bit data for position control 920 which is dependent on the succeeding two bits of the four-bit unit in question and which represents a positional deviation amount according to the relations in FIG. 19. If the preceding two bits in a given four-bit unit of the user data are "01", then the multi-level coding circuit 709 generates two-bit data for magnetic field control 930 representing one of the multiple levels as per the relations defined in FIG. 19, and outputs two-bit data for position control 902 representing the positional deviation "0".

Figure 25:
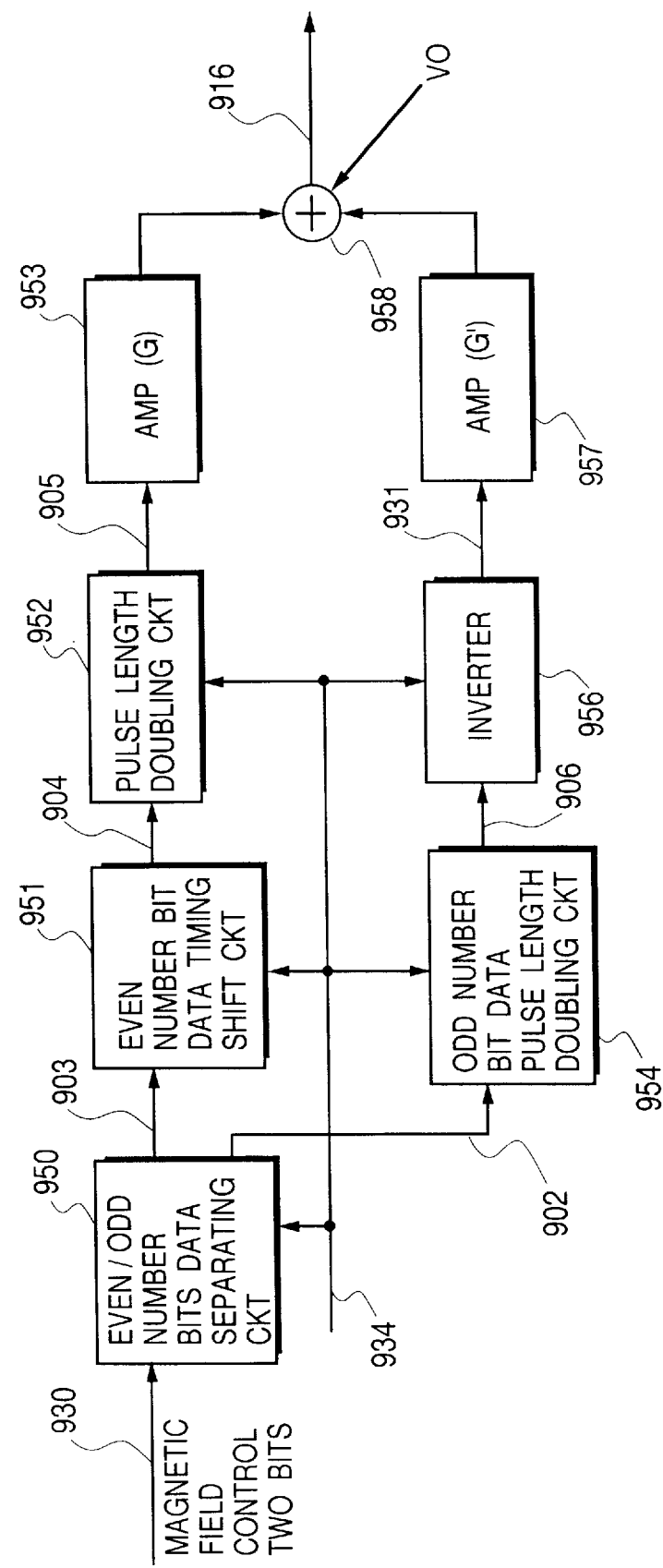
FIG. 25 is a schematic block diagram of a multi-level generating circuit (710) in the circuit arrangement of FIG. 24.

In the multi-level generating circuit 710, as shown in FIG. 25, an even/odd-numbered bit data separating circuit 950 receives the two-bit data for magnetic field control 930 in a given four-bit unit of the user data from the multi-level coding circuit 709, and separates the received data into the initial bit 903 (called the even-numbered bit hereunder) and the next bit 902 (called the odd-numbered bit hereunder). More specifically, the even/odd-numbered bit data separating circuit 950 comprises two AND circuit, one AND circuit generating the odd-numbered bit signal 902 by AND'ing the inverted signal of the clock signal 934 and the two-bit data for magnetic field control 930, the other AND circuit generating the even-numbered bit signal 903 by AND'ing the clock signal 934 and the two-bit data for magnetic field control 930. An even-numbered bit timing shift circuit 951 generates a signal 904 by shifting the even-numbered bit signal 903 by one period of the clock signal 934. Pulse length doubling circuits 952 and 954 respectively prolong the pulse lengths of the timing-shifted signal 904 and of the odd-numbered bit signal 902 by one period of the signal 934, thereby generating signals 905 and 906. An inverter 956 generates an inverted signal 931 by inverting the signal 906.

Thereafter, amplifiers 953 and 957 generate two signals, the amplitudes of which are obtained by amplifying the signals 905 and 931 by factors of G' and G, respectively. The factors G' and G satisfy the relationship G'=−2×G. The two signals generated by the amplifiers 953 and 957 are added by an adder 958 whereby a multi-level voltage is generated. The voltage is then converted by a magnetic head drive circuit 713 into a current to drive the magnetic head. Given the current, the magnetic head (not shown) generates the external magnetic fields shown in FIG. 27 for application to the recording medium. With the fifth embodiment, a magnetic region at level "0" is always generated at an intermediate lattice point between a pair of information recording lattice points. For this reason, the adder 958 is further fed with an offset of V0 to shift its output 916 so as to produce the above-described magnetic field H1 corresponding to the reproduction level "0". The output 916 of the adder 958 has one of the four levels "0", "1", "2" and "3" which corresponds to the two-bit data for magnetic field control derived from each four-bit unit of the user data.

Figure 24:
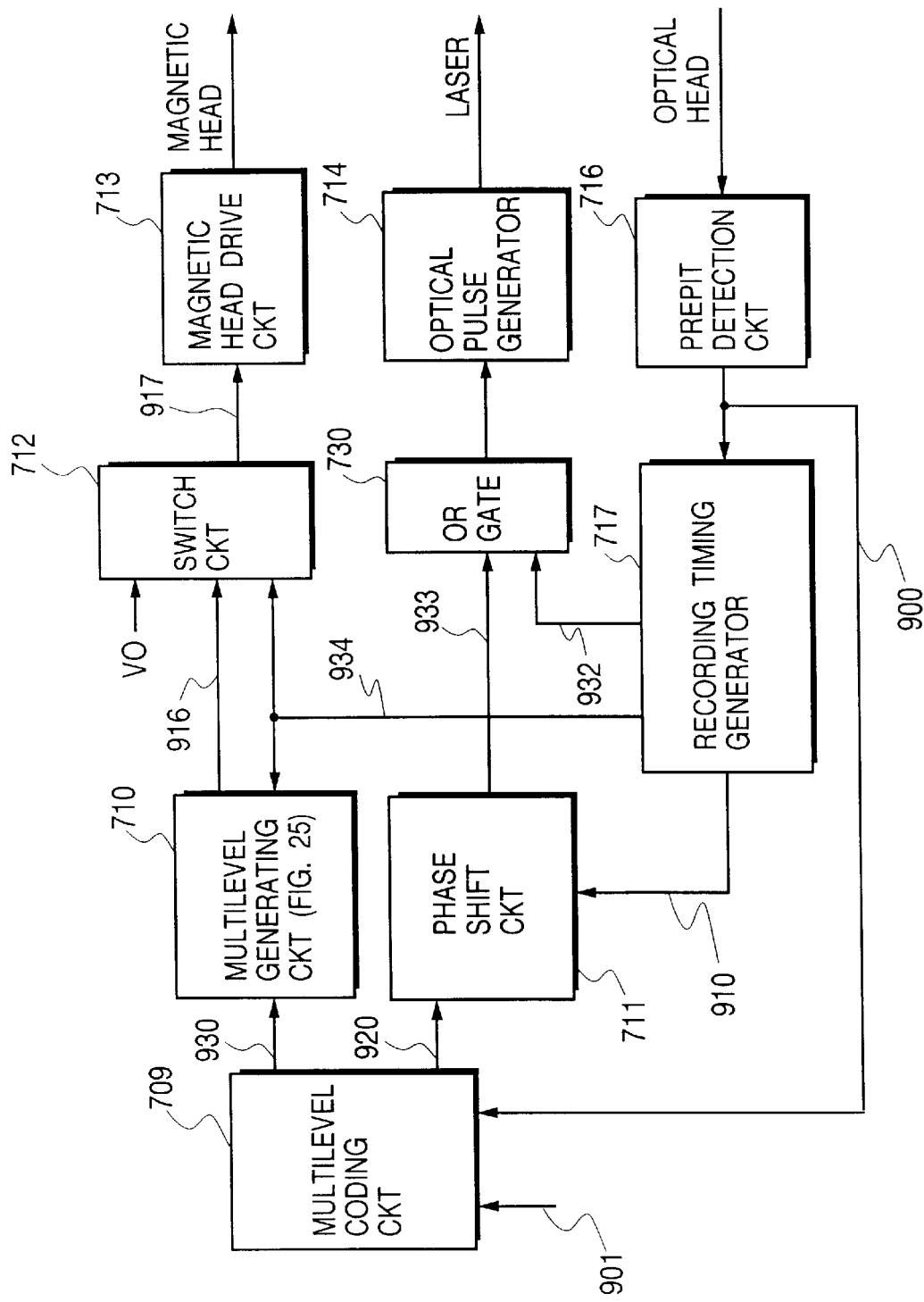
FIG. 24 is a schematic block diagram of an information recording circuit arrangement for recording information to the multi-level recording medium of FIG. 21A.

In FIG. 24, a switch circuit 712 selects the signal 916 when the clock signal 934 is Low, and selects the offset V0 when the clock signal 934 is High. The signal 916 and the offset V0 are selected alternately in synchronism with the clock signal 934. The output 917 of the switch circuit 712 is input to the magnetic head drive circuit 713. The output of the magnetic head drive circuit 713 causes the magnetic head (not shown) to generate an external magnetic field. This produces the magnetic field H1, H0, H3 or H4 for generating a magnetized state at each of information recording lattice points, the magnetized state corresponding to the level "0", "1", "2" or "3" of the output 916 from the adder 958. At lattice points where no information mark is recorded, the magnetic field H1 is produced to generate the magnetized state corresponding to the reproduction level "0".

Meanwhile, the phase shift circuit 711 in FIG. 24 shifts the phase of the clock signal 910 indicating the timing for scanning information recording lattice points in accordance with the two-bit data for position control 920 in each four-bit unit of the user data 901 coming from the multi-level coding circuit 709. An optical pulse generator 714 in FIG. 24 receives the phase-shifted clock signal via an OR gate 730. In synchronism with the received phase-shifted clock signal, the optical pulse generator 714 controls the timing for laser beam emission. When the external magnetic field is thus switched to an appropriate level, the optical head emits optical pulses using the timing indicated by a signal 933 shown in FIG. 27. The spots illuminated by the optical pulses in the recording layers are heated up to a temperature high enough to let the external magnetic field reverse the direction of magnetization of the spot in question. The optical pulse-illuminated spots in the recording layers develop, as shown in FIG. 27, a magnetized domain according to the magnitude of the external magnetic field applied. In this manner, there are formed at information recording lattice points a magnetized state reflecting each four-bit unit of the user data in accordance with the multi-level magnetic fields generated by the multi-level generating circuit 710 and magnetic head drive circuit 713 as well as according to the multiple phases generated by the phase shift circuit 711. To the lattice points where no information is recorded, the optical pulse generator 714 generates optical pulses with the timing for scanning these lattice points in response to the clock signal 932 coming from the recording timing signal generating circuit 717 via the OR gate 730. Thus at each of the lattice points where no information is recorded, a predetermined magnetized state is generated by the magnetic field H1 produced by operation of the switch circuit 712 and magnetic head drive circuit 713 as well as by the optical pulses discussed above.

(3) Reproduction of information marks

Figure 28:
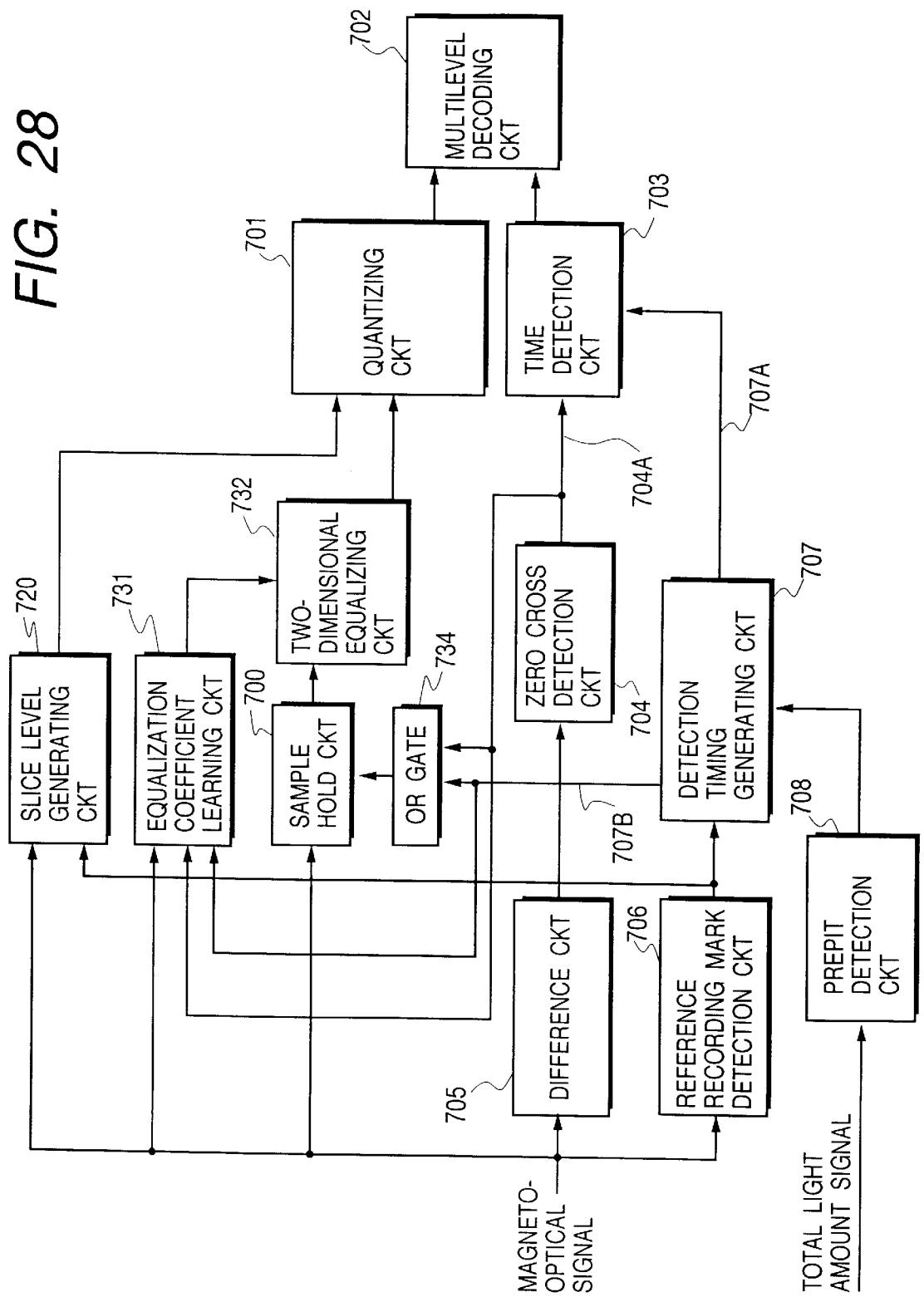
FIG. 28 is a schematic block diagram of an information reproducing circuit arrangement for reproducing information from the multi-level recording medium of FIG. 21A.

The information marks recorded in the manner described are reproduced illustratively by use of the reproducing circuit arrangement in FIG. 28. In FIG. 28, the pre-pit detection circuit 708 utilizes a total light amount signal from a total light amount detector (not shown) inside the optical head (not shown) to detect a plurality of pre-pits previously formed at the beginning of the track being reproduced. With the pre-pits detected, the pre-pit detection circuit 708 generates a reference clock signal having a period and a phase synchronized with these pre-bits. While the optical head is scanning the sector in question, the reference recording mark detection circuit 706 detects reference recording marks (FIG. 18) from the reproduced signals (i.e., magneto-optical signals) supplied by a reproduction light detector (not shown) within the optical head. In so doing, the reference recording mark detection circuit 706 outputs a signal indicating the timing in which the center point of each of the information marks is scanned.

In keeping with the scan timing of the reference recording marks 800 detected by the reference recording mark detection circuit 706, the detection timing signal generating circuit 707 shifts the phase of the reference clock signal generated by the pre-pit detection circuit 708. With the reference clock signal thus shifted in phase, the detection timing signal generating circuit 707 generates two signals: a signal 707A indicating the timing for scanning the information recording lattice points in a given data recording region; and a clock signal 707B indicating the timing for scanning the lattice points where no information is recorded, each of these lattice points being located between a pair of contiguous information recording lattice points inside the data recording region in question.

The difference circuit 705 generates a difference signal of the magneto-optical signal detected from the medium by the optical head. The zero cross detection circuit 704 detects the zero cross timing of the difference signal and outputs a zero cross timing signal 704A accordingly. The time detection circuit 703 detects a temporal stagger between two timings: the zero cross timing indicated by the zero cross timing signal 704A, and the information recording lattice point scanning timing supplied by the detection timing signal generating circuit 707. With the temporal stagger detected, the time detection circuit 703 outputs digital data representing the positional deviation corresponding to that stagger.

In FIG. 18B, reference numerals 854', 855', 856', 857' and 858' indicate the waveforms of the reproduced magneto-optical signals from information marks 854, 855, 856, 857 and 858, respectively. In FIG. 18C, reference numeral 810, 811, 813 and 814 denote the zero cross points of the difference signals derived from the reproduced signals 854', 855', 857' and 858', respectively. FIG. 27 shows reproduced waveforms of typical magnetic domain shapes formed so as to reflect specific user data. The circuit operations discussed above are basically the same as those of the corresponding circuits constituting the fourth embodiment.

In response to the timing signal received from the reference recording mark detection circuit 706, the signal indicating the detection of reference recording marks 800, a slice level generating circuit 720 admits the peak values of the magneto-optical signals derived from the reference recording marks 800 in question. With the peak values received, the slice level generating circuit 720 determines slice levels L1, L2 and L3 (in FIG. 27) as the basis for determining the levels of the reproduced signals from given information recording marks. The slice levels are determined as follows: a reference recording mark 800 providing a maximum reproduced signal is previously recorded first, followed by another reference recording mark providing a minimum reproduced signal. When the reference recording mark detection circuit 706 transmits the timing signal indicating the detection of the above two reference recording marks 800, the slice level generating circuit 720 receives the peak values of the reproduced signals derived from the two marks in response to the timing signal, and determines the slice levels L1, L2 and L3 based on the received peak values. For purpose of simplification, FIG. 18 does not include the two reference recording marks described above.

A sample hold circuit 700 sample-holds magneto-optical signals based on the timings given by two timing signals: the zero cross timing signal 704A supplied by the zero cross detection circuit 704 via the OR gate 734, and the timing signal 707B indicating the timing for scanning intermediate lattice points which are each located between information recoding lattice points and which are fed by the detection timing signal generating circuit 707. A two-dimensional equalizing circuit 732 is basically the same in function as the identically named circuit used by the first embodiment. In operation, the two-dimensional equalizing circuit 732 removes crosstalk from adjacent tracks as follows: a crosstalk component is included in the reproduced signal (i.e., magneto-optical signal) derived from each information recording lattice point on the track being scanned, the component stemming from two tracks adjacent to the target track. The two-dimensional equalizing circuit 732 removes the crosstalk component using a pair of reproduced signals derived from a pair of intermediate lattice points located immediately before and after the information recording lattice point in question. The two-dimensional equalizing circuit 732 further removes inter-symbol interference left in the crosstalk-removed reproduced signal using at least two reproduced signals: a reproduced signal from at least one information recording lattice point located before the current information recording lattice point, and a reproduced signal from at least one information recording lattice point located after the current information recording lattice point.

An equalization coefficient learning circuit 731 is basically the same in function as the identically named circuit used by the first embodiment. What the equalization coefficient learning circuit 731 does is to calculate equalization coefficients used by the two-dimensional equalizing circuit 732, through the use of the reproduced signals from learning marks (not shown) recorded in the sector being scanned by the optical head. With the fifth embodiment, the learning marks for learning equalization coefficients are recorded by magnetic field modulation and have an arrow feather shape each. The learning marks of this shape permit the learning of equalization coefficients in exactly the same way that the learning marks of the first embodiment do. With the fifth embodiment, however, it is desirable to make the level of information recorded as the learning marks coincide with one of the four levels specific to the information marks recorded in the data region. In particular, that level should preferably be the highest of the four levels. Unlike the first embodiment, the fifth embodiment has its learning marks recorded at points slightly deviated from information recording lattice points. The amount of such deviation is made to match one of the four positional deviations that may be taken by the information marks recorded in the data recording region. Illustratively, the amount of learning mark deviation is made to coincide with $+\Delta$ or $-\Delta$.

Using the zero cross timing signal 704A, the zero cross detection circuit 704 furnishes the equalization coefficient learning circuit 731 with the timing for reading the learning marks having such positional deviations. The equalization coefficient learning circuit 731 is required to use the reproduced signals from the intermediate points located immediately before and after each learning mark. The timing for reading the reproduced signals from such intermediate points is provided by the clock signal 707B from the detection timing signal generating circuit 707. The amount of deviation between a given information mark and the nearest information recording lattice point in the data recording region is one of $+2\Delta$, $+\Delta$, $-\Delta$ and $-2\Delta$, as shown in FIG. 19. Although this deviation amount can differ from the positional deviation between the point where a learning mark is recorded and the nearest information recording lattice point, the reference deviation amount A itself is sufficiently small compared with the lattice point and track spacings. For this reason, the equalization coefficients learned as described above may be used unmodified by the fifth embodiment for crosstalk removal in conjunction with the reproduced signals from information marks having various positional deviations recorded in the data region. The resulting removal of the crosstalk is as effective as with the first embodiment.

The two-dimensional equalizing circuit 732, operating in cooperation with the equalization coefficient learning circuits 731, outputs a signal that denotes a peak value obtained after removing the crosstalk component (coming from a pair of adjacent tracks) from the peak value of the reproduced signal from each information recording lattice point. A quantizing circuit 701 quantizes the output peak value from the circuit 731 using the slice levels L1, L2 and L3 generated by the slice level generating circuit 720, and outputs a digital signal representing the level corresponding to the information mark recorded at the information recording lattice point in question. When the slice level generating circuit 720 determines the slice level based on the reproduced signals from the reference recording marks 800, it is assumed that in the neighborhood of these reference recording marks, there exist no marks that would cause crosstalk with respect thereto. Thus, the above-described two-dimensional equalizing circuit will not be used for the reproduced signals fed to the slice level generating circuit 720. The same holds for the reproduced signals from the learning marks used by the equalization coefficient learning circuit 731.

The decoding circuit 702 receives two kinds of data: digital data output by the time detection circuit 703 to represent position deviation with respect to each information recording lattice point, and digital data output by the quantizing circuit 701 to represent multiple levels regarding the information recording lattice point in question. Given such digital data, the decoding circuit 702 decodes them into the preceding two bits and the succeeding two bits in each four-bit data unit represented by the information mark recorded at each information recording lattice point.

As described, the fifth embodiment records to each information recording lattice point information marks representing multiple levels through the use of different positional deviations. This makes it possible to increase the amount of information that may be recorded to each information recording lattice point.

<Variations of the Fifth Embodiment>

(1) Other types of magneto-optical recording medium may be used for multi-level recording. One such alternative medium may comprise a first and a second recording layer, the first recording layer being brought into two different recorded states (i.e., magnetized states) when subjected to external magnetic fields belonging to two different magnetic regions, the second recording layer being placed in two different recorded states when subjected to external magnetic fields of two magnetic regions that differ from those for the first recording layer. The second recording layer is composed of a material of which the magneto-optical characteristics differ from those of the material constituting the first recording layer. In this medium makeup, the second recording layer need only be constituted by a single magnetic layer, not by the perpendicular magnetized layer and capping layer discussed above in connection with the fifth embodiment. However, it is required that the second recording layer be in two different recorded states when subjected to two magnetic regions different from those by which the first recording layer is brought into its recorded states. Examples of this kind of medium are disclosed in Japanese Patent Application No. Hei 6-96690 as well as in Japanese Patent Application No. Hei 6-143634 submitted by one of the assignees of this application. The associated techniques disclosed in these applications are incorporated herein by reference.

The explanations made in connection with the media for the fifth embodiment with reference to FIGS. 21B, 21C, 22 and 23 also hold for the above alternative medium. For example, suppose that the first recording layer having the characteristic shown in dashed line in FIG. 23 and the second recording layer with the characteristic depicted in broken line in the same figure are stacked one upon the other. When the stacked layers are subjected to the external magnetic fields H0, H1, H2 and H3 shown in FIG. 23, these fields generate four recorded states "0", "1", "2" and "3" in the layers as indicated. In that case, the recorded state brought about by the external magnetic field H0 may be equated to "0", the state produced by the external magnetic field H1 may be equated to "1", the state caused by the external magnetic field H2 may be equated to "2", and the state generated by the external magnetic field H3 may be equated to "3". This scheme provides four-level signal recording through the use of external magnetic fields having intensities of about ±(Oe).

(2) As shown in FIG. 29, the substances discussed in connection with the fifth embodiment and the materials described in conjunction with the first embodiment may be subjected to external magnetic fields fed with a DC bias magnetic field so that the center magnetic field is shifted in the negative direction by about −50(Oe). This makes it possible for the medium to record three-level signals using external magnetic fields with intensities of as low as ±50 (Oe).

(3) The recording circuit arrangement of FIG. 24 may be modified. Illustratively, the multi-level generating circuit 710 is structured so that the amplifiers 953 and 957 yield their outputs separately without using the adder 958 in FIG. 25. The magnetic head drive circuit 713 in FIG. 25 is supplemented by a second magnetic head drive circuit. The two magnetic head drive circuits are used to put the two amplifier outputs separately to voltage-to-current conversion. In so doing, the magnetic head drive circuits drive a single magnetic head incorporating two windings of a different number of turns each.

(4) It is obvious that the magnetic head may be replaced by some other magnetic field generating apparatus such as an electromagnetic coil device.

(5) As discussed in connection with the fifth embodiment, the method of writing two reference recording marks to one sector may be replaced by another method whereby one reference recording mark is recorded to each sector. Under this alternative method, the above-described three slice levels may be determined by use of two reference recording marks recorded in two contiguous sectors.

Sixth Embodiment

The fourth embodiment was described as a setup for providing multi-phase recording. According to this recording method, the positional deviation between the information mark recording position and the information recording lattice point is varied so as to reflect the information to be recorded. The fifth embodiment was shown to be a multi-level recording setup for recording to each information recording lattice point an information mark which has its level determined by the target information and which represents a signal taking one of plural levels. In addition, the fifth embodiment was shown providing the same kind of multi-phase recoding as that of the fourth embodiment. By contrast, the sixth embodiment implements the multi-level recording scheme in the same manner as the fifth embodiment but does not offer multi-phase recording. That is, although the information mark to be recorded to each information recording lattice point is varied depending on the information to be recorded thereto, the position in which to record the information mark is not deviated from the information recording lattice point in question. Thus, unlike the fifth embodiment, the sixth embodiment divides user data into a plurality of two-bit data units. The intensity of the magnetic field to be applied is varied depending on the value of each two-bit data unit. Specifically, the sixth embodiment utilizes the relations defined in FIG. 19 between the preceding two bits and the multiple levels when the succeeding two bits are "01" or "11". When removing crosstalk coming from any one adjacent track adversely to affect the target information mark, the sixth embodiment employs the same two-dimensional equalizing circuit and equalization coefficient learning circuit as those used by the fifth embodiment.

As described and according to one aspect of the invention, a one-beam optics is used to scan tracks for signal reproduction therefrom in a simply-structured setup in such a manner that the crosstalk from tracks adjacent to the target track is reduced from the reproduced signal.

The invention is preferably embodied so that inter-symbol interference is further removed from the crosstalk-reduced reproduced signal.

According to another aspect of the invention, it is possible accurately to reproduce information marks which represent multi-level information and which are recorded on a multi-phase basis.

Preferably, the invention is embodied to record on a multi-phase basis information marks representing multi-level information onto a recording medium having a small number of recording layers, the recorded information marks being reproduced later with accuracy.

As many apparently different embodiments of this invention may be made without departing from the spirit and scope thereof, it is to be understood that the invention is not limited to the specific embodiments thereof except as defined in the appended claims.

What we claim is:

1. A method for optically reproducing information recorded in an optical information recording medium,
    wherein said optical information recording medium has;
        a plurality of tracks,
        an information recording region predetermined on each of at least plural partial ones of said plurality of tracks,
        a plurality of information recording lattice points predetermined in said information recording region, and
        a plurality of information marks each recorded in correspondence to one of at least plural partial ones of said plurality of information recording lattice points,
    wherein positions of information recording lattice points on said plurality of tracks along a track extending direction are predetermined depending on each track, so that positions of information recording lattice points on tracks of odd track numbers along a track extending direction are located at midway of positions of information recording lattice points on tracks of even track numbers along a track extending direction, said method comprising the steps of:
    scanning an information recording region predetermined on one of said plurality of tracks from which information is to be read, by an optical spot;
    detecting a reproducing light provided by said optical information recording medium when said optical spot scans said information recording region by said scanning, and producing a reproduced signal;
    extracting from said reproduced signal produced, a reproduced signal for each of information recording lattice points positioned within said information recording region and intermediate points located at midway of said information recording lattice points within said information recording region;

removing a crosstalk component produced by a pair of neighboring tracks of said one track from said reproduced signal as extracted for each of said information recording lattice points positioned within said information recording region;

said removing being executed by using first and second reproduced signals;

said first reproduced signal being one extracted by said extracting step for a first intermediate point located between said each information recording lattice point and a preceding information recording lattice point located just before said each information recording lattice point;

said second reproduced signal being one extracted by said extracting step for a second intermediate point located between said each information recording lattice point and a succeeding information recording lattice point located just after said each information recording lattice point; and reproducing information recorded at said each information recording lattice point from said reproduced signal as extracted for said each information recording lattice point.

2. A method for optically reproducing information according to claim 1, further comprising a step of:

removing an inter-symbol interference component remaining in said reproduced signal extracted for said each information recording lattice point, as obtained after said removing of said crosstalk component;

said removing being executed by using a plurality of reproduced signals as extracted for a plurality of information recording lattice points located on said one track in a neighborhood of said each information recording lattice point;

wherein said information reproducing step reproduces said information recorded at said each information recording lattice point from said reproduced signal extracted for said each information recording lattice point, obtained after said removing of said crosstalk component and said removing of said intersymbol interference component.

3. A method for optically reproducing information according to claim 2, wherein said plurality of reproduced signals as used in said removing of said inter-symbol interference component comprises a first group of two reproduced signals and a second group of two other reproduced signals;

wherein said first group of two reproduced signals comprises ones as extracted for two preceding information recording lattice points on said one track located just before said each information recording lattice point;

wherein said second group of two other reproduced signals comprises ones as extracted for two succeeding information recording lattice points on said one track located just after said each information recording lattice point.

4. A method for optically reproducing information according to claim 2, wherein said plurality of reproduced signals as used in said removing of said inter-symbol interference component comprises one reproduced signal and another reproduced signal;

wherein said one reproduced signal comprises one as extracted for one preceding information recording lattice point on said one track located just before said each information recording lattice point;

wherein said another reproduced signal comprises one as extracted for one succeeding information recording lattice point on said one track located just after said each information recording lattice point.

5. A method for optically reproducing information according to claim 2, wherein said plurality of reproduced signals as used in said removing of said inter-symbol interference component comprises a first group of three reproduced signals and a second group of three other reproduced signal;

wherein said first group of three reproduced signals comprises ones as extracted for three preceding information recording lattice points on said one track located just before said each information recording lattice point;

wherein said second group of three other reproduced signals comprises ones as extracted for three succeeding information recording lattice points on said one track located just after said each information recording lattice point.

6. A method for optically reproducing information according to claim 1, wherein said removing step includes a step of subtracting a sum of first and second products from said reproduced signal as extracted for said each information recording lattice point, wherein said first product is a product of said first reproduced signal and a first predetermined coefficient, and said second product is a product of said second reproduced signal and a second predetermined coefficient.

7. A method for optically reproducing information according to claim 6, wherein said information recording medium has a learning information mark recorded at a particular information recording lattice point located within a learning region on at least one of said plurality of tracks provided on said medium;

wherein no information mark is not recorded at information recording lattice points neighboring to said particular information recording lattice point;

wherein said method further comprises the steps of;

scanning said learning region by said optical spot before said scanning of said information recording region, detecting a reproduced light produced by said optical information recording medium when said optical spot scans said learning region by said scanning, and producing a reproduced signal, extracting from said reproduced signal during said scanning of said learning region, third to fourth reproduced signals, said third reproduced signal being one extracted for an intermediate point located between said particular information recording lattice point and a preceding information recording lattice point located just before said particular information recording lattice point, said fourth reproduced signal being one extracted for said particular information recording lattice point, said fifth reproduced signal being one extracted for an intermediate point located between said particular information recording lattice point and a succeeding information recording lattice point located just after said particular information recording lattice point, and determining said first and second coefficients from said third to fifth reproduced signals.

8. A method for optically reproducing information according to claim 7, wherein said learning region is located on each of said plural partial ones of said plurality of tracks each of which has an information recording region;

wherein said scanning step of said learning region comprises a step of scanning a learning region located on said one track from which information is to be read, before said scanning of said information recording region within said one track.

9. A method for optically reproducing information according to claim 7, wherein said learning region is located on a particular track predetermined for holding a learning information mark, wherein said particular track is different from said at least plural partial tracks which have information recording regions, among said plurality of tracks provided on said information recording medium.

10. A method for optically reproducing information according to claim 9, wherein said learning region comprises a plurality of learning regions located on a plurality of locations on said particular track;

wherein said scanning step of said learning region comprises a step of scanning each of said plurality of learning regions;

wherein said extracting step of said third to fifth reproduced signals is executed for each of said plurality of learning regions after said scanning of said each learning region by said scanning step;

wherein said step of determining said first and second coefficients comprises a step of determining said first and second coefficients from said third to fifth reproduced signals extracted as a result of said scanning of each of said plurality of learning regions.

11. A method for optically reproducing information according to claim 1, wherein an information mark has one of a plurality of predetermined optical properties and is recorded at a position having a positional deviation along a track extending direction from a corresponding one of said plurality of information recording lattice points;

wherein said one optical property is one which has been selected depending upon information recorded at said corresponding one information recording lattice point;

wherein said positional deviation is dependent upon said information recorded;

wherein said extracting step of said reproduced signal comprises the steps of;

detecting a recording position of an information mark as recorded in correspondence to each information recording lattice point within said information recording region on said one track, based upon said reproduced signal produced by said detecting and producing step, and extracting from said reproduced signal produced by said detecting and producing step, a reproduced signal for said recording position detected for said each information recording lattice point, as said reproduced signal for said each information recording lattice point, wherein said reproducing step of recorded information comprises the steps of;

quantizing an amplitude of said reproduced signal extracted for said each information recording lattice point obtained after said removing step of said crosstalk component, said quantizing being executed by using a plurality of quantizing levels, detecting a positional deviation for said each information recording lattice point, said positional deviation being one between said recording position as detected for said each information recording lattice point and said each information recording lattice point, and decoding combination of a signal obtained as a result of said quantizing for said each information recording lattice point and said positional deviation as detected for said each information recording lattice point, and producing a signal indicative of information recorded at said each information recording lattice point.

12. A method for optically reproducing information according to claim 1, wherein an information mark is recorded at a corresponding one of said at least plural partial ones of said plurality of information recording lattice points, and has one of a plurality of predetermined optical properties;

wherein said one optical property is one which has been selected depending upon information recorded at said corresponding one information recording lattice point;

wherein said reproducing step of recorded information comprises a step of quantizing an amplitude of said reproduced signal extracted for said each information recording lattice point obtained after said removing step of said crosstalk component;

wherein said quantizing is executed by using a plurality of quantizing levels.

13. A method for optically reproducing information recorded in an optical information recording medium, wherein said optical information recording medium has;

a plurality of tracks, an information recording region predetermined on each of at least plural partial ones of said plurality of tracks, a plurality of information recording lattice points predetermined in said information recording region, and a plurality of information marks each recorded in correspondence to one of at least plural partial ones of said plurality of information recording lattice points, said method comprising the steps of:

scanning an information recording region predetermined on one of said plurality of tracks from which information is to be read, by an optical spot;

detecting a reproducing light provided by said optical information recording medium when said optical spot scans said information recording region by said scanning, and producing a reproduced signal;

extracting from said produced reproduced signal, a reproduced signal for each of information recording lattice points positioned within said information recording region and intermediate points located at midway of said information recording lattice points within said information recording region;

removing a crosstalk component produced from a pair of neighboring tracks of said one track into said reproduced signal as extracted for each of said information recording lattice points positioned within said information recording region;

said removing being executed by using first and second reproduced signals;

said first reproduced signal being one extracted by said extracting step for a first intermediate point located between said each information recording lattice point and a preceding information recording lattice point located just before said each information recording lattice point;

said second reproduced signal being one extracted by said extracting step for a second intermediate point located between said each information recording lattice point and a succeeding information recording lattice point located just after said each information recording lattice point; and reproducing information recorded at said each information recording lattice point from said reproduced signal as extracted for said each information recording lattice point.

14. A method for optically reproducing information according to claim 13, further comprising a step of:

removing an inter-symbol interference component remaining in said reproduced signal extracted for said each information recording lattice point, as obtained after said removing of said crosstalk component;

said removing being executed by using a plurality of reproduced signals as extracted for a plurality of information recording lattice points located on said one track in a neighborhood of said each information recording lattice point;

wherein said information reproducing step reproduces said information recorded at said each information recording lattice point from said reproduced signal extracted for said each information recording lattice point, obtained after said removing of said crosstalk component and said removing of said intersymbol interference component.

15. A method for optically reproducing information recorded in an optical information recording medium, wherein said optical information recording medium has; a plurality of tracks,
an information recording region predetermined on each of at least plural partial ones of said plurality of tracks,
a plurality of information recording lattice points predetermined in said information recording region, and
a plurality of information marks each respectively recorded in correspondence to a respective different one of said plurality of information recording lattice points, wherein each information mark has a positional deviation from a corresponding one of said plurality of information recording lattice points;

wherein said positional deviation is dependent upon information recorded at said corresponding information recording lattice point;

wherein said each information mark has a predetermined size and shape independent of said information recorded at said corresponding information recording lattice point, said method comprising the steps of:

scanning an information recording region predetermined on one of said plurality of tracks from which information is to be read, by an optical spot;

detecting a reproducing light provided by said optical information recording medium when said optical spot scans said information recording region by said scanning, and producing a reproduced signal;

detecting a recording position of an information mark as recorded in correspondence to each information recording lattice point within said information recording region on said one track, based upon said reproduced signal produced by said detecting and producing step;

decoding said positional deviation as detected for said each information recording lattice point and producing a signal indicative of information recorded at said each information recording lattice point.

16. A method for optically reproducing information recorded in an optical information recording medium, wherein said optical information recording medium has, a plurality of tracks,
an information recording region predetermined on each of at least plural partial ones of said plurality of tracks,
a plurality of information recording lattice points predetermined in said information recording region, and
a plurality of information marks each recorded in correspondence to one of said plurality of information recording lattice points, wherein each information mark has a positional deviation from a corresponding one of said plurality of information recording lattice points;

wherein said positional deviation is dependent upon information recorded at said corresponding information recording lattice point;

wherein said each information mark has a predetermined shape independent of said information recorded at said corresponding information recording lattice point, said method comprising the steps of:

scanning an information recording region predetermined on one of said plurality of tracks from which information is to be read, by an optical spot;

detecting a reproducing light provided by said optical information recording medium when said optical spot scans said information recording region by said scanning, and producing a reproduced signal;

detecting a recording position of an information mark as recorded in correspondence to each information recording lattice point within said information recording region on said one track, based upon said reproduced signal produced by said detecting and producing step;

decoding said positional deviation as detected for said each information recording lattice point and producing a signal indicative of information recorded at said each information recording lattice point;

wherein each information mark has one of a plurality of predetermined optical properties;

wherein said one optical property is one which has been selected depending upon information recorded at said corresponding information recording lattice point;

wherein said decoding and producing step comprises the steps of;

extracting from said reproduced signal produced by said detecting and producing step, a reproduced signal for said recording position detected for said each information recording lattice point, as said reproduced signal for said each information recording lattice point, quantizing an amplitude of said reproduced signal extracted for said each information recording lattice point, by using a plurality of quantizing levels, detecting a positional deviation for said each information recording lattice point, said positional deviation being one between said recording position as detected for said each information recording lattice point and said each information recording lattice point, decoding combination of a signal obtained as a result of said quantizing for said each information recording lattice point and said positional deviation as detected for said each information recording lattice point, and producing a signal indicative of information recorded at said each information recording lattice point.

17. An apparatus for optically reproducing information recorded in an optical information recording medium, wherein said optical information recording medium has;
a plurality of tracks,
an information recording region predetermined on each of at least plural partial ones of said plurality of tracks,
a plurality of information recording lattice points predetermined in said information recording region, and
a plurality of information marks recorded at at least plural partial ones of said plurality of information recording lattice points, wherein positions of information recording lattice points on said plurality of tracks along a track extending direction are predetermined depending on each track, so that positions of information recording lattice points on tracks of odd track numbers along a track extending direction are located at midway of positions of information recording lattice points on tracks of even track numbers along a track extending direction, said method comprising the steps of:

an optical head for projecting an optical spot onto an information recording region predetermined on one of said plurality of tracks from which information is to be read, and for detecting a reproducing light provided by said optical information recording medium for said optical spot and for producing a reproduced signal;

a drive apparatus for driving said optical head relatively against said optical information recording medium so that said optical head scans said one track;

a signal extracting circuit for extracting from said produced reproduced signal, a reproduced signal for each of information recording lattice points positioned within said information recording region and intermediate points located at midway of said information recording lattice points within said information recording region;

a first signal processing circuit for removing a crosstalk component produced from a pair of neighboring tracks of said one track into said reproduced signal as extracted for each of said information recording lattice points positioned within said information recording region, by using first and second reproduced signals, said first reproduced signal being one extracted by said extracting step for a first intermediate point located between said each information recording lattice point and a preceding information recording lattice point located just before said each information recording lattice point;

said second reproduced signal being one extracted by said extracting step for a second intermediate point located between said each information recording lattice point and a succeeding information recording lattice point located just after said each information recording lattice point; and an information reproducing circuit for reproducing information recorded at said each information recording lattice point from said reproduced signal as extracted for said each information recording lattice point.

18. An apparatus for optically reproducing information according to claim 17, further comprising:

a second signal processing circuit for removing an inter-symbol interference component remaining in said reproduced signal extracted for said each information recording lattice point, as obtained after said removing of said crosstalk component;

wherein said second signal processing circuit removes said inter-symbol interference component, by using a plurality of reproduced signals as extracted for a plurality of information recording lattice points located on said one track in a neighborhood of said each information recording lattice point;

wherein said information reproducing circuit includes a circuit for reproducing information recorded at said each information recording lattice point from said reproduced signal extracted for said each information recording lattice point, provided by said second signal processing circuit after said removing of said inter-symbol interference component.

19. An apparatus for optically reproducing information according to claim 18, wherein said plurality of reproduced signals as used in said removing of said inter-symbol interference component comprises a first group of two reproduced signals and a second group of two other reproduced signals;

wherein said first group of two reproduced signals comprise ones extracted for two preceding information recording lattice points on said one track located just before said each information recording lattice point;

wherein said second group of two other reproduced signals comprise ones extracted for two succeeding information recording lattice points on said one track located just after said each information recording lattice point.

20. An apparatus for optically reproducing information according to claim 18, wherein said plurality of reproduced signals as used in said removing of said inter-symbol interference component comprises one reproduced signal and another reproduced signal;

wherein said one reproduced signal comprises one extracted for one preceding information recording lattice point on said one track located just before said each information recording lattice point;

wherein said another reproduced signal comprises one extracted for one succeeding information recording lattice point on said one track located just after said each information recording lattice point.

21. An apparatus for optically reproducing information according to claim 18, wherein said plurality of reproduced signals as used in said removing of said inter-symbol interference component comprises a first group of three reproduced signals and a second group of three other reproduced signals;

wherein said first group of three reproduced signals comprise ones extracted for three reproduced signals as extracted for three preceding information recording lattice points on said one track located just before said each information recording lattice point;

wherein said second group of three other reproduced signals comprise ones extracted for three succeeding information recording lattice points on said one track located just after said each information recording lattice point.

22. An apparatus for optically reproducing information according to claim 17, wherein said first signal processing circuit includes a circuit for subtracting a sum of first and second products from said reproduced signal as extracted for said each information recording lattice point;

wherein said first product is a product of said first reproduced signal and a first predetermined coefficient, and said second product is a product of said second reproduced signal and a second predetermined coefficient.

23. An apparatus for optically reproducing information according to claim 22, wherein said information recording medium has a learning information mark recorded at a particular information recording lattice point located within a learning region on at least one of said plurality of tracks provided on said medium;

wherein no information mark is recorded at information recording lattice points neighboring to said particular information recording lattice point;

wherein said drive apparatus includes means for driving said optical head relatively against said optical information recording medium so that said optical spot scans said learning region before said information recording region;

wherein said apparatus for optically reproducing information further includes;

a circuit for extracting third to fifth reproduced signals from a reproduced signal produced by said optical head during said optical spot scans said learning region, said third reproduced signal being one extracted for an intermediate point located between said particular information recording lattice point and a preceding information recording lattice point located just before said particular information recording lattice point, said fourth reproduced signal being one extracted for said particular information recording lattice point, said fifth reproduced signal being one extracted for an intermediate point located between said particular information recording lattice point and a succeeding information recording lattice point located just after said particular information recording lattice point; and a coefficient calculation circuit for determining said first and second coefficients from said third to fifth reproduced signals.

24. An apparatus for optically reproducing information according to claim 23, wherein said learning region is located on each of plural tracks each of which has an information recording region;

wherein said drive apparatus includes means for driving said optical head relatively against said optical information recording medium, so that said optical head scans a learning region located on said one track from which information is to be read, before said information recording region within said one track.

25. An apparatus for optically reproducing information according to claim 23, wherein said learning region is located on a particular track predetermined for holding a learning mark;

wherein said particular track is different from said at least plural partial tracks which have information recording regions, among said plurality of tracks provided on said information recording medium.

26. An apparatus for optically reproducing information according to claim 25, wherein said learning region comprises a plurality of learning regions located on a plurality of locations on said particular track;

wherein said drive apparatus includes means for driving said optical head relatively against said optical information recording medium, so that said optical spot sequentially scans each of said plurality of learning regions before said information recording region located on said one track from which information is to be read;

wherein said coefficient calculation circuit includes a circuit for determining said first and second coefficients from said third to fifth reproduced signals extracted by said circuit for extracting, for each of said plurality of learning regions, after said scanning of each of said plurality of learning regions.

27. An apparatus for optically reproducing information according to claim 17, wherein each information mark has one of a plurality of predetermined optical properties and is recorded at a position having a positional deviation along a track extending direction from a corresponding one of said at least plural partial ones of said plurality of information recording lattice points, wherein said one optical property is one which has been selected depending upon information recorded at said corresponding information recording lattice point;

wherein said positional deviation is dependent upon said information recorded;

wherein said signal extracting circuit includes;

a detecting circuit for detecting a recording position of an information mark as recorded in correspondence to each information recording lattice point within said information recording region on said one track, based upon said reproduced signal produced by said optical head during said optical head scans said information recording region, and an extracting circuit for extracting from said reproduced signal produced by said optical head, a reproduced signal produced by said optical head for said recording position detected for said each information recording lattice point, as said reproduced signal for said each information recording lattice point, wherein said information reproducing circuit includes;

a quantizing circuit for quantizing an amplitude of said reproduced signal extracted for said each information recording lattice point and provided by said first signal processing circuit after removal of said crosstalk component, said quantizing circuit using a plurality of quantizing levels for said quantizing, a detecting circuit for detecting a positional deviation for said each information recording lattice point, said positional deviation being one between said recording position as detected for said each information recording lattice point and said each information recording lattice point, and a decoding circuit for decoding combination of a signal provided by said quantizing circuit as a result of said quantizing for said each information recording lattice point and said positional deviation as detected by said detecting circuit for said each information recording lattice point, and for producing a signal indicative of information recorded at said each information recording lattice point.

28. An apparatus for optically reproducing information according to claim 17, wherein each information mark is recorded at a corresponding one of said at least plural partial ones of said plurality of information recording lattice points;

wherein said each information mark has one of a plurality of predetermined optical properties;

wherein said one optical property is one which has been selected depending upon information recorded at said corresponding one information recording lattice point;

wherein said information reproducing circuit includes a circuit for quantizing an amplitude of said reproduced signal extracted for said each information recording lattice point and provided by said first signal processing circuit after removal of said crosstalk component, and for providing a signal indicative of information recorded at said each information recording lattice point;

wherein said quantizing is executed by using a plurality of quantizing levels.

29. An apparatus for optically reproducing information recorded in an optical information recording medium, wherein said optical information recording medium has;
a plurality of tracks,
an information recording region predetermined on each of at least plural partial ones of said plurality of tracks,
a plurality of information recording lattice points predetermined in said information recording region, and
a plurality of information marks each recorded in correspondence to one of at least plural partial ones of said plurality of information recording lattice points, comprising:
an optical head for projecting an optical spot onto an information recording region predetermined on one of said plurality of tracks from which information is to be read, for detecting a reproducing light provided by said optical information recording medium for said optical spot and for producing a reproduced signal;
a drive apparatus for driving said optical head relatively against said optical information recording medium so that said optical head scans said one track;
a signal extracting circuit for extracting from said reproduced signal produced by said optical head when said optical head scans said information recording region on said one track, a reproduced signal for each of information recording lattice points positioned within said information recording region and intermediate points located at midway of said information recording lattice points within information recording region;

a first signal processing circuit for removing a crosstalk component produced by a pair of neighboring tracks of said one track into said reproduced signal as extracted for each of said information recording lattice points positioned within said information recording region, by using first and second reproduced signals, said first reproduced signal being one extracted by said extracting step for a first intermediate point located between said each information recording lattice point and a preceding information recording lattice point located just before said each information recording lattice point, said second reproduced signal being one extracted by said extracting step for a second intermediate point located between said each information recording lattice point and a succeeding information recording lattice point located just after said each information recording lattice point; and an information reproducing circuit for reproducing information recorded at said each information recording lattice point from said reproduced signal as extracted for said each information recording lattice point.

30. An apparatus for optically reproducing information according to claim 29, further comprising:

a second signal processing circuit for removing an inter-symbol interference component remaining in said reproduced signal extracted for said each information recording lattice point, as provided by said first signal processing circuit after said removing of said crosstalk component;

wherein said second signal processing circuit removes said inter-symbol interference component by using a plurality of reproduced signals as extracted for a plurality of information recording lattice points located on said one track and neighboring to said each information recording lattice point;

wherein said information reproducing circuit includes a circuit for reproducing said information recorded at said each information recording lattice point from said reproduced signal extracted for said each information recording lattice point, provided by said second information processing circuit after said removing of said inter-symbol interference component.

31. An apparatus for optically reproducing information recorded in an optical information recording medium, wherein said optical information recording medium has,
a plurality of tracks,
an information recording region predetermined on each of at least plural partial ones of said plurality of tracks,
a plurality of information recording lattice points predetermined in said information recording region, and
a plurality of information marks each respectively recorded in correspondence to a respective different one of said plurality of information recording lattice points, wherein each information mark has a positional deviation from a corresponding one of said plurality of information recording lattice points;

wherein said positional deviation is dependent upon information recorded at said corresponding information recording lattice point;

wherein said each information mark has a predetermined size and shape independent of said information recorded at said corresponding information recording lattice point, comprising:

an optical head for projecting an optical spot onto an information recording region predetermined on one of said plurality of tracks from which information is to be read, for detecting a reproducing light provided by said optical information recording medium for said optical spot and for producing a reproduced signal;

a drive apparatus for driving said optical head relatively against said optical information recording medium so that said optical head scans said information recording region on said one track;

a position detecting circuit for detecting a recording position of an information mark as recorded in correspondence to each information recording lattice point within said information recording region on said one track, based upon ;said reproduced signal produced by said optical head when said optical head scans said information recording region, and a decoding circuit for decoding positional deviation between said recording position as detected for said each information recording lattice point and said each information recording lattice point, and for producing a signal indicative of information recorded at said each information recording lattice point.

32. An apparatus for optically reproducing information recorded in an optical information recording medium, wherein said optical information recording medium has:
a plurality of tracks,
an information recording region predetermined on each of at least plural partial ones of said plurality of tracks,
a plurality of information recording lattice points predetermined in said information recording region, and
a plurality of information marks each recorded in correspondence to one of said plurality of information recording lattice points, wherein each information mark has a positional deviation from a corresponding one of said plurality of information recording lattice points;

wherein said positional deviation is dependent upon information recorded at said corresponding information recording lattice point;

wherein said each information mark has a predetermined shape independent of said information recorded at said corresponding information recording lattice point, comprising:

an optical head for projecting an optical spot onto an information recording region predetermined on one of said plurality of tracks from which information is to be read, for detecting a reproducing light provided by said optical information recording medium for said optical spot and for producing a reproduced signal;

a drive apparatus for driving said optical head relatively against said optical information recording medium so that said optical head scans said information recording region on said one track;

a position detecting circuit for detecting a recording position of an information mark as recorded in correspondence to each information recording lattice point within said information recording region on said one track, based upon said reproduced signal produced by said optical head during said optical head scans said information recording region, a decoding circuit for decoding positional deviation between said recording position as detected for said each information recording lattice point and said each information recording lattice point, and for producing a signal indicative of information recorded at said each information recording lattice point;

wherein each information marks has one of a plurality of predetermined optical properties having being selected depending upon information recorded at a corresponding one of said plurality of information recording lattice point;

wherein said information reproducing circuit comprises:
an extracting circuit for extracting from said reproduced signal produced by said optical head, a reproduced signal for said recording position detected for said each information recording lattice point, as said reproduced signal for said each information recording lattice point, a quantizing circuit for quantizing an amplitude of said reproduced signal extracted for said each information recording lattice point, by using a plurality of quantizing levels, a detecting circuit for detecting a positional deviation for said each information recording lattice point, said positional deviation being one between said recording position as detected for said each information recording lattice point and said each information recording lattice point, and a decoding circuit for decoding combination of a signal provided by said quantizing circuit as a result of said quantizing for said each information recording lattice point and said positional deviation as detected by said detecting circuit for said each information recording lattice point, and for producing a signal indicative of information recorded at said each information recording lattice point.

33. An optical information recording medium, comprising:

a plurality of tracks;

a plurality of information recording lattice points predetermined in an information recording region on each of said plurality of tracks;

a plurality of information marks each recorded at a corresponding one of at least plural partial ones of said plurality of information recording lattice points;

a learning region provided on each of said plurality of tracks at a position where an optical spot scans before said information recording region provided on said each track, when said optical spot scans said each track for reproduction of information recorded in said each track; and a learning mark recorded in said learning region;

wherein positions of said plurality of information recording lattice points are predetermined so that positions of information recording lattice points on said plurality of tracks along a track extending direction are predetermined depending on each track, so that positions of information recording lattice points on tracks of odd track numbers along a track extending direction are located at midway of positions of information recording lattice points on tracks of even track numbers along a track extending direction;

wherein said learning region includes at least first to third information recording lattice points;

wherein said learning mark is recorded at said second information recording lattice point;

wherein no learning mark is recorded at said first and third information recording lattice points in said learning region;

wherein said learning mark is one for detecting leakage of information between said second information recording lattice point and points other than said second information recording lattice points;

wherein a position of said second information recording lattice point along a track extending direction is predetermined depending on said each track, so that learning marks recorded on tracks of odd track numbers substantially do not produce a crosstalk on learning marks recorded on tracks of even track numbers.

34. An optical information recording medium, comprising:

a plurality of tracks;

a plurality of information recording lattice points predetermined in an information recording region on each of said plurality of tracks; and a plurality of information marks each respectively recorded in correspondence to a respective different one of said plurality of information recording lattice points;

wherein each information mark has a positional deviation from a corresponding one of said plurality of information recording lattice points and has a predetermined size and shape independent of information recorded at said each information recording lattice point, wherein said positional deviation depends upon said information recorded at said corresponding information recording lattice point.

35. An optical information recording medium according to claim 34, wherein said each information mark further has one of a plurality of predetermined optical properties having been selected depending upon information recorded at said corresponding one information recording lattice point.

36. An optical information recording medium according to claim 35, wherein said plurality of tracks are provided on a magneto-optical recording medium;

wherein said magneto-optical recording medium includes;

a substrate; and a plurality of recording layers laminated on said substrate;

wherein at least a first one of said plurality of recording layers comprises a first magneto-optical layer;

wherein said first magneto-optical layer changes into one of a plurality of mutually different magnetization states which corresponds to one of a plurality of mutually different magnetic field ranges, when said first magneto-optical layer is exposed to an external magnetic field belonging to said one magnetic field range;

wherein at least a second one of said plurality of recording layers comprises a second magneto-optical layer;

wherein said second magneto-optical layer changes into a particular magnetization state, when said second magneto-optical layer is exposed to an external magnetic field belonging to another magnetic field range which does not overlaps said plurality of mutually different magnetic field ranges;

wherein said second magneto-optical layer has a magneto-optical characteristics different from that of said first magneto-optical layer.

* * * * *

UNITED STATES PATENT AND TRADEMARK OFFICE
CERTIFICATE OF CORRECTION

PATENT NO. : 5,808,988
DATED : September 15, 1998
INVENTOR(S) : Maeda, et al.

It is certified that error appears in the above-identified patent and that said Letters Patent is hereby corrected as shown below:

Column 14, line 7, change "information" to --information- --.

Column 24, line 29, change "rom" to --from--.

Column 36, line 63, change "recoding" to --recording--.

Column 39, line 60, change "recoding" to --recording--.

Colum 42, line 46, delete "not".

Column 42, line 58, change "fourth" to --fifth--.

Column 56, line 28, change "overlaps" to --overlap--.

Signed and Sealed this

Sixteenth Day of March, 1999

*Attest:*

Q. TODD DICKINSON

*Attesting Officer*   *Acting Commissioner of Patents and Trademarks*